(12) United States Patent
Bornhoevd et al.

(10) Patent No.: US 8,131,838 B2
(45) Date of Patent: Mar. 6, 2012

(54) MODULAR MONITOR SERVICE FOR SMART ITEM MONITORING

(75) Inventors: Christof Bornhoevd, San Francisco, CA (US); Brian S. Mo, Palo Alto, CA (US); Matthias M. Wiemann, Seeheim (DE)

(73) Assignee: SAP AG, Walldorf (DE)

( * ) Notice: Subject to any disclaimer, the term of this patent is extended or adjusted under 35 U.S.C. 154(b) by 1096 days.

(21) Appl. No.: 11/444,279

(22) Filed: May 31, 2006

(65) Prior Publication Data

US 2007/0283002 A1 Dec. 6, 2007

(51) Int. Cl.
G06F 15/173 (2006.01)
(52) U.S. Cl. .................. 709/224; 709/217; 717/174
(58) Field of Classification Search .................. None
See application file for complete search history.

(56) References Cited

U.S. PATENT DOCUMENTS 5,740,357 A 4/1998 Gardiner et al.
(Continued)

FOREIGN PATENT DOCUMENTS

CN 1620653 A 5/2005
(Continued)

OTHER PUBLICATIONS

Foster, I. et al., "The Open Grid Services Architecture, Version 1.0", Informational Document, Global Frid Forum (Jan. 29, 2005), pp. 1-62.

(Continued)

*Primary Examiner* — Ian N Moore
*Assistant Examiner* — Dung B Huynh
(74) *Attorney, Agent, or Firm* — Brake Hughes Bellermann LLP

(57) ABSTRACT

Monitor services deployable on device networks may be implemented using a modular approach, in which a core monitor service is mapped to one or more devices included in, or associated with, the device networks. Additional monitoring-related functionality may be provided to such devices using plug-ins, add-on services or service components, or other service modules, which interact with the core monitor service. The core monitor service(s) and any monitor service modules may be mapped, to specific ones of the devices, based on, for example, requirements of other services and/or relevant device metadata (e.g., capabilities) of the devices. In additional or alternative implementations, various protocols may be used to register new devices and deployed monitor service(s) with the distributed monitoring service(s) in a fast, secure, energy-efficient, and reliable manner, even as devices join or leave the device network(s).

13 Claims, 17 Drawing Sheets

U.S. PATENT DOCUMENTS

| | | | |
|---|---|---|---|
| 5,768,568 A * | 6/1998 | Inui et al. | 710/16 |
| 5,805,820 A * | 9/1998 | Bellovin et al. | 709/225 |
| 5,809,012 A | 9/1998 | Takase et al. | |
| 5,940,593 A * | 8/1999 | House et al. | 709/203 |
| 6,016,499 A | 1/2000 | Ferguson | |
| 6,023,702 A | 2/2000 | Leisten et al. | |
| 6,065,052 A | 5/2000 | Van | |
| 6,138,162 A | 10/2000 | Pistriotto et al. | |
| 6,167,438 A * | 12/2000 | Yates et al. | 709/216 |
| 6,178,173 B1 * | 1/2001 | Mundwiler et al. | 370/410 |
| 6,184,778 B1 | 2/2001 | Tsuji | |
| 6,189,038 B1 | 2/2001 | Thompson et al. | |
| 6,199,195 B1 * | 3/2001 | Goodwin et al. | 717/104 |
| 6,226,788 B1 | 5/2001 | Schoening et al. | |
| 6,256,739 B1 * | 7/2001 | Skopp et al. | 726/2 |
| 6,262,726 B1 * | 7/2001 | Stedman et al. | 715/745 |
| 6,292,856 B1 | 9/2001 | Marcotte | |
| 6,308,178 B1 * | 10/2001 | Chang et al. | 1/1 |
| 6,343,287 B1 * | 1/2002 | Kumar et al. | 1/1 |
| 6,363,411 B1 | 3/2002 | Dugan et al. | |
| 6,378,128 B1 | 4/2002 | Edelstein et al. | |
| 6,442,748 B1 * | 8/2002 | Bowman-Amuah | 717/108 |
| 6,480,977 B1 | 11/2002 | Apisdorf et al. | |
| 6,606,740 B1 * | 8/2003 | Lynn et al. | 717/100 |
| 6,643,669 B1 * | 11/2003 | Novak et al. | 707/201 |
| 6,654,953 B1 * | 11/2003 | Beaumont et al. | 717/158 |
| 6,686,838 B1 * | 2/2004 | Rezvani et al. | 340/506 |
| 6,687,846 B1 * | 2/2004 | Adrangi et al. | 714/4 |
| 6,694,335 B1 * | 2/2004 | Hopmann et al. | 707/201 |
| 6,757,720 B1 * | 6/2004 | Weschler, Jr. | 709/220 |
| 6,769,000 B1 | 7/2004 | Akhtar | |
| 6,785,707 B2 | 8/2004 | Teeple | |
| 6,816,862 B2 | 11/2004 | Mulgund et al. | |
| 6,832,373 B2 | 12/2004 | O'Neill | |
| 6,842,903 B1 * | 1/2005 | Weschler | 719/328 |
| 6,847,974 B2 | 1/2005 | Wachtel | |
| 6,859,831 B1 | 2/2005 | Gelvin et al. | |
| 6,891,823 B1 | 5/2005 | Schwartz et al. | |
| 6,892,236 B1 * | 5/2005 | Conrad et al. | 709/224 |
| 6,927,686 B2 * | 8/2005 | Nieters et al. | 340/539.22 |
| 6,961,763 B1 * | 11/2005 | Wang et al. | 709/223 |
| 6,970,902 B1 | 11/2005 | Moon | |
| 6,977,938 B2 | 12/2005 | Alriksson | |
| 6,980,993 B2 | 12/2005 | Horvitz et al. | |
| 6,986,148 B2 * | 1/2006 | Johnson et al. | 719/332 |
| 6,990,660 B2 | 1/2006 | Moshir et al. | |
| 7,024,430 B1 * | 4/2006 | Ingraham et al. | 707/201 |
| 7,043,419 B2 | 5/2006 | Chess et al. | |
| 7,072,960 B2 | 7/2006 | Graupner et al. | |
| 7,075,960 B2 | 7/2006 | Kohara et al. | |
| 7,096,461 B1 * | 8/2006 | Nakamura et al. | 717/139 |
| 7,099,582 B2 | 8/2006 | Belhadj-Yahya et al. | |
| 7,099,946 B2 | 8/2006 | Lennon et al. | |
| 7,114,146 B2 | 9/2006 | Zhang et al. | |
| 7,116,674 B2 * | 10/2006 | Shi | 370/419 |
| 7,171,471 B1 | 1/2007 | Nair | |
| 7,206,289 B2 | 4/2007 | Hamada | |
| 7,209,739 B1 | 4/2007 | Narayanabhatla | |
| 7,219,254 B2 | 5/2007 | Rathunde et al. | |
| 7,227,889 B1 * | 6/2007 | Roeck et al. | 375/222 |
| 7,237,243 B2 | 6/2007 | Sutton et al. | |
| 7,292,963 B2 | 11/2007 | Bornhoevd et al. | |
| 7,302,401 B1 | 11/2007 | Tervonen | |
| 7,304,976 B2 | 12/2007 | Mao et al. | |
| 7,312,703 B2 | 12/2007 | Hoogenboom | |
| 7,313,467 B2 | 12/2007 | Breed et al. | |
| 7,319,976 B1 | 1/2008 | Peckover | |
| 7,362,731 B2 | 4/2008 | Vinayakray-Jani | |
| 7,382,741 B2 | 6/2008 | Rao | |
| 7,413,513 B2 | 8/2008 | Nguyen et al. | |
| 7,506,338 B2 * | 3/2009 | Alpern et al. | 717/177 |
| 7,554,920 B2 | 6/2009 | Alam et al. | |
| 7,557,707 B2 | 7/2009 | Kumar et al. | |
| 7,584,471 B2 * | 9/2009 | Bjare et al. | 717/178 |
| 7,616,642 B2 | 11/2009 | Anke et al. | |
| 7,752,068 B1 | 7/2010 | Micklavzina et al. | |
| 7,756,969 B1 * | 7/2010 | Clarke et al. | 709/224 |
| 7,853,946 B2 * | 12/2010 | Minagawa | 717/178 |
| 7,860,968 B2 | 12/2010 | Bornhoevd et al. | |
| 7,890,568 B2 * | 2/2011 | Belenki | 709/200 |
| 7,930,143 B2 | 4/2011 | Tarantola et al. | |
| 8,005,879 B2 | 8/2011 | Bornhoevd et al. | |
| 2001/0051981 A1 | 12/2001 | Davison | |
| 2002/0007422 A1 | 1/2002 | Bennett | |
| 2002/0100036 A1 | 7/2002 | Moshir et al. | |
| 2002/0131386 A1 | 9/2002 | Gwon | |
| 2002/0161751 A1 | 10/2002 | Mulgund et al. | |
| 2002/0174169 A1 * | 11/2002 | Schmid | 709/201 |
| 2002/0188866 A1 * | 12/2002 | Ca et al. | 713/201 |
| 2002/0199173 A1 * | 12/2002 | Bowen | 717/129 |
| 2003/0005350 A1 * | 1/2003 | Koning et al. | 714/4 |
| 2003/0016664 A1 * | 1/2003 | MeLampy et al. | 370/389 |
| 2003/0018810 A1 | 1/2003 | Karagiannis | |
| 2003/0050902 A1 | 3/2003 | Buczak et al. | |
| 2003/0078946 A1 | 4/2003 | Costello et al. | |
| 2003/0097443 A1 | 5/2003 | Gillett et al. | |
| 2003/0144001 A1 | 7/2003 | Nakatsugawa | |
| 2003/0217186 A1 | 11/2003 | Bushey | |
| 2003/0228910 A1 * | 12/2003 | Jawaharlal et al. | 463/42 |
| 2004/0024768 A1 * | 2/2004 | Haller | 707/100 |
| 2004/0088231 A1 * | 5/2004 | Davis, Jr. | 705/28 |
| 2004/0111499 A1 * | 6/2004 | Dobrowski et al. | 709/222 |
| 2004/0121792 A1 | 6/2004 | Allen et al. | |
| 2004/0146064 A1 | 7/2004 | Kramer | |
| 2004/0181541 A1 | 9/2004 | Groenendaal et al. | |
| 2004/0193703 A1 | 9/2004 | Loewy et al. | |
| 2004/0243352 A1 | 12/2004 | Morozumi et al. | |
| 2004/0249944 A1 * | 12/2004 | Hosking et al. | 709/225 |
| 2004/0250113 A1 | 12/2004 | Beck | |
| 2005/0060365 A1 | 3/2005 | Robinson et al. | |
| 2005/0071443 A1 * | 3/2005 | Menon et al. | 709/223 |
| 2005/0080892 A1 | 4/2005 | Moser et al. | |
| 2005/0114431 A1 * | 5/2005 | Singh et al. | 709/201 |
| 2005/0119001 A1 | 6/2005 | Watanabe | |
| 2005/0183061 A1 * | 8/2005 | Papanikolaou et al. | 717/103 |
| 2005/0198228 A1 | 9/2005 | Bajwa et al. | |
| 2005/0228763 A1 | 10/2005 | Lewis et al. | |
| 2005/0235058 A1 | 10/2005 | Rackus et al. | |
| 2005/0235136 A1 * | 10/2005 | Barsotti et al. | 713/1 |
| 2005/0249131 A1 | 11/2005 | Takahashi | |
| 2006/0022801 A1 * | 2/2006 | Husak et al. | 340/10.5 |
| 2006/0026591 A1 * | 2/2006 | Backhouse et al. | 717/177 |
| 2006/0029054 A1 | 2/2006 | Breh et al. | |
| 2006/0047545 A1 | 3/2006 | Kumar et al. | |
| 2006/0052882 A1 | 3/2006 | Kubach et al. | |
| 2006/0074912 A1 | 4/2006 | Borthakur et al. | |
| 2006/0085798 A1 | 4/2006 | Bendiksen et al. | |
| 2006/0106581 A1 | 5/2006 | Bornhoevd et al. | |
| 2006/0107284 A1 * | 5/2006 | Crawford et al. | 725/25 |
| 2006/0129367 A1 * | 6/2006 | Mishra et al. | 703/13 |
| 2006/0143181 A1 | 6/2006 | Liu et al. | |
| 2006/0143592 A1 * | 6/2006 | Bender et al. | 717/104 |
| 2006/0146991 A1 * | 7/2006 | Thompson et al. | 379/67.1 |
| 2006/0161909 A1 | 7/2006 | Pandey et al. | |
| 2006/0173726 A1 | 8/2006 | Hall et al. | |
| 2006/0206582 A1 | 9/2006 | Finn | |
| 2006/0212453 A1 | 9/2006 | Eshel et al. | |
| 2006/0212698 A1 * | 9/2006 | Peckover | 713/151 |
| 2006/0215601 A1 | 9/2006 | Vleugels et al. | |
| 2006/0215692 A1 | 9/2006 | Yang | |
| 2006/0225064 A1 * | 10/2006 | Lee et al. | 717/168 |
| 2006/0235976 A1 | 10/2006 | Chen et al. | |
| 2006/0277079 A1 | 12/2006 | Gilligan et al. | |
| 2007/0011334 A1 | 1/2007 | Higgins et al. | |
| 2007/0032244 A1 | 2/2007 | Counts et al. | |
| 2007/0112574 A1 | 5/2007 | Greene | |
| 2007/0118496 A1 | 5/2007 | Bornhoevd et al. | |
| 2007/0118549 A1 | 5/2007 | Bornhoevd et al. | |
| 2007/0118560 A1 | 5/2007 | Bornhoevd et al. | |
| 2007/0123256 A1 | 5/2007 | Whitesell et al. | |
| 2007/0130208 A1 | 6/2007 | Bornhoevd et al. | |
| 2007/0130217 A1 * | 6/2007 | Linyard et al. | 707/201 |
| 2007/0168690 A1 * | 7/2007 | Ross | 714/4 |
| 2007/0168919 A1 * | 7/2007 | Henseler et al. | 717/101 |
| 2007/0192464 A1 | 8/2007 | Tullberg et al. | |
| 2007/0204261 A1 * | 8/2007 | Fetzer et al. | 717/163 |
| 2007/0233881 A1 | 10/2007 | Nochta et al. | |

| | | | |
|---|---|---|---|
| 2007/0249286 | A1 | 10/2007 | Ma et al. |
| 2007/0251998 | A1 | 11/2007 | Belenki |
| 2007/0276619 | A1 | 11/2007 | Sugahara et al. |
| 2007/0276674 | A1 | 11/2007 | Hemmat |
| 2007/0282746 | A1 | 12/2007 | Anke et al. |
| 2007/0282988 | A1 | 12/2007 | Bornhoevd et al. |
| 2007/0283001 | A1 | 12/2007 | Spiess et al. |
| 2008/0010284 | A1 | 1/2008 | Beck |
| 2008/0033785 | A1 | 2/2008 | Anke |
| 2008/0052314 | A1 | 2/2008 | Batabyal |
| 2008/0270486 | A1* | 10/2008 | Hind et al. ............. 707/201 |
| 2009/0097397 | A1 | 4/2009 | Sa de Souza Moreira |
| 2010/0122236 | A1* | 5/2010 | Bugir et al. ............. 717/109 |

FOREIGN PATENT DOCUMENTS

| | | |
|---|---|---|
| EP | 0697654 A1 | 2/1996 |
| EP | 0810755 A3 | 3/1999 |
| EP | 1372073 A2 | 12/2003 |
| EP | 1788480 A2 | 5/2007 |
| EP | 1863223 A1 | 12/2007 |
| EP | 1892656 A1 | 2/2008 |
| JP | 2002500785 A | 1/2002 |
| JP | 2003067351 A | 3/2003 |
| JP | 2004110318 A2 | 4/2004 |
| WO | 2005/106666 A1 | 11/2005 |

OTHER PUBLICATIONS

Baker, M. et al., "Grids and Grid Technologies for wide-area Distributed Computing", Software—Practice & Experience (Sep. 27, 2002), pp. 1437-1466.

Mikic-Rakic, M et al., "Improving availability in large, distributed component-based systems via redeployment", LNCS, vol. 3798 (Nov. 3, 2005), 15 pgs.

Malek, S et al., "A decentralized redeployment algorithm for improving the availability of distributed systems", LNCS, vol. 3798 (Nov. 3, 2005), 13 pgs.

Hoareau, D et al., "Constraint-Based Deployment of Distributed Components in a Dynamic Network", LNCS, vol. 3894 (Mar. 16, 2006), pp. 450-464.

Bitkom, "RFID White Paper Technology, Systems and Applications", An Overview for companies seeking to use RFID technology to connect their IT systems directly to the "real" world, Dec. 2005, 50 pgs.

Mikic-Rakic, M et al., "A tailorable environment for assessing the quality of deployment architectures in highly distributed settings", Second International Working Conference on Component Deployment (2004), pp. 1-15.

Ploennigs, J et al., "A traffic model for networked devices in the building automation", In: Proceedings of the 5th IEEE International Workshop on Factory Communication Systems (WFCS 2004), Vienna, Austria, (2004), pp. 137-145.

Wu, Q et al., "Adaptive component allocation in scudware middleware for ubiquitous computing", LNCS, vol. 3824 (Dec. 6, 2005), pp. 1155-1164.

Wegdam, M et al., "Dynamic reconfiguration and load distribution in component middleware", PhD thesis, University of Twente, Enschede, (2003), pp. 1-257.

Colt, Charles et al., "Oracle Å® Collaboration Suite, Deployment Guide10g Release 1 (10.1.1) B14479-02", (Oct. 2005), pp. 1-230.

Malek, S et al., "A style-aware architectural middleware for resource-constrained,distributed systems", IEEE Transactions on Software Engineering, vol. 31, Issue 3 (Mar. 2005), pp. 256-272.

Lacour, S et al., "A Software Architecture for Automatic Deployment of CORBA Components Using Grid Technologies", Networking and Internet Architecture, DECOR04 (Nov. 24, 2004), pp. 187-192.

Kichkaylo, T et al., "Constrained Component Deployment in Wide-Area Networks Using AI Planning Techniques", Proceedings of the 17th International Symposium on Parallel and Distributed Processing 2003), pp. 1-10.

Akehurst, D H., et al., "Design Support for Distributed Systems: DSE4DS", Procedings of the 7th Cabernet Radicals Workshop (Oct. 2002), pp. 1-6.

Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.

Wu, X et al., "Performance modeling from software components", ACM SIGSOFT Software Engineering Notes, vol. 29, Issue 1 (Jan. 2004), pp. 290-301.

Stewart, C et al., "Profile driven Component Placement for Cluster-based Online Services", IEEE Distributed Systems Online, vol. 5, No. 10, (Oct. 2004), p. 1-6.

Basile, Claudio et al., "A Survey of Dependability Issues in Mobile Wireless Networks", Technical Report, Laas CNRS Toulouse (Feb. 21, 2003), pp. 1-45.

Buchholz, Sven et al., "Adaptation-Aware Web Caching: Caching in the Future Pervasive Web", In: KiVS, (2003), pp. 55-66.

Carzaniga, Antonio et al., "Designing distributed applications with mobile code paradigms", In: Proceedings of the 19th International Conference on Software Engineering, Boston, Massachusetts, (1997), pp. 22-32.

Chandra, Bharat et al., "Resource management for scalable disconnected access to web services", WWW '01: Proceedings of the 10th International Conference on World Wide Web (May 5, 2001), pp. 245-256.

ETSI, "Selection procedures for the choice of radio transmission technologies of the UMTS", Universal Mobile Telecommunications System 30.03 version 3.2.0 (Apr. 1998), pp. 1-84.

Fredriksson, Johan et al., "Calculating Resource Trade-offs when Mapping Component Services to Real-Time Tasks", Fourth Conference on Software Engineering Research and Practice (Oct. 2004), pp. 1-8.

Hasiotis, Tilemahos et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.

Sgroi, Marco et al., "A Service-Based Universal Application Interface for Ad-hoc Wireless Sensor Networks", Preliminary Draft (Nov. 26, 2003), pp. 1-39.

Srivastava, Utkarsh et al., "Operator Placement for In-Network Stream Query Processing", Proceedings of the 24th ACM SIGMOD-SIGACT-SIGART Symposium on Principles of Database Systems (Dec. 2004), pp. 1-10.

Vigna, Giovanni "Mobile Code Technologies, Paradigms, and Applications", PhD Thesis, Politecnico di Milano, Milano, Italy, (1998), pp. 1-89.

Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.

Overeinder, B. et al., "A Dynamic load balancing system for parallel cluster computing", Future Generations computer Systems, Elsevier Science Publishers, Amsterdam, 12, (1), (May 1996), pp. 101-115.

Foster, I. et al., "Globus: A Metacomputing Infrastructure Toolkit", The International Journal of Supercomputer Application and High performance Computing, MIT Press, US, 11 (2), (Jun. 21, 1997), pp. 115-128.

Ferreira, L. et al., "Introduction to Grid Computing with globus", IBM International Technical Support Organization, 2nd edition (Sep. 2003), pp. 1-58.

Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.

Bornhoevd, C. et al., "Integrating Smart Items with Business Processes An Experience Report", IEEE Proceedings of the 38th Hawaii International Conference on System Sciences (Jan. 3, 2005), pp. 1-8.

Bornhoevd, Christof et al., "Integrating Automatic Data Acquisition with Business Processes Experiences with SAPs Auto-ID Infrastructure", Very Large Data Conference (Sep. 3, 2004), pp. 1-8.

Boudec, Jean-Yves L., et al., "A Theory of Deterministic Queuing Systems for the Internet", Network Calculus, Online Version of the Book Springer Verlag—LNCS 2050, (May 10, 2004), pp. 1-269.

Kotov, V. et al., "Optimization of E-Service Solutions With the Systems of Servers Library", Hewlett Packard, Modeling, Analysis and Simulation of Computer and Telecommunicatiion Systems (Aug. 29, 2000), pp. 575-582.
Perkins, C. et al., "IP Mobility Support for IPv4", IETF Standard, Internet Engineering Task Force (Aug. 2002), pp. 1-100.
Deering, S. et al., "ICMP Router Discovery Messages", IETF Standard, Internet Engineering Task Force (Sep. 1991), pp. 1-19.
Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.
Golatowski, F et al., "Service-Oriented Software Architecture for Sensor Networks", International Workshop on Mobile Computing (Jun. 17-18, 2003), pp. 1-8.
Gao, Tong, et al., "Toward QoS Analysis of Adaptive Service-Oriented Architecture", Service-Oriented System Engineering, IEEE International Workshop (Oct. 20, 2005), pp. 1-8.
Wonohoesodo, R et al., "A Role Based Access Control for Web Services", Proceedings of the 2004 IEEE International Conference on Services Computing (2004), pp. 49-56.
Prabhu, B S., et al., "WinRFID—A Middleware for the Enablement of Radio Frequency Identification (RFID) Based Applications", Mobile, Wireless and Sensor Networks (Mar. 28, 2006), pp. 1-23.
Information Society Technologies, "State of the Art in Resource Management on Wired and Wireless Access Networks with Resilience", Jul. 23, 2004, pp. 1-198.
Carvalho, H et al., "A General Data Fusion Architecture", Proceedings of the 6th International Conference on Information Fusion (Jul. 2003), pp. 1-8.
Hawick, K A., et al., "Middleware for Wireless Sensors and Robots", DHPC Technical Report DHPC-112 (Aug. 18, 2002), pp. 1-6.
European Search Report for Application No. EP07005127.1, mailed Jul. 20, 2007, pp. 1-3.
European Search Report for Application No. EP07008409.0, mailed Aug. 24, 2007, pp. 1-4.
European Search Report for Application No. EP07009428.9, mailed Oct. 4, 2007, pp. 1-4.
European Search Report for Application No. EP07014724.4, mailed Nov. 27, 2007, pp. 1-4.
European Search Report for Application No. EP06023720.3, mailed Apr. 10, 2007, pp. 1-4.
European Seach Report for Application No. EP06023256.8, mailed May 9, 2007, pp. 1-5.
Decasper, D. et al., "Router Plugins: A Software Architecture for Next Generation Routers", Computer Communication Review (Oct. 1998), pp. 229-240.
Final Office Action mailed Jun. 25, 2008 for U.S. Appl. No. 11/284,195, 31 pgs.
Final Office Action mailed Feb. 23, 2009 for U.S. Appl. No. 11/479,284, 29 pgs.
Non-Final Office Action mailed May 14, 2008 for U.S. Appl. No. 11/479,284, 16 pgs.
Non-Final Office Action mailed Nov. 1, 2007 for U.S. Appl. No. 11/284,195, 14 pgs.
Advisory Action mailed Oct. 9, 2008 for U.S. Appl. No. 11/284,195, 4 pgs.
Extended European Search Report for Application No. 08017795.9, mailed Feb. 10, 2009, 11 pgs.
"FAQ: Fault management- How does Fault Management Work?" GoAhead Software (2000), 9 pgs.
Spiess, P., et al, "Collaborative Business Items", Deliverable 401: Management & Maintenance Requirements, CoBIs Project No. IST-004270, Version 1.0 (Jan. 2005), 21 pgs.
Non-Final Office Action mailed Oct. 28, 2008 for U.S. Appl. No. 11/283,618, 35 pgs.
Final Office Action mailed May 13, 2009 for U.S. Appl. No. 11/283,618, 32 pgs.
Chatterjee, Mainak et al., "WCA: A Weighted Clustering Alogrithm for Mobile Ad Hoc Networks", Cluster Computing 5, Klluwer Academic Publishers, 2002, pp. 193-204.
Greenstein, Ben et al., "A Sensor Network Application Construction Kit (SNACK)", SenSys '04, Nov. 3-5, 2004, 12 pages.

"The OSGi Service Platform- Dynamic services for networked devices", Retrieved Nov. 16, 2005 from http://www.osgi.org/osgi_technology/index.asp?section=2, 5 pgs.
"Tinyos: Mission Statement", Retrieved Nov. 16, 2005 from http://www.tinyos.net/special/mission, 2 pgs.
Bandara, Ayomi et al., "An Ontological Framework for Semantic Description of Devices", Nov. 11, 2004, 2 pgs.
Vasudevan, Sudarshan et al., "Design and Analysis of a Leader Election Algorithm for Mobile Ad Hoc Networks", Proceedings of 12th IEEE ICNP, Oct. 8, 2004, 11 pages.
Liu, Jinshan et al., "QoS-aware Service Location in Mobile Ad-Hoc Networks", Proceedings of the 5th International Conference on Mobile Data Management, Berkeley, CA USA, Jan. 2004, 12 pages.
Liu, Jinshan et al., "Group Management for Mobile Ad Hoc Networks: Design, Implementation and Experiment", Proceedings of the 6th International Conference on Mobile Data Management, Ayia Napa Cyprus, May 13, 2005, 8 pages.
Gounaris, Anastasios et al., "Adaptive Query Processing: A Survey", Lecture Notes in Computer Science, vol. 2405, Archive of Proceedings of the 19th British National Conference on Databases: Advances in Databases, 2002, pp. 11-25.
Skouteli, Chara et al., "Concept-Based Discovery of Mobile Services", Proceedings of the 6th International Conference on Mobile Data Management, Ayia Napa Cyprus, May 13, 2005, 5 pages.
Yao, Yong et al., "Query Processing for Sensor Networks", Proceedings of the 2003 CIDR Conference, Jan. 2003, 12 pages.
Spiess, Patrik et al., "Going Beyond Auto-ID: A Service-oriented Smart Items Infrastructure", Journal of Enterprise Information Management, vol. 20, Issue 3 (2007), pp. 1-9.
"Composite Capability/Preference Profiles (CC/PP): Structure and Vocabularies 1.0", W3C Recommendation (Jan. 15, 2004), pp. 1-78.
"FIPA Device Ontology Specification", Foundation for Intelligent Physical Agents (Apr. 9, 2001), pp. 1-15.
Levis, Philip et al., "TinyOS: An Operating System for Sensor Networks", Feb. 17, 2004, pp. 1-32.
Hill, Jason Lester, "System Architecture for Wireless Sensor Networks", Dissertation of Jason L. Hill, University of California, Berkeley (2003), 196 pages.
Bellavista, Paolo et al., "The Ubiquitous Provisioning of Internet Services to Portable Devices", Pervasive Computing, Jul. 2002, pp. 81-87.
"MVP Brochure", Bitfone Corporation (2005), www.bitfone.com/usa/uploads/mvp.brochure (Retrieved Sep. 20, 2005), pp. 1-3.
Domagalski, Ronald et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24 2004, 12 pages.
Spiess, P., et al, "Collaborative Business Items", Deliverable 401: Final Project Report, CoBIs Project No. IST-004270, Version 2.0 (Mar. 2007), pp. 1-42.
Schmid, T. et al., "SensorScope: Experiences with a wireless building monitoring", REALWSN (Jun. 2005), 5 pages.
Werner-Allen, Geoffrey et al., "Deploying a Wireless Sensor Network on an Active Volcano", IEEE Internet Computing (Mar.-Apr. 2006), 12 pgs.
Benini, L., "A Discrete-Time Battery Model for High-Level Power Estimation", In Proceeding of the Design, Automation and Test in Europe Conference and Exhibition 2000, pp. 35-39.
Birolini, A., "Quality and Reliability of Technical Systems", IEEE Transactions on Reliability, 2nd edition, vol. 48, Issue 2 (Jun. 1999), pp. 205-206.
Bredin, Jonathan L., "Deploying Sensor Networks with Guaranteed Capacity and Fault Tolerance", In Proceedings of the 6th ACM international symposium on Mobile ad hoc networking and computing, May 27, 2005, 11 pgs.
Desovski, D., "Linear Randomized Voting Algorithm for Fault Tolerant Sensor Fusion and the Corresponding Reliability Model", IEEE International Symposium on Systems Engineering, Oct. 2005, pp. 153-162.
Ding, M et al., "Localized Fault-Tolerant Event Boundary Detection in Sensor Networks", Aug. 22, 2005, 12 pgs.

Estrin, D. et al., "Next Century Challenges: Scalable Coordination in Sensor Networks", MobiCom '99, 1999, pp. 263-270.
European Search Report for EP Application No. 07010652.1 mailed on Oct. 26, 2007, 3 pgs.
European Search Report for EP Application No. 07010654.7 mailed on Oct. 5, 2007, 4 pgs.
European Search Report for Application No. 07010671.1 mailed on Nov. 16, 2007, 4 pgs.
Fok, C.L. et al., "Mobile Agent Middleware for Sensor Networks: An Application Case Study", Proceedings of the 4th International Symposium on Information Processing in Sensor Networks (Apr. 27, 2005), 6 pgs.
Frank, Christian et al., "Algorithms for Generic Role Assignment in Wireless Sensor Networks", Proceedings of the 3rd international conference on bedded networked sensor systems, Nov. 2005, 13 pgs.
Guerraoui, R. et al., "Fault-Tolerance by Replication in Distributed Systems", Proceedings of the 1996 Ada-Europe International Conference on Reliable Software Technologies, 1996, pp. 38-57.
Gupta, G. et al., "Fault-Tolerant Clustering of Wireless Sensor Networks", Wireless Communications and Networking, IEEE, vol. 3, Mar. 20, 2003, pp. 1579-1584.
Gupta, I. et al., "Cluster-Head Election Using Fuzzy Logic for Wireless Sensor Networks.", Proceedings of the 3rd Annual Communication Networks and Services Research Conference (May 31, 2005), pp. 1-71.
Harte, S. et al., "Fault Tolerance in Sensor Networks Using Self-Diagnosing Sensor Nodes.", IEEE International Workshop on Intelligent Environment, Jun. 2005, pp. 7-12.
Heinzelman, W. R., et al., "Energy-Efficient Communication Protocol for Wireless Microsensor", Proceedings of the 33rd Hawaii International Conference on System Sciences, vol. 8, 2000, pp. 1-10.
Karlof, C. et al., "Secure Routing in Wireless Sensor Networks: Attacks and Coutermeasures", Proceedings of the First IEEE Sensor Network Protocols and Applications, May 2003, pp. 113-127.
Koo, C. Y., "Broadcast in Radio Networks Tolerating Byzantine Adversarial Behavior", Proceedings of the twenty-third annual ACM symposium on Principles of distributed computing, 2004, pp. 275-282.
Koushanfar, F. et al., "Fault Tolerance Techniques for Wireless Ad hoc Sensor Networks", Proceedings of IEEE Sensors, vol. 2, 2002, pp. 1491-1496.
Krishnamachari, B. et al., "Distributed Bayesian Algorithms for Fault-Tolerant Event Region Detection in Wireless Sensor Networks", IEEE Transactions on Computers, vol. 53, No. 3, Mar. 2004, pp. 241-250.
Lamport, L. et al., "The Byzantine Generals Problem", ACM Transactions on Programming Languages and Systems, vol. 4, No. 3, Jul. 1982, pp. 382-401.
Levis, P. et al., "A Tiny Virtual Machine for Sensor Networks", In ASPLOS-X: Proceedings of the 10th international conference on Architectural support for programming languages and operating systems, ACM Press, 2002, pp. 85-95.
Li, N. et al., "A Fault-Tolerant Topology Control Algorithm for Wireless Networks.", Proceedings of the 10th Annual International Conference on Mobile Computing and Networking, 2004, pp. 275-286.
Liang, Q. "Clusterhead Election for Mobile Ad hoc Wireless Network", Proceedings on Personal, Indoor and Mobile Radio Communications, vol. 2, 2003, pp. 1623-1628.
Liu, T. et al., "Impala: A Middleware System for Managing Autonomic, Parallel Sensor Systems.", Proceedings of the ninth ACM SIGPLAN symposium on Principles and practice of parallel programming, ACM Press, Jun. 11-13, 2003, pp. 107-118.
Ma, C. et al., "A Prioritized Battery-aware Routing Protocol for Wireless Ad hoc Networks.", Proceedings of the 8th ACM international symposium on Modeling, analysis and simulation of wireless and mobile systems, 2005, pp. 45-52.
Marculescu, D. et al., "Fault-Tolerant Techniques for Ambient Intelligent Distributed Systems", Proceedings of the 2003 IEEE/ACM international conference on Computer-aided design, 2003, 8 pages.
Marti, S. et al., "Mitigating Routing Misbehavior in Mobile Ad hoc Networks", Proceedings of the 6th annual international conference on Mobile computing and networking, 2000, pp. 255-265.

Marzullo, K. "Tolerating failures of continuous-valued sensors", ACM Transactions on Computer Systems, vol. 8, No. 4, 1990, pp. 1-28.
Rakhmatov, D. et al., "Battery Lifetime Prediction for Energy-aware Computing", Proceedings of the 2002 international symposium on Low power electronics and design, 2002, pp. 154-159.
Rakhmatov, D. et al., "Time-to-Failure Estimation for Batteries in Portable Electronic Systems", Proceedings of the 2001 international symposium on Low power electronics and design, 2001, pp. 88-91.
Rong, P. et al., "Extending the lifetime of a network of battery-powered mobile devices by remote processing: A markovian decision-based approach.", Proceedings of the 40th conference on Design automation, New York, NY, USA, ACM Press, Jun. 2-6, 2003, pp. 906-911.
Rudenko, A. et al., "The Remote Processing Framework for Portable Computer Power Saving", in SAC'99: Proceedings of the 1999 ACM symposium on Applied computing, New York, NY, USA, ACM Press, 1999, pp. 365-372.
Ruiz, L. B., et al., "Fault Management in Event-driven Wireless Sensor Networks.", Proceedings of the 7th ACM international symposium on Modeling, analysis and simulation of wireless and mobile systems, Oct. 4-6, 2004, pp. 149-156.
Staddon, J. et al., "Efficient Tracing of Failed nodes in Sensor Networks", Proceedings of the 1st ACM international workshop on Wireless sensor networks and applications, Sep. 28, 2002, pp. 122-130.
Tanenbaum, A. S., et al., "Introduction to Distributed Systems", Distributed Systems: Principles and Paradigms, Prentice Hall (Jan. 15, 2002), pp. 1-33.
Woo, A. et al., "Taming the Underlying Challenges of Reliable Multihop Routing in Sensor Networks", SenSys., ACM (Nov. 5-7, 2003), 14 pages.
Wood, A. D., et al., "Denial of Service in Sensor Networks", Cover Feature, IEEE Computer, vol. 35, Oct. 2002, pp. 48-56.
Ganesan, D., et al., "Highly-Resilient, Energy-Efficient Multipath Routing in Wireless Sensor Networks.", Mobile Computing and Communications Review, vol. 1, No. 2, 1997, 13 pages.
Langendoen, K., et al., "Murphy loves potatoes: experiences from a pilot sensor network deployment in precision agriculture", IPDPS 20th International Parallel and Distributed Processing Symposium (Jun. 26, 2006), 8 pages.
Mainwaring, A., et al., "Wireless sensor networks for habitat monitoring.", In WSNA'02: Proceedings of the 1st ACM international workshop on Wireless sensor networks and applications, New York, NY, USA, ACM Press, Sep. 28, 2002, pp. 88-97.
Martinez, K, et al., "Glacial environment monitoring using sensor networks.", REALWSN (Jun. 21, 2005), 5 pages.
Rost, S., et al., "Memento: A health monitoring system for wireless sensor networks", SECON, vol. 2 (Sep. 28, 2006), pp. 1-10.
Szewczyk, R., et al., "Lessons from a sensor network expedition", In EWSN, 2004, pp. 307-322.
Tateson, J., et al., "Real world issues in deploying a wireless sensor network for oceanography", In RealWSN' 05, 2004, 6 pages.
Tolle, G., et al., "A Macroscope in the redwoods", In SenSys'05: Proceedings of the 3rd international conference on Embedded networked sensor systems, Nov. 2-4, 2005, pp. 51-63.
Szewczyk, R., et al., "An analysis of a large scale habitat monitoring application", In SenSys'04: Proceedings of the 2nd international conference on Embedded networked sensor systems (Nov. 3-5, 2004), pp. 214-226.
Graham, Steve, et al, "Web Services Base Notification 1.3", OASIS Standard (Oct. 1, 2006), pp. 1-68.
Ramanathan, N., et al., "Sympathy: a debugging system for sensor networks", In IEEE International Conference on Local Computer Networks, 2004, 2 pages.
Benatallah, Boualem, "Facilitating the Rapid Development and Scalable Orchestration of Composite Web Services", 2005 Springer Science + Business Media, Inc., pp. 1-33.
Casati, Fabio, et al, "Specification and Implementation of Exceptions in Workflow Management Systems", ACM Transactions on Database Systems, vol. 24, No. 3, Sep. 1993, pp. 405-451.
Hwang, San-Yih, et al, "Personal Workflows: Modeling and Management", MDM 2003, LNCS 2574, pp. 141-152.

Sheng, Quan Z.., et al, "Enabling Personalized Composition and Adaptive Provisioning of Web Services", CAiSE 2004, LNCS 2084, pp. 322-337.

Tolksdorf, Robert, "Coordination Technology for Workflows on the Web: Workspace", Coordination 2000, LNCSs 1906, Springer-Verlag Berlin Heidelberg 2000, pp. 36-50.

Anke, J. et al., "A Service-Oriented Middleware for Integration and Management of Heterogeneous Smart Items Environments", Proceedings of the 4th MiNEMA Workshop, Jul. 2006, pp. 7-11.

Anke, J. et al., "A Planning Method for Component Placement in Smart Item Environments Using Heuristic Search", Proceedings 7th IFIP WG 6.1 International Conference, Distributed Applications and Interoperable Systems, Jun. 2007, pp. 309-322.

Anke, J. et al., "Cost-based Deployment Planning for Components in Smart Item Environments", IEEE Conference on Emerging Technologies and Factory Automation, Sep. 2006, pp. 1238-1245.

Non-Final Office Action Received for U.S. Appl. No. 11/443,549, mailed on Aug. 13, 2009, 18 pages.

Yoonhee, K. et al., "Wapee: A Fault-Tolerant Semantic Middleware in Ubiquitous Computing Environments", Proceedings of EUC Workshops, 2006, pp. 173-182.

Paradis, L. et al., "A survey of Fault Management in Wireless Sensor Networks", Journal of Network and systems management, Kluwer Academic Publishers, NE, vol. 15 No. 2, Mar. 13, 2007, pp. 171-190.

Wiemann, M. et al., "A Service and Device Monitoring Service for Smart Items Infrastructures", Third International Conference on Wireless and Mobile Communications 2007, ICWMC, 6 pages.

Non-Final Office Action Received for U.S. Appl. No. 11/396,299, mailed on Jul. 9, 2009, 15 pages.

Non-Final Office Action received for U.S. Appl. No. 11/444,119, mailed on Feb. 27, 2009, 23 pages.

Non Final Office Action Received for U.S. Appl. No. 11/444,119, mailed on Aug. 28, 2009, 19 pages.

US 7,752,304, 07/2010, Bornhoevd et al. (withdrawn).

Office Action for Japanese Patent Application No. 2006-314565 (with English Translation), mailed Feb. 12, 2010, 9 pages.

Graupner, S., et al, "A Framework for Analyzing and Organizing Complex Systems", Hewlett Packard, Computer Systems and Technology Laboratory, Feb. 6, 2001, 17 pages.

Second Office Action for Chinese Application No. 200610149270.4 (with English Translation), mailed Mar. 1, 2010, 18 pages.

Office Action for Chinese Application No. 200610149268.7 (with English Translation), mailed Mar. 1, 2010, 16 pages.

Non-Final Office Action for U.S. Appl. No. 11/444,119, mailed Mar. 30, 2010, 59 pages.

Final Office Action received for U.S. Appl. No. 11/396,299, mailed Jan. 28, 2010, 54 pages.

Non-Final Office Action for U.S. Appl. No. 11/283,618, mailed May 24, 2010, 42 pages.

Notice of Allowance for U.S. Appl. No. 11/479,284, mailed May 13, 2010, 30 pages.

Final Office Action for U.S. Appl. No. 11/583,274, mailed Apr. 7, 2010, 45 pages.

US 7,801,983, 09/2010, Bornhoevd et al. (withdrawn).

Ardaiz, et al, "On Service Deployment in Ubiquitous Computing", Proceedings of the 2nd International Workshop on Ubiquitous Computing and Communications, Sep. 2001, 7 pages.

Arkin, et al, "Web Services Business Process Execution Language Version 2.0", Committee Draft, Sep. 2005, 81 pages.

Arkin, et al, "Web Service Choreography Interface (WSCI) Version 1.0", W3C Note, Aug. 2002, 84 pages.

Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.

Box, et al, "Web Services Eventing (WS-Eventing)", Aug. 2004, 16 pages.

Crossbow, "Wireless Sensor Networks: Sensor and Data-Acquisition Boards", 2004 Crossbow Technology, Inc., retrieved on Sep. 13, 2010 from http://web.archive.org/web/20040111135950/http://www.xbow.com/Products/productsdetails.aspx?sid=63, 1 page.

Crossbow, "Stargate: X-Scale Processor Platform SPB 400", retrieved on Dec. 20, 2005 from http://www.xbow.com/Products/productsdetails.aspx?sid=63, 2 pages.

Clement, et al, "UDDI version 3.2, UDDI Spec Technical Committee Draft, OASIS, UDDI Spec TC", Oct. 2004, 420 pages.

Christensen, et al, "Web Services Description Language (WSDL) 1.1", W3C Note, Mar. 2001, 27 pages.

Perkins, "IP Mobility Support for IPv4", Network Working Group, Nokia Research Center, Aug. 2002, 23 pages.

California Software Laboratories, "White Paper: The JetSend Appliance Architecture", retrieved from http://www.calsoftlabs.com/whitepapers/jetsend-architecture.html, 2002, 28 pages.

Davenport, "Process Innovation: Reengineering work through information technology", Harvard Business School Press, 1993, 6 pages.

de Sales, et al, "Towards the UPnP-UP: Enabling User Profile to Support Customized Services in UPnP Networks", Proceedings of the 2008 the Second International Conference on Mobile Ubiquitous Computing, Systems, Services and Technologies, 2008, pp. 206-211.

Decker, et al, "CoBIs Platform Survey and State-of-the-Art Sensor Platforms", CoBIs Deliverable Report, Aug. 2005, 51 pages.

Deering, et al, "Internet Protocol, Version 6 (Ipv6) Specification", Network Working Group, Dec. 1998, 39 pages.

Gauger, "FlexCup—Flexible and Efficient Code Updates for Sensor Networks", Summer School on Wireless Sensor Networks and Smart Objects; Universitat Stuttgart, Aug. 29-Sep. 3, 2005, 8 pages.

Geller, et al, "Web Services Eventing (WS-Eventing)", Aug. 2004, 38 pages.

Gudgin, et al, "SOAP Message Transmission Optimization Mechanism", Jan. 25, 2005, 15 pages.

Guttman, "Service Location Protocol", Version 2, Jun. 1999, 55 pages.

Haas, "Service Deployment in Programmable Networks", PhD Thesis, ETH Zurich, Switzerland, 2003, 253 pages.

Hammer, et al, "Reengineering the Corporation—A Manifesto for Business Revolution", Nicholas Brealey Publishing, May 1994, 14 pages.

Han, et al, "Sensor Network Software Update Management: A Survey", Journal of Network Management, 2005, 26 pages.

Intel Research, "An Introduction to Wireless Sensor Networks", Technical Report, 2004, 6 pages.

Karuppiah, et al, "Design and Implementation of Multihomed IPv6 Testbed Network for Research Community: The Malaysian IPv6 Network Operation Centre Experience", IWS2000, APAN Conference, Tsukuba, 2000, 6 pages.

Kim, et al, "A leader election algorithm in a distributed computing system", 5th IEEE Workshop on Future Trends of Distributed Computing Systems, 1995, 5 pages.

Kiselyov, "Functional XML parsing framework: SAX/DOM and SXML parsers with support for XML Namespaces and validation", 2001, 42 pages.

Lampe, et al, "A ubiquitous computing environment for aircraft maintenance", SAC '04: Proceedings of the 2004 ACM Symposium on Applied Computing, 2004, pp. 1586-1592.

Law, et al, "Assessing Security-Critical Energy-Efficient Sensor Networks", 2002, 10 pages.

Malpani, et al, "Leader election algorithms for mobile ad hoc networks", Proceedings of the 4th international Workshop on Discrete Algorithms and Methods for Mobile Computing and Communications, Aug. 11, 2000, pp. 96-103.

Nochta, et al, "Relocatable services and service classification scheme", Authorization Level: Public (PU) Version 1.0, Feb. 2005, 59 pages.

Nokia, "Nokia Intellisync Device Management", Overview for IT Managers, May 2007, 19 pages.

"OSGI Service Platform", Release 3, IOS Press, Mar. 2003, 602 pages.

Parikh, et al, "Security in Sensor Networks", CS 588: Cryptography, 2001, 28 pages.

Park, "Specification of the Bluetooth System: Wireless connections made easy", Covered Core Package version: 1.2, Nov. 2003, 1200 pages.

Passing, "Profiling, Monitoring and Tracing in SAP WebAS", SAP Library, Jun. 22, 2005, 9 pages.

Phillips, "Aqueduct: Robust and Efficient Code Propagation in Heterogeneous Wireless Sensor Networks", Master's Thesis submitted to the Graduate School of the University of Colorado, 2005, 61 pages.
Postel, "Internet Control Message Protocol", Protocol Specification. Request for Comments RFC 792, Sep. 1981, 21 pages.
Postel, "Internet Protocol", Protocol Specification, Request for Comments RFC 791, Sep. 1981, 51 pages.
Postel, "Transmission Control Protocol", Protocol Specification, Request for Comments RFC 793, Sep. 1981, 91 pages.
Postel, "User Datagram Protocol", Protocol Specification, Request for Comment, RFC 768, Information Sciences Institute, Aug. 1980, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Adaptive Technology for the Networked Enterprise", Feb. 2005, retrieved on Sep. 9, 2010 from http://web.archive.org/web/*/http://www.sap.com/solutions/netweaver/index.epx, 1 page.
SAP, "Security Guide for Mobile Engine 2.1 SP02", SAP Library— SAP Mobile Engine, Dec. 1, 2004, 13 pages.
SAX, "About SAX", Dec. 29, 2004, retrieved on Sep. 9, 2010 from http://web.archive.org/web/20041229165357/http://www.saxproject.org/, 1 page.
Scheer, "Aris-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld des Pervasive Computing, 2004, 29 pages.
Schneier, "Applied Cryptography", 2nd edition, John Wiley & Sons, Inc., 1996, 18 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.
Speiss, et al, "going beyond auto-id—a service-oriented smart items infrastructure", JEIM, Mar. 2007, 9 pages.
Strohbach, et al, "Cooperative Artefacts:Assessing Real World Situations with Embedded Technology", In Proceedings of the 6th International Conference on Ubiquitous Computing, Nottingham, UK, 2004, pp. 250-267.
Sun Microsystems, "Connected Limited Device Configuration", Java™ 2 Platform, Micro Edition (J2MET™) Specification Version 1.1, Mar. 2003, 60 pages.
Sun Microsystems, "Jini Architecture Specification", Version 1.2, Dec. 2001, 26 pages.
Sun Microsystems, "Sun SPOT System: Turning Vision into Reality", Sun SPOT System Project description, 2005, 4 pages.
Talwar, et al, "Approaches for Service Deployment", IEEE Internet Computing, vol. 9(2), Mar.-Apr. 2005, pp. 70-80.
"Universal Plug and Play (UPnP)", Wikepedia, the free encyclopedia, Retrieved on Dec. 20, 2005, from http://en.wikipedia.org/wiki/Universal_Plug_and_Play, 6 pages.
"UPnP Device Architecture 1.0", UPnP Forum, 1999, 80 pages.
van de Loo, et al, "Enterprise Services Design Guide", Version 1.0, SAP, 2005, pp. 1-40.
van der Aalst, "Modelling and analysing workflow using a Petri-net based approach", Proceedings of the 2nd Workshop on Computer-Supported Cooperative Work, Petri nets and related formalisms, 1994, pp. 31-50.
Veizades, et al, "Service Location Protocol. Request for Comments RFC 2165", Network Working Group, Jun. 1997, 72 pages.
VeriSign, "The EPCglobal Network: Enhancing the Supply Chain", VeriSign Technical Report, 2004, 8 pages.
Villanueva, et al, "Context-Aware QoS Provision for Mobile Ad-hoc Network—based Ambient Intelligent Environments", Header Background Image, 12(3), 2006, 13 pages.
Waldo, "The Jini architecture for network-centric computing", Communications of the ACM archive, vol. 42 , Issue 7, Jul. 1999, pp. 76-82.
Wander, et al, "Energy Analysis of Public-Key Cryptography for Wireless Sensor Networks", UC Santa Cruz, Sun Microsystems Laboratories, 2005, 5 pages.
Wang, et al, "Timing Analysis of Real-Time Networked RFID Systems", Cambridge Auto-ID Lab, Cambridge UK, 2004, 4 pages.
Warneke, et al, "Smart dust: Communicating with a cubic-millimeter computer", Computer, 34(1), 2001, pp. 44-51.
Weiser, "The computer for the 21st century", ACM SIGMOBILE Mobile Computing and Communications Review archive, vol. 3 , Issue 3, Jul. 1999, 6 pages.
"Java Native Interface (JNI)", Wikepedia, the free encyclopedia, Retrieved on Dec. 20, 2005, from http://en.wikipedia.org/wiki/Jini, 6 pages.
"Service Location Protocol (SLP)", Wikepedia, the free encyclopedia, Retrieved on Dec. 20, 2005, from http://en.wikipedia.org/wiki/Service_Location_Protocol, 1 page.
Woods, "Enterprise Services Architecture", Galileo Press, 2003, 10 pages.
Koh, et al, "Securing the Pharmaceutical Supply", White Paper, 2003, 19 pages.
Office Action for Chinese Application No. 200710108723.3 (with English Translation), mailed May 21, 2010, 11 pages.
Office Action for Chinese Application No. 200710108722.9 (with English Translation), mailed Jun. 2, 2010, 9 pages.
Non-Final Office Action for U.S. Appl. No. 11/479,284, mailed Oct. 30, 2009, 19 pages.
Final Office Action for U.S. Appl. No. 11/479,284, mailed Jun. 11, 2009, 4 pages.
Notice of Allowance for U.S. Appl. No. 11/479,284, mailed on Oct. 13, 2010, 19 pages.
Notice of Allowance for U.S. Appl. No. 11/479,284, mailed Aug. 11, 2010, 19 pages.
Non-Final Office Action for U.S. Appl. No. 11/583,274, mailed Aug. 5, 2010, 21 pages.
Non-Final Office Action for U.S. Appl. No. 11/583,274, mailed Oct. 7, 2009, 22 pages.
Final Office Action for U.S. Appl. No. 11/444,119, mailed Aug. 24, 2010, 23 pages.
Non-Final Office Action for U.S. Appl. No. 11/284,195, mailed Nov. 1, 2007, 20 pages.
Non-Final Office Action for U.S. Appl. No. 11/443,549, mailed Jan. 6, 2011, 28 pages.
Final Office Action for U.S. Appl. No. 11/443,549, mailed Mar. 17, 2010, 32 pages.
Final Office Action for U.S. Appl. No. 11/284,195, mailed Jun. 25, 2008, 24 pages.
Advisory Action for U.S. Appl. No. 11/284,195, mailed Oct. 9, 2008, 4 pages.
Final Office Action for U.S. Appl. No. 11/283,618, mailed Oct. 5, 2010, 27 pages.
Non-Final Office Action for U.S. Appl. No. 11/496,641, mailed Jul. 29, 2010, 35 pages.
Notice of Allowance for U.S. Appl. No. 11/444,119, mailed Oct. 5, 2011, 17 pages.
Final Office Action for U.S. Appl. No. 11/283,618, mailed Sep. 29, 2011, 32 pages.
Non-Final Office Action for U.S. Appl. No. 11/283,618, mailed Mar. 31, 2011, 33 pages.
Notice of Allowance for U.S. Appl. No. 11/284,195, mailed Mar. 4, 2011, 46 pages.
Notice of Allowance for U.S. Appl. No. 11/284,195, mailed Jun. 27, 2011, 17 pages.
Final Office Action for U.S. Appl. No. 11/443,549, mailed Jun. 22, 2011, 52 pages.
Notice of Allowance for U.S. Appl. No. 11/444,119, mailed Apr. 1, 2011, 25 pages.

Non-Final Office Action for U.S. Appl. No. 11/492,641, mailed Jun. 7, 2011, 37 pages.

Non-Final Office Action Response for U.S. Appl. No. 11/492,641, filed Sep. 7, 2011, 13 pages.

Notice of Allowance for U.S. Appl. No. 11/583,274, mailed Apr. 4, 2011, 28 pages.

* cited by examiner

MODULAR MONITOR SERVICE FOR SMART ITEM MONITORING

TECHNICAL FIELD

This description relates to ubiquitous computing technologies.

BACKGROUND

Smart item technologies may include, for example, radio-frequency identification (RFID) systems, embedded systems, sensor motes, and/or sensor networks, and may be used, for example, to provide business software applications with fast access to real-world data. For example, smart item technologies may be used support the detection, reading, or writing of RFID tags, as well as to support communication with, and control of, wireless sensor networks and embedded systems. In many instances, smart items may include devices having local processing power, memory, and/or communication capabilities, that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart item devices include an RFID tag, which may be passive or active, and which may be attached to a real-world object and used to provide product or handling information related to the object. Other examples of smart item devices includes various sensors, such as, for example, environmental sensors (e.g., a temperature, humidity, or vibration sensor), which, as just referenced, may be capable of communicating to form one or more sensor networks. These and other types of smart item devices also may include embedded systems, which may refer generally to any system in which a special-purpose processor and/or program is included, and/or in which the system is encapsulated in the device being controlled.

Through automatic real-time object tracking, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

SUMMARY

According to one general aspect, a system includes at least a first device configured to collect monitor data associated with at least one device network, using a first instance of a core monitor service and at least a first monitor service module at a first logical layer of a hierarchical, multi-tiered monitor architecture, and at least a second device configured to propagate at least a portion of the monitor data from the first device up through the hierarchical, multi-tiered monitor architecture, using a second instance of the core monitor service and at least a second monitor service module at a second logical layer of the hierarchical, multi-tiered monitor architecture.

Implementations may include one or more of the following features. For example, the at least the first device may includes a smart item device associated with the at least one device network, and the smart item device may be configured to implement the first instance of the core monitor service and the first monitor service module using an edge monitor service at which the monitor data is collected. The at least the second device may include a group leader device associated with the device network, and the group leader device may be configured to implement the second instance of the core monitor service and the second monitor service module using a group leader monitor service at which the monitor data is processed for transmission.

The at least the second device may include a local device associated with the group leader monitor service, and the local device may be configured to implement a third instance of the core monitor service and at least a third monitor service module using a local monitor service at which the processed monitor data may be stored. The at least the second device may include a global device associated with the local monitor service, and the global device may be configured to implement a fourth instance of the core monitor service and at least a fourth monitor service module using a global monitor service at which the stored monitor data is used to update global monitor data.

The core monitor service may include one or more of a system landscape database configured to store known monitor data associated with the at least one device network, a heartbeat transmitter configured to transmit a heartbeat signal from the first device to the second device, a ping requester configured to test for a connection of a lower-level device, a query router configured to route queries for monitor data to a lower-level instance of the core monitor service, and an update notification transmitter configured to transmit notifications of changes in a landscape of the hierarchical, multi-tiered monitor architecture. The core monitor service may be associated with a module manager that is configured to select and implement the first monitor service module from among a plurality of monitor service modules, and wherein each of the plurality of monitor service modules may include a common interface for communicating with the core monitor service.

The first monitor service module may include a system adaptor that may be configured to collect service metadata associated with a service on the first device and/or device metadata associated with the first device. The first monitor service module may include a communication adaptor configured to conduct communications for the first instance of the core monitor service.

The second monitor service module may include a data storage module configured to provide the second instance of the core monitor service with storage of the at least a portion of the monitor data. The second monitor service module may include a data pre-processor module that may be configured to process the monitor data to obtain the at least a portion of the monitor data, the processing including one or more of filtering or aggregating the monitor data.

According to another general aspect, an instance of a core monitor service is provided on each of a plurality of tiers of a hierarchical, multi-tiered monitor architecture associated with at least one device network, the core monitor service associated with collecting monitor data associated with the at least one device network. At least one monitor service module is provided on at least one of the plurality of tiers, the at least one monitor service module configured to communicate with the core monitor service to propagate at least a portion of the monitor data upward through the hierarchical, multi-tiered monitor architecture from the at least one device network.

Implementations may include one or more of the following features. For example, the at least one monitor service module may include a system adaptor configured to collect service metadata associated with a service and/or device metadata associated with a device. An edge monitor service deployed on each of a plurality of devices of the at least one device network may be polled, the edge monitor service including the core monitor service and the system adaptor. Heartbeat messages received from the plurality of devices may be processed using at least one group leader monitor service, the group leader monitor service including the core monitor service and a first data pre-processing monitor service module.

Heartbeat messages received from the at least one group leader monitor service may be processed using at least one local monitor service, the local monitor service including the core monitor service, a second data pre-processing monitor service module, and a data storage service module. Heartbeat messages received from the at least one local monitor service may be processed using a global monitor service, wherein the local monitor service is configured to transmit a delta synchronization message to the global monitor service to update global monitor data stored in association therewith.

According to another general aspect, a system includes a service repository configured to store a core monitor service and a plurality of monitor service modules, wherein the core monitor service and the plurality of monitor service modules are associated with obtaining monitor data from at least one device network, a system mapper configured to deploy instances of the core monitor service onto at least two tiers of a hierarchical, multi-tiered architecture associated with obtaining the monitor data, and further configured to deploy at least one monitor service module onto at least one tier of the hierarchical, multi-tiered architecture, and a system monitor comprising the instances of the core monitor service and the at least one monitor service module, the system monitor configured to propagate at least a portion of the monitor data through the hierarchical, multi-tiered architecture from the device network.

Implementations may include one or more of the following features. For example, the system mapper may be configured to deploy the at least one monitor service module onto at least one tier of the hierarchical, multi-tiered architecture, based on device metadata associated with a device implementing the at least one tier.

The at least one monitor service module may include a plurality of monitor service modules sharing a common interface for communicating with the core monitor service. The at least one monitor service module may include one or more of a system adaptor module, a communications adaptor module, a data storage module, or a data pre-process module.

The service mapper may be configured to deploy the core monitor service to a device associated with the device network, and the system monitor may be configured to provide static metadata associated with the device to the service mapper, using the core monitor service, and the service mapper may be configured to deploy the monitor service module to the device, based on the static metadata. The system monitor may include a composite monitor service deployed across the hierarchical, multi-tiered architecture, the composite monitor service including, at a corresponding tier of the architecture: an edge monitor service configured to collect raw monitor data associated with the device network, a group leader monitor service configured to receive and process the raw monitor data, a local monitor service configured to receive, further process, and store the processed monitor data, and a global monitor service configured to receive a delta synchronization message from the local monitor service and to update global monitor data based thereon.

The details of one or more implementations are set forth in the accompanying drawings and the description below. Other features will be apparent from the description and drawings, and from the claims.

DETAILED DESCRIPTION

Figure 1:
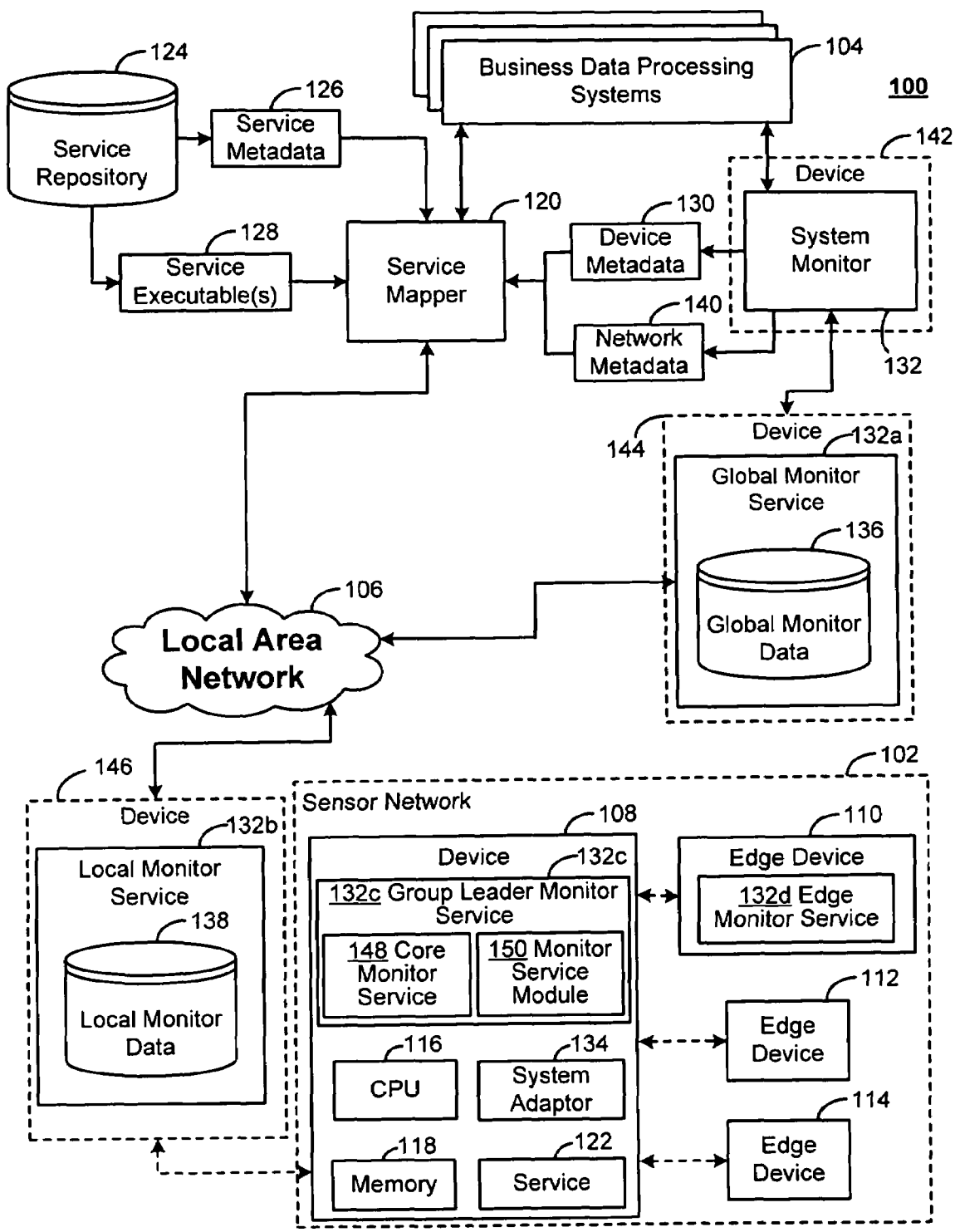
FIG. 1 is a block diagram of a system for monitoring smart items.

FIG. 1 is a block diagram of a system 100 for monitoring smart item devices. In the example of FIG. 1, a sensor network 102 that includes various smart item devices provides real-world data to one or more business data processing systems 104 in a timely and accurate manner, using a local area network 106 (although other sizes or types of networks may be used). For example, the sensor network 102 may include smart item devices 108, 110, 112, and 114, referred to herein as "smart item devices" or simply as "devices" (or similar terminology), which may include, for example, RFID readers (for reading RFID tags associated with real-world objects having an RFID tag), various embedded systems, and/or various types of sensors and/or sensor motes.

Although the following description refers primarily to the sensor network 102 or other sensor network(s) as an example implementation(s), it should be understood that such sensor networks may refer to any network that gathers or obtains information, even if not all of the devices of the sensor network do not have specific sensor functionality associated therewith (e.g., one of the devices of the sensor network 102 may include an actuator). Moreover, it should be understood that virtually any network of devices may be used, alone or in conjunction with one another. Further, devices of such device networks may communicate with one another (e.g., in a peer-to-peer fashion), and/or may communicate, e.g., through appropriate middleware, with the business data processing systems 104, or other systems.

In FIG. 1, the device 108 is illustrated as including a central processing unit (CPU) 116, as well as a memory 118. Thus, the device 108 should be understood to be capable of various levels of computing capabilities, including, for example, processing or transmitting sensed data (e.g., in the case where the device 108 includes, or is associated with, a sensor). Although not specifically illustrated in FIG. 1 for the sake of clarity, it should be understood that the devices 110, 112, and 114 also may include the same or different computing capabilities, including, for example, the capability to form and participate in the sensor network 102, such as a wireless network and/or a peer-to-peer network.

Thus, the sensor network 102 may be used to collect, process, filter, aggregate, or transmit data that may be useful to the business data processing systems 104. For example, the business data processing systems 104 may include inventory management systems, supply chain management systems, retail store management systems, warehouse management systems, and any other system(s) that may be used to execute business processes with respect to real-world objects, where such real-world objects may include, for example, products for sale, pallets or other shipment elements, patients, or manufacturing materials/equipment. By tracking and analyzing such real-world objects, the business data processing systems 104 may be used, for example, to determine inventory levels, set pricing levels, evaluate marketing strategies, evaluate manufacturing or production technologies, reduce theft, or maintain safety.

By including smart item devices as, or in association with, the devices 108, 110, 112, and 114 of the sensor network 102, processing may be performed very early in the data-collection process(es), so that a burden placed on the business data processing applications 104 may be reduced or eliminated. For example, the business data processing applications 104 may be located at a corporate headquarters, and the sensor network 102 may represent one of many (types of) networks that may be dispersed across a large geographical region connected by the wide area network 106. As such, for example, the business data processing systems 104 may only require certain sub-sets or characterizations of data collected by the network 102 (and related networks), and may not need or want all collected data.

In some implementations, the business data processing systems 104 may include compound or composite applications that are made from re-usable software components or services that are designed to perform some well-defined task(s). Also, in these or other implementations, the business data processing systems 104 may include legacy applications that may not easily communicate with data-collection devices (or with other business data processing systems), and, in such cases, services or service components may be provided as interfaces between the legacy applications and the data collection devices and/or other systems. The system 100 allows these and other applications and services to be deployed directly on the devices 108, 110, 112, and 114, so that, for example, services may be run on the devices (and data may be collected and/or processed) in a timely, efficient, reliable, automated, cost-effective, and scaleable manner. Thus, for example, business processes may be decomposed into individual services and deployed at different devices.

The system 100 includes a service mapper 120 that is operable to select the device 108 as a selected device from among the plurality of devices 108, 110, 112, and 114 of the sensor network 102, for deploying a service 122 thereon, as shown. In so doing, the service mapper 120 accesses a service repository 124 that is operable to store a plurality of services that are eligible for execution within the sensor network 102 and/or other networks (not shown in FIG. 1). The service mapper 120 determines service metadata 126 along with an actual service executable 128, and compares the service metadata 126 against device metadata 130 associated with each of the plurality of devices 108, 110, 112, and 114. Based at least on the service metadata 126 and the device metadata 130, the service mapper 120 may select the device 108 as being particularly well-suited for deployment of the service 122 (including the service executable 128) thereon.

For example, the device metadata 130 may include a description of each device, the description being constructed according to an ontology and/or schema that is known to the service mapper 120 and common to the various devices 108, 110, 112, and 114. Additionally, or alternatively, the device metadata 130 may be collected in a device-specific format or structure for each of the devices 108, 110, 112, and 114, e.g., by a system monitor 132, and may thereafter be converted into such a common schema for use by the service mapper 120. For example, the device metadata may include a description of various technical capabilities of the devices 108, 110, 112, and 114, provided in an eXtensible Markup Language (XML)-based language, e.g., by using an XML schema, as described in more detail, below. Of course, other formats, languages, and/or structures may be used, as well.

More generally, the device metadata 130 may include, for example, a device description, a software description, a hardware description, and a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of the CPU 116 (e.g., name and/or speed), memory 118 (e.g., total and/or free amount of memory), or connection capabilities (e.g., connection speed or connection type) of the device(s). The device status may include more volatile information, including a device location, current CPU usage, or remaining power or memory. Of course, other device aspects or information may be included in the device metadata 130, as described below and/or as would be apparent. For example, the device metadata 130 may include information about other devices, such as where the device 108 includes an RFID reader, and the device metadata 130 may include a description of types of RFID tags that may be read and/or written to by the RFID reader.

The service metadata 126 may somewhat analogously include various service descriptions and/or requirements that relate to whether and how the service(s) may be executed on one or more devices. For example, the service metadata may include a service behavior description, technical constraints of the service, or information regarding input, output, preconditions, or effects (IOPE) of the service. For example, technical constraints may include a required CPU type or speed, an amount of (free) memory that is needed, a type or speed of connection that is required or preferred, an operating system version/name/description, or a type or status of a battery or other device power source(s).

Thus, as with the device metadata 130, distinctions may be made between static and dynamic service requirements, such as hardware requirements. For example, a static value such as a total memory or maximum processing speed required by a service may be included, along with dynamic values such as available memory/processing/power and/or a number or type of other services that may be allowed to concurrently run on a device together with the service(s) in question, at an execution time of the service(s).

Using at least the service metadata 126 and the device metadata 130, the service mapper 120 may map a given service onto the devices 108, 110, 112, or 114 of the sensor network 102. Such a mapping is designed not only to value-match various aspects of the service metadata 126 and the device metadata 130, where necessary (e.g., matching a required memory specified in the service metadata 126 with a device memory specified in the device metadata 130), but also to enable and optimize a deployment and execution of the service in question. For example, it may be the case that both the device 108 and the device 110 are nominally or ostensibly capable of running the service 122 (e.g., both devices 108 and 110 may posses some minimum required values of memory, processing capabilities, or power). However, it may be the case that the service 122 is more power-hungry than memory-hungry (or vice-versa), so that the service mapper 120 may map the service 122 to the device 108 if the device 108 is currently able to provide more power relative to the other candidate device 110, even if the device 110 currently provides more free memory than the device 108.

Once an appropriate service mapping has been performed, a service injector (not shown in FIG. 1) may be used to install and start the mapped service (e.g., the service 122) on the device 108. Such a service injector also may be used, for example, to manage a life cycle of the service(s), e.g., by performing service updates or stopping the service when necessary.

As referenced above, during run-time of the system 100, the system monitor 132 is configured to determine, track, and/or provide a current state of the system 100. Such state information may include, for example, which of the devices 108, 110, 112, 114 are currently available for service deployments, or what services are currently running on which of the devices 108, 110, 112, 114. More generally, the system monitor 132 may detect and collect device metadata 130, including static, discrete-dynamic, or continuous dynamic device metadata, as described in more detail, below, as well as network metadata 140 related to the sensor network 102, also described in more detail, below. As should be apparent, monitor data such as the device metadata 130 and/or the network metadata 140 may thus be made available to the service mapper 120, the business data processing systems 104, and/or to a system administrator.

In the example of FIG. 1, the system monitor 132 is implemented using a four-tier architecture to provide for a scalable, distributed monitoring service(s). That is, the system monitor 132 may be implemented using one or more monitoring services, where the monitoring services may be stored in the service repository 124, and may be mapped, in whole or in part, to the sensor network 102 (and to devices associated with the sensor network 102) by the service mapper 120. Such a four-tier architecture may be used in conjunction with algorithms described herein, so as to efficiently gather monitor data in a distributed system landscape, such as that of the system 100.

Such monitor data may include, for example, the device metadata 130 (which may include, for example and as described herein, connectivity information, battery life, or CPU/memory usage of the devices 108, 110, 112, 114) and/or the network metadata 140. The network metadata 140 may include, for example, various network parameters, particularly where such parameters are dynamic and not necessarily discernable from information about any single device. One such example of the network metadata 140 may include available bandwidth on the sensor network 102. Other examples include network topology information, mobility characteristics of the network as a whole, and reliability of network connections.

In some implementations, as described herein, such monitor services may be implemented using a modular approach, in which a core monitor service is mapped to one or more devices included in, or associated with, the sensor network 102. Then, additional monitoring-related functionality may be provided to such devices using plug-ins, add-on services or service components, or other service modules, which interact with the core monitor service. As should be understood, the core monitor service(s) and any supplemental monitor services may be mapped, for example, using the service mapper 120 and based on, for example, application-specific requirements and relevant device metadata (e.g., capabilities). In additional or alternative implementations, various protocols may be used to register new devices and deployed monitor service(s) with the distributed monitoring service(s) in a fast, secure, energy-efficient, and reliable manner, even as devices join or leave the sensor network 102.

In the example of FIG. 1, then, the above-referenced four-tier architecture includes four types or classes of monitor services, which may be hierarchically layered. Specifically, the uppermost tier (also referred to herein as the global layer), includes a global monitor service (GMS) 132a. The global monitor service 132a provides a highest-level storage and view of monitor data, not just for the sensor network 102, but potentially for a plurality of sensor networks (see, e.g., FIG. 2). Thus, for example, the global monitor service 132a may provide a central contact point for system monitoring information for other system components (e.g., the service mapper 120), the business data processing system(s) 104, a system administrator, and/or a system administration graphical user interface (GUI). Global-level monitor data may be stored in a memory represented in FIG. 1 by global monitor data 136, which may thus be considered to represent or include global device metadata describing devices of the sensor network 102 and other networks, at least at a high level, as well as current service information about which services are running on which networks, for example.

The global monitor service 132a is conceptually above, and updated by, a second layer or tier, referred to herein as the local layer or local tier, and including a local monitor service(s) 132b. The local monitor service 132b is configured to provide the global monitor service 132a with information about changes in the underlying sensor network 102. Thus, the local monitor service 132b may be configured to use a memory represented in FIG. 1 as local monitor data 138 to store more detailed monitor data about the devices 108, 110, 112, 114 in the sensor network 102 than may practically be stored in association with the global monitor service 132a (and the global monitor data 136). It should thus be understood that the local monitor service 132b may be responsible for one or more sensor networks or other device clusters, and that such networks/devices may include potentially heterogeneous devices deployed in relatively close physical proximity to one another. Thus, the local monitor data 138 may be considered to represent local device metadata regarding networks within the purview of the local monitor service 132, such as the sensor network 102, where it should be understood that the local monitor data 138 may generally be more specific than the global monitor data 136 with regard to particular devices of the sensor network 102, and other supervised networks.

The third layer or tier includes a group leader monitor service 132c, which may be configured for the collection, filtering, and aggregation of monitor data for the devices 108, 110, 112, and 114. In various implementations described herein, the group leader monitor service 132c may be configured to manage collection of monitor data from associated devices 108, 110, 112, 114 by using, for example, polling or heartbeat techniques. The group leader monitor service 132c is then responsible for reporting the resulting monitor data back to its respective local monitor service 132b. In the example of FIG. 1, the group leader monitor service 132c does not store monitor data, due to, for example, limited resources at the device 108, or because a rate of change of the monitor data processed by the group leader monitor service 132c makes storage impractical. Thus, the group leader monitor service 132c may be considered to present group-level device metadata regarding the particular devices 108-114 within its group, including, for example, dynamic or static device characteristics, or information about which services are running on which of the devices 108-114.

The fourth layer or tier of the example four-tier architecture of FIG. 1 includes an edge monitor service 132d. In the example of FIG. 1, the edge monitor service 132d collects the monitor data for its associated device (here, the device 110) and the local services of the associated device. That is, it should be understood that, just as the device 108 is illustrated as executing the service 122, the device 110 also may be executing one or more services, and the edge monitor service 132d may be configured, for example, to monitor information about such services, as well as to monitor static or dynamic data specific to the device 110 itself (e.g., total memory, currently-available memory, device type, and/or other device characteristics). The edge monitor service 132d is further configured to report collected monitor data to the group leader monitor service 132c. Thus, the edge monitor service 132d provides edge-level device metadata about a particular, (usually single) device, such as the device 110.

In the above-described architecture, the monitor services 132a-132d may be configured to be responsible for different tasks, and may generally become more lightweight towards the edge of the infrastructure of the system 100. Consequently, for example, the edge monitor service 132d may be implemented on the device 110, which may have very limited computing capabilities, while the global monitor service 132a may be implemented on a device(s) 142 and/or 144, such as, for example, a personal computer (PC) or a similarly-powerful server machine. Meanwhile, the local monitor service 132b may be implemented, for example, on a device 146, such as, for example, a smart RFID reader, or a personal digital assistant (PDA). The group leader monitor service 132c may be deployed, as shown in FIG. 1, on one of the devices of the sensor network 102 (although it should be understood that the devices 108, 110, 112, 114 may be heterogeneous devices having differing computing capabilities, so that the device 108 may be selected as the group leader based on, for example, its relatively-superior resources), or the group leader monitor service 132c may be deployed, in another example, on a wireless access point that is in communication with the devices 110, 112, and 114. A number of different examples of how the monitor services 132a-132d may be physically deployed on some or all of the various devices 108-114, 142, 144 and/or 146, as well as other devices, are provided below with respect to FIGS. 2-3.

Some or all of the monitor services 132a-132d may be implemented using a core monitor service 148 for certain fundamental monitoring functionality, in conjunction with a plurality of potential plug-ins, attachments, service components, or other modules, represented in FIG. 1 by the monitor service module 150. In this way, for example, the monitor service module 150 may be associated with the core monitor service 148 within the devices 108 (and, analogously, although not shown in FIG. 1, within devices 142, 144, 146, and 110-114), such that the core monitor service 148, which may be very slim so as to run on small or resource-poor devices, may be specialized/extended according to application-specific needs and/or the capabilities of the respective devices. Accordingly, for example, functionality related to communication, data storage, or data preprocessing may be added or replaced to a given device without changing the core monitor service 148. Although not shown specifically in FIG. 1, examples of uses of core monitor service(s) and associated monitor service modules are discussed in more detail with respect to FIGS. 6-14.

During operation, the system 100 may gather monitor data, including, for example, the device metadata 130 or the network metadata 140, using the following example algorithm. Specifically, the monitor data may be gathered at the group leader monitor service 132c, from which it is propagated to the local monitor service 132b, and then to the global monitor service 132a. To gather data, the group leader monitor service 132c may execute a system adaptor 134, which may itself be, for example, a service mapped to the device 108 from the service repository 134 by the service mapper 120. The system adaptor 134, which may conceptually represent a plurality of different types of adaptors, and which also may be considered to be an additional or alternative example of the monitor service module 150, may be configured to interface with the service 122, and thereby may gather data from or about the service 122. In other examples, the system adaptor 134 may represent a device adaptor that is configured to interface with the components of the device 108, e.g., the CPU 116 or the memory 118, so as to provide, for example, hardware-specific information related to the device 108.

Thus, to gather data, the group leader monitor service 132c may execute the system adaptor(s) 134, which thereby serve as data sources to provide the monitor data regarding devices and services. For example, in example of FIG. 1, the monitor data may include information about the device 108, and/or about the service 122. Via, for example, heartbeat messages, the monitor data is sent to upper tiers, e.g., via the local monitor service 132b to the global monitor service 132a. In example implementations, the group leader monitor service 132c collects monitor data from the edge devices 110, 112, 114. Specifically, each of the edge devices 110, 112, 114 may be associated with its own monitor service, e.g., the edge monitor service 132d of the edge device 110. As should be understood, and as described in more detail below, any of the monitor services 132a-132d may be implemented using (instances of) the core monitor service 148, along with various examples and types of the monitor service module 150.

The group leader monitor service 132d and the local monitor service 132b may be configured to perform message aggregation, in which messages from different devices (e.g., from different group leader devices, and/or from different edge devices) are summarized into a single message. At each of the group leader monitor service 132c, the local monitor service 132b, and the global monitor service 132a, the monitor data may be preprocessed (e.g., filtered or aggregated), and such pre-processors may be performed by the monitor service module 150, or a similar module. Accordingly, an amount of monitor data that is passed to the global monitor service 132a may be reduced.

In the architecture of the system 100 of FIG. 1, then, (updated) monitor data is propagated up from lower to higher tiers, e.g., from the edge monitor service 132d to the global monitor service 132a. As shown, the monitor data may be stored in various forms and to various extents, within different ones of the tiers/layers. For example, as shown, data may be stored at the global monitor data 136, and/or at the local monitor data 138, where it should be understood that the local monitor service 132b and the local monitor data 138 (and the device 146) may represent multiple services, memories, and devices associated with the system 100 (see, e.g., FIGS. 2-4).

Various techniques may be used to determine the type and extent of the monitor data that is to be stored (or not stored) at a given one of the tiers of the architecture of the system 100 of FIG. 1. For example, decisions on whether and where to store monitor data may be based on battery lifetime, memory availability, device reliability, network utilization, response times, and outdated information (e.g., there may be a requirement to keep certain types of monitor date up-to-date to a specified extent). For example, the device 146 associated with the local monitor service 132b may have a certain amount of available memory, while another device (not shown) may implement another local monitor service associated hierarchically with the global monitor service 132a, and which may have a relatively-significant amount of free memory.

One aspect of whether to store monitor data at a given location (e.g., at the local monitor data 138 or the global monitor data 136) relates to a priority of the monitor data. For example, information such as a device ID, a device classification, and alive-status may have a high priority for being stored. Another aspect relates to a nature of the monitor data. For example, static and discrete-dynamic data from the group leader monitor service 132c may be stored when queried, so that often-queried monitor data is read less often (e.g., is effectively cached at the local monitor data 138). As another example, (potentially) outdated data must be managed, so as to be updated, as necessary. Meanwhile, continuous-dynamic data may not be stored, since it may be outdated as soon as it is stored. Therefore, continuous-dynamic data may simply be read (e.g., queried) from the relevant device, as needed.

The decision of whether and how to store monitor data at a given location may be made dynamically, e.g., by evaluating an expression that incorporates aspects such as, for example, hardware capabilities needed for the storage, a proximity of the storage location to the sensor, or a type of information to be stored. For example, each device (e.g., the device 146) may compute a value, based on, e.g., an associated hardware profile, response time(s) for a query, a distance to the edge device(s) 110-114, a data priority, and/or a dynamic type of the data (e.g., static, discrete-dynamic, or continuous-dynamic). The resulting value may be defined using a mathematical expression (implemented, for example, during registration of a particular service or device, where an example of such registration is described in more detail, below, with respect to FIG. 7B and FIGS. 15-17), in which the considered aspects are represented numerically and weighted for subsequent combination and comparison to a defined threshold. An example of such an expression is shown in Eq. (1):

$$\text{Device-capability-describing value} = (\text{residual lifetime}) \times w_1 + (\text{CPU speed}) \times w_2 + (\text{CPU utilization}) \times w_3 + (\text{memory size}) \times w_4 + (\text{memory utilization}) \times w_5 + (\text{network bandwidth}) \times w_6 + (\text{network utilization}) \times w_7 + (\text{device classification}) \times w_8 + (\text{kind of information}) \times w_9 \quad \text{Eq. (1)}$$

In addition to the dynamic/automatic approach just described, a manual storage decision may be made. For example, a system administrator may want to define types or instances of monitor data that should or should not be stored on designated device(s). For example, an administrator may have the authority to overrule the automated decision, above, and define additional or alternative storage rules. Such manual decisions may be made, for example, for each specific device, or for each device type, or based on the type/role of each monitor service (e.g., all local monitor services 132b may be required to store certain types of monitor data).

Finally with respect to FIG. 1, and again as described in more detail herein, e.g., with respect to FIGS. 7B and 15-17, it should be understood that a monitor service(s) (and associated device(s)) may leave or join a network. For example, the device 110 may initially not be a part of the sensor network 102, and may be a mobile or portable device that may be moved from one location to another. As such, the device 110 may be transported to a location of the sensor network 102, and the device 110 (e.g., the edge monitor service 132d) may try to register at the group leader monitor service 132c, or at any device that is itself connected to the global monitor service 132a. Accordingly, a dedicated protocol may be used for such registration, so that devices and monitor services may easily or automatically be configured to leave one sensor network and join another. Examples of such dedicated protocols are discussed in more detail, below, with respect to FIGS. 15-17

Figure 2:
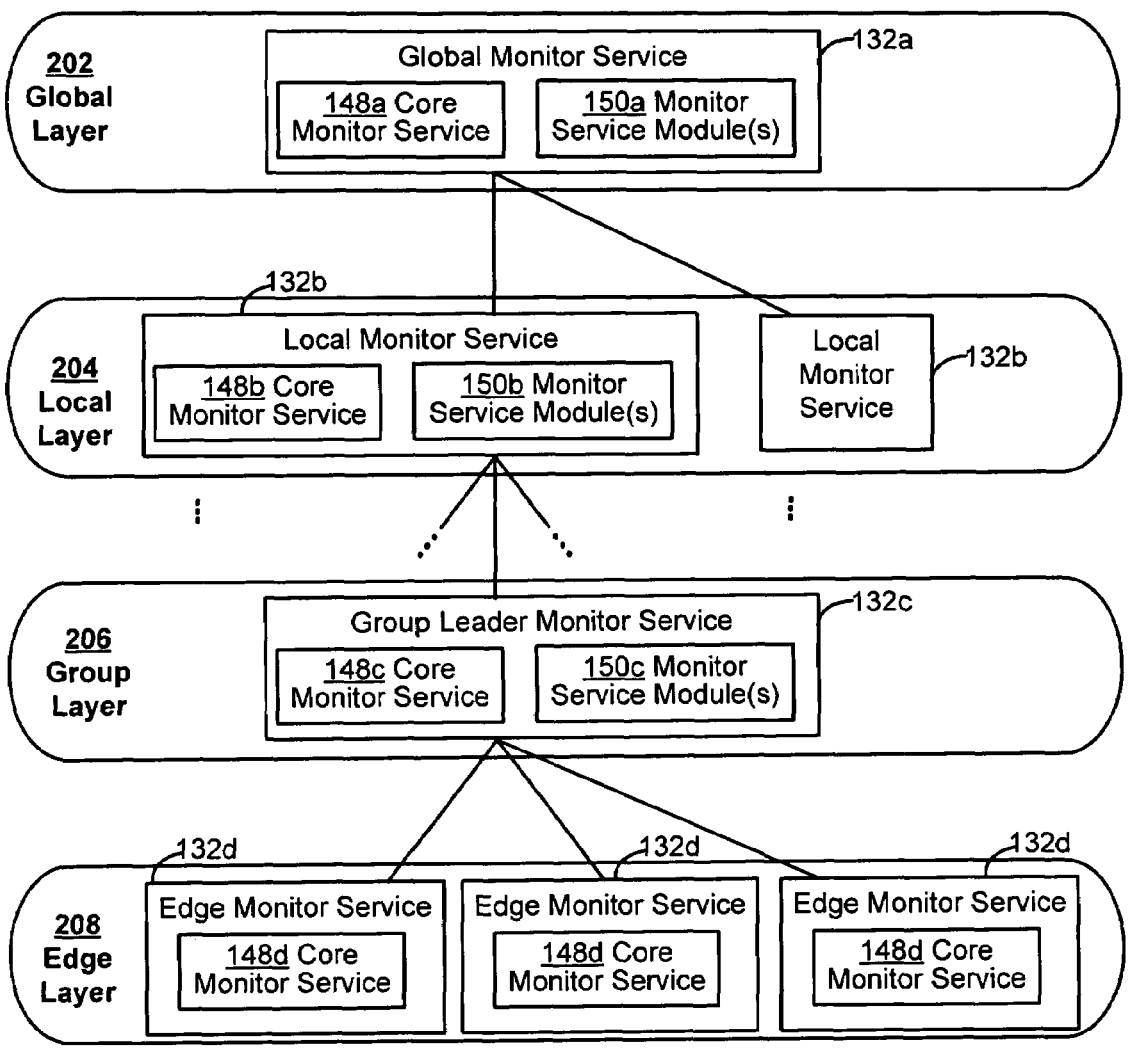
FIG. 2 is a block diagram illustrating an example deployment of the system of FIG. 1.

FIG. 2 is a block diagram 200 illustrating an example deployment of the system 100 of FIG. 1. FIG. 2 illustrates that, as described above, the system 100 may be deployed across four conceptual tiers or layers, which are represented in FIG. 2 as a global layer 202, a local layer 204, a group layer 206, and an edge layer 208. As should be understood from the description of FIG. 1, the layers 202-208 have different tasks, and are each associated with their respective type of monitor service (e.g., the global monitor service 132a, the local monitor service 132b, the group leader monitor service 132c, and the edge monitor service 132d). Each type or class of monitor service may be associated with a physical device (e.g., the device 144, 146, 108, and 110 of FIG. 1) based on the capabilities of the device(s). As a result, for example, the relatively light-weight edge monitor service 132d may run on a device, e.g., a sensor mote, with very limited computing capabilities, while the global monitor service 132a may run on a device with significantly more computing resources, e.g., a PC or server.

In some example implementations, and as shown in FIG. 1, the above-referenced variations in the monitor services 132a-132d may be achieved by way of a modular deployment of the monitor services 132a-132d. For example, the edge monitor service 132d may be deployed at the edge layer 208 using only an instance of the core monitor service 148, shown as core monitor service 148d in FIG. 2.

Meanwhile, the group leader monitor service 132c may be deployed using an instance of the core monitor service 148c, along with an instance of a monitor service module 150, shown in FIG. 2 as the monitor service module(s) 150c. That is, it should be understood that the monitor service module 150c may represent one or more monitor service modules, where the monitor service modules are configured to implement the monitoring functionality described above with respect to the group leader device 108 of FIG. 1. For example, the monitor service module 150c may be associated with aggregating monitor data (e.g., messages) received from all of the edge monitor services 132d of the edge layer 208, for reporting thereof to the local monitor service 132b.

Along similar lines, the local monitor service(s) 132b of FIG. 2 may include the core monitor service 148b, as well as the monitor service module(s) 150b, where the monitor service module 150b may be configured to implement functionality associated with the local layer 204 (e.g., storage of monitor data in the local monitor data 138, or updating of the global monitor data 136). Finally, and similarly, the global monitor service 132a may include the core monitor service 148a, along with the global layer-specific monitor service module(s) 150a.

It should be understood that FIG. 2 is merely an example, and that many variations are possible. For example, in some examples, the core monitor services 148a-148d may be identical or substantially identical, while in other examples, there may be substantial differences. For example, the core monitor services 148a and 148b may be different from the core monitor services 148c and 148d, and, for example, may include functionality associated with data storage that is not required by the core monitor services 148c and 148d, rather than relying on monitor service modules 150a and 150b for this functionality. In other examples, the global monitor service 132a may be implemented in an integrated, non-modular manner, while the remaining monitor services 132b-132d may use the modular construction described herein. Template(s) for the core monitor services 148a-148d may be stored in the service repository 124, so that the devices 144, 146, 108, 110 may receive instances of the core monitor services 148a-148d, as instantiated for deployment, e.g., by the service mapper 120.

FIG. 2 also illustrates a hierarchical nature of the system 100. That is, in FIG. 2, the global monitor service 132a is maintained over, and in communication with, a plurality of local monitor services 132b, each of which may itself be maintained over, and in communication with, a plurality of group leader monitor services 108. Finally, as already illustrated in FIG. 1, each group leader monitor service 132c may be maintained over, and in communication with, a plurality of edge devices 132d.

In FIG. 2, as contemplated in the example of FIG. 1, it may be the case that each monitor service 132a-132d is deployed on a single physical device. More generally, however, it may be the case that a plurality of (types of) physical systems or devices are associated with one of the logical tiers or layers 202-208. Conversely, it may be the case that a plurality of the layers 202-208 may be associated with a single (type of) physical system or device.

Figure 3:
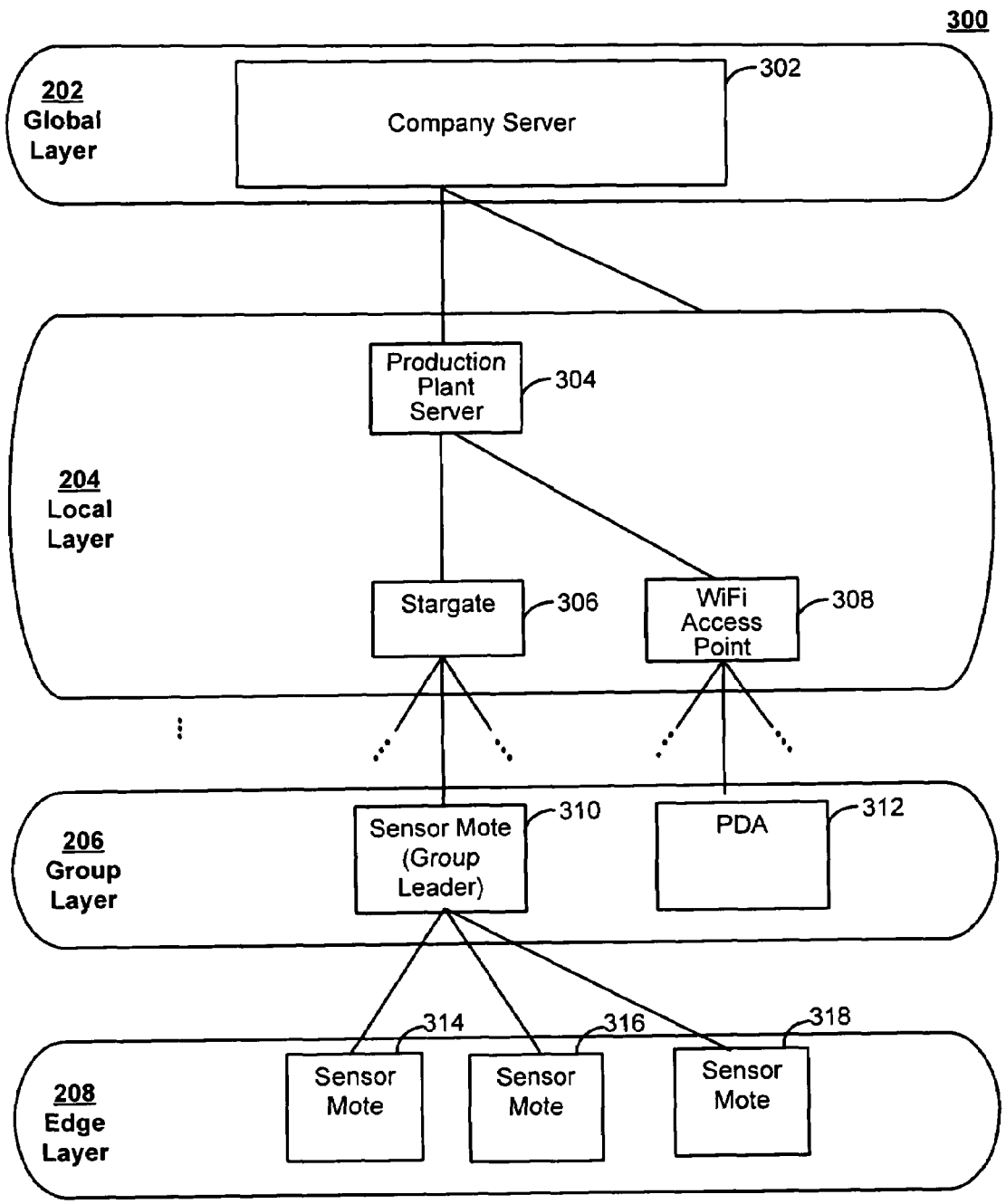
FIG. 3 is a block diagram illustrating a second example deployment of the system of FIG. 1

FIG. 3 is a block diagram 300 illustrating a second example deployment of the system 100 of FIG. 1, in which the layers 202-208 may be associated with a plurality of (types of) physical systems or devices. In the example of FIG. 3, a company server 302 (e.g., a company-wide central server) may be located in a first geographical location (e.g., Europe), and may implement the global service monitor 132a.

Meanwhile, a production plant server 304 (e.g., a server computer implemented/located at a production plant for the company) may be located at a production plant of the company in, e.g., San Francisco. The production plant server 304, along with a Stargate computer 306 (e.g., a single board computer with communications and sensor signal processing abilities) and a WiFi access point 308, may be implemented at the local layer 204. In other words, one or more local monitor service(s) 132b may be implemented using one or more of the physical devices 304-308.

In the example of FIG. 3, at least two local monitor services 132b should be understood to be included, e.g., with respect (at least) to the Stargate 306 and the WiFi access point 308. That is, each such local monitor service is maintained over at least one group leader monitor service, which should be understood to be running on a sensor mote 310 and a PDA 312, where the sensor mote 310 is the group leader to a plurality of sensor motes 314-318 (the sensor motes 314-318 thus illustrating, potentially, examples of the (edge) devices 110-114).

In the example of FIG. 3, then, more than four physical layers exist, and these physical layers may be mapped onto the four logical tiers or layers 202-208 of FIG. 2. Thus, multiple physical system layers may fill in the role of one conceptual tier. In examples using more than four physical layers, devices may route information between conceptual tiers. For example, an edge device may route information from the local monitor service 132b to the group leader monitor service 132c, even where the edge device in question may belong to a different sensor network, but may be physically closer to the local monitor service 132b than is the group leader monitor service 132c.

As referenced above, however, physical systems/devices also may have less than four tiers. For example, there may be only two physical tiers, in which case the global monitor service 132a may be deployed on a first device, while the local monitor service 132b, the group leader monitor service 132c, and the edge monitor service 132d may be deployed on a second device, perhaps with a single, combined instance of the monitor service(s) 132b-132d.

In the examples of FIGS. 1-3, the hierarchy of devices may be conceptually tree-structured, e.g., each device may have exactly one upper (or same) layer monitor service to report to (which may be referred to as a "parent monitor"). The global layer device, e.g., the device 144, which contains the global monitor service 132a, may be the only monitor service without such a parent monitor. For purposes of collecting monitor data, edge devices (e.g., the edge devices 110-114) may not need to communicate with one another directly, but, rather, may simply forward monitor data to their parent device(s). Of course, in these or other contexts, devices may communicate directly with one another (e.g., in a peer-to-peer fashion, perhaps to calculate an average temperature in a room or to perform other collaborative computing).

More generally, devices may be physically connected to other devices in the same network or may be connected to several networks. Thus, in other implementations, the monitor services 132b-132d may have several parents. In some additional or alternative implementations, there may be exactly one main network connection, as referenced above and defined as the connection with the shortest path (in terms of hops) to the global layer device 144. Other connections (e.g., peer-to-peer and/or multiple network connections) may be regarded as auxiliary or "shortcut" connections, so that, for example, a local-layer device with the local monitor service 132b on a first sensor network need not go through the global layer to communicate with an edge device of a second sensor network, but, rather, may communicate with the edge device using an intervening group leader device.

Figure 4:
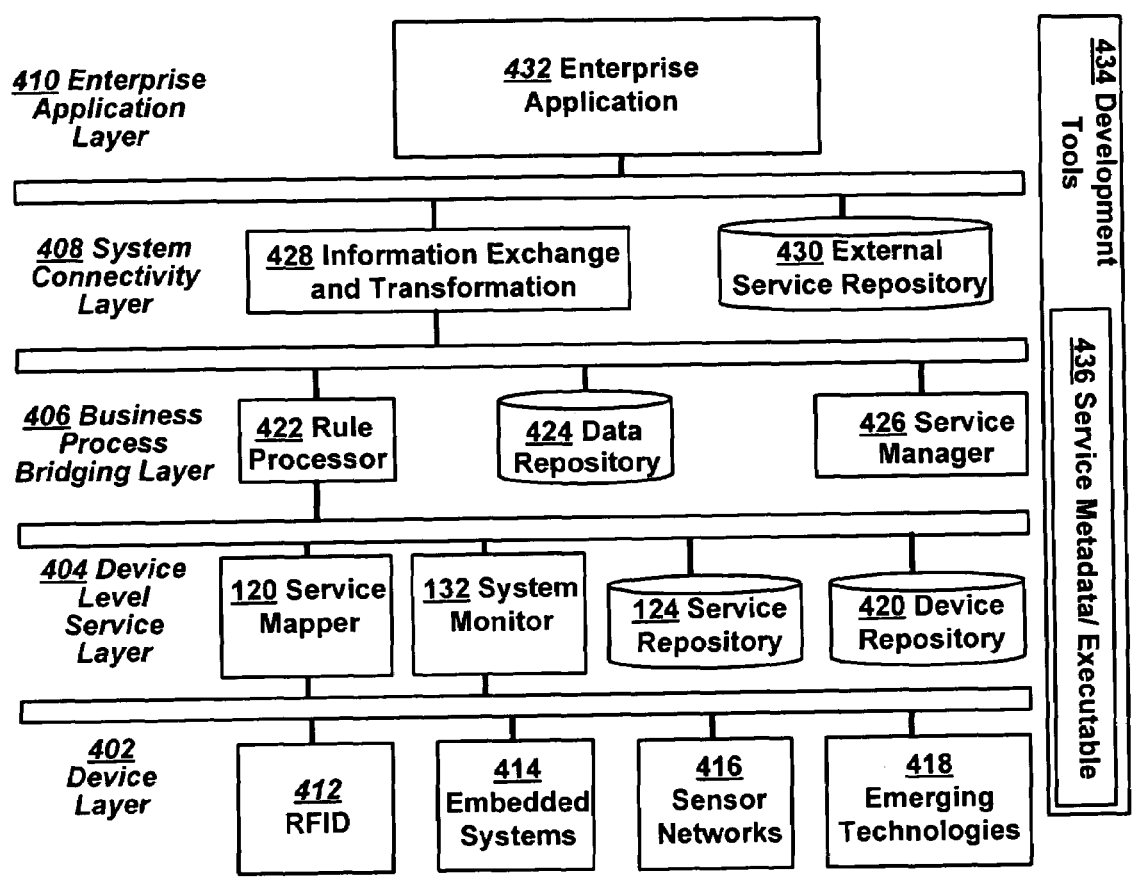
FIG. 4 is a block diagram of a smart items infrastructure for implementing the systems of FIGS. 1, 2, and 3.

FIG. 4 is a block diagram of a smart items infrastructure 400 for implementing the systems of FIGS. 1-3. The smart items infrastructure 400 includes five layers: a device layer 402, a device level service layer 404, a business process bridging layer 406, a system connectivity layer 408, and an enterprise application layer 410. The layer 402 may be considered to contain various ones of the devices 108, 110, 112, and 114 of FIG. 1, or similar devices, across a number of groups, local networks and/or physical locations. Meanwhile, the layers 406, 408, and 410 may be considered to be part of, or associated with, the business data processing systems 104 of FIG. 1. Thus, the layer 404 may be considered to represent remaining components of the system 100 of FIG. 1, e.g., the service mapper 12, the system monitor 132 and/or the monitor services 132a-132d, and the service repository 124, as shown in FIG. 4.

The device layer 402 thus comprises the actual smart item devices, as well as any communications between them. The device layer 402 also is responsible for presentation of any offered hardware services to the next higher layer, the device level service layer 404. The devices may include, for example, an RFID device 412, embedded systems 414, sensor networks 416, and any other new or emerging technologies 418, as would be appropriate. It should be understood that the examples of the device layer 402 are non-limiting, and may overlap. For example, sensor networks may include RFID devices (readers/tags), embedded systems, and/or other emerging technologies.

For the RFID device(s) 412, mobile tags may be attached to real-world objects, and are then read (and optionally written to) by RFID readers. In an implementation using active tags, the active tags may also provide additional sensor data (e.g., a current value or a past value). In RFID, communication is typically initiated by the reader, while tags may or may not directly communicate with each other. Such an RFID reader may be configurable to the extent of processing tag data, e.g., may be configured to perform verification of written data, or to avoid reporting a disappearance of a tag if the ostensibly lost tag in fact reappears within a given time window.

Techniques for communicating with the embedded systems 414 may vary on the types of devices of the embedded systems. For example, the embedded systems may represent anything from small-scale, one-chip microcomputers, all the way to full-blown PC hardware. Thus, for example, for devices that have the capabilities of a mobile phone or more (e.g., are able to run a Java Virtual Machine™), implementation may be performed in Java™ or based on OSGi (the latter representing a known framework for implementing a component model for remote installation and management of applications and/or application components). As also described above, the sensor networks 416 may include any number of types of sensors that may include integrated processing power and that may be able to execute peer-to-peer communication.

The service repository 124 may store at least two kinds of services, compound and atomic services. The compound services generally rely on other services to fulfill their tasks, and may have no directly-executable code of their own; rather, the compound services may include an executable service composition description that is stored in a corresponding service description. Thus, compound services may have one service executable, i.e., the service composition description. In contrast, atomic services do not generally use other services, and have their own directly-executable code. Also, as mentioned above, since an atomic service may be deployable on different platforms, an atomic service may have more than one service executable, e.g., may have a service executable for each of the different platforms.

The service repository 124 also may store the service metadata 126, where such service metadata 126 is described in detail, above, and may include a service name, identifier, version, or vendor, or may describe run-time requirements of the service, including, for example, technical deployment requirements (e.g., high bandwidth, or minimum processing power required), semantic requirements (e.g., that a receiving device have a serial connection and/or many device neighbors), and spatial requirements (e.g., that a receiving device be in the basement, or at a south side of a specified building).

Finally at the device-level service layer 404, a device repository 420 may be included. As should be understood from the above description, the device repository 420 may include, for example, information about devices (e.g., the device metadata) in an manner analogous to that in which the service repository 124 maintains information about services (e.g., the service metadata). For example, device metadata may be stored in the device repository 420 based on communication with the system monitor 132 (e.g., with one or more of the monitor services 132a-132d. In other example implementations, the device repository may include device metadata stored by an administrator based on externally-available information about the devices. For example, as already mentioned, the device metadata may include a device name, power capacity, memory capacity, processing capacity, or other information that may be relevant to mapping (and ultimately deploying) a service to an associated device. Of course, in these examples, the device repository 420 may include generally static or high-level device metadata, and/or may include some or all of the global monitor data 136 and/or the local monitor data 138.

At run-time, the system monitor 132 monitors a current system state, as already described, using the monitor services 132a-132d. Whether and how any part of a state of a service is exposed to the system monitor 132 may be set by a developer of the service at design-time. This state-availability information may thereafter be available both to a system administrator and to the service mapper 120. As also described above, the service mapper 120 receives deployment requests and then determines on which device(s) the corresponding service should be deployed, e.g., by matching the service metadata to the device metadata, which may include a current state of the smart item devices and related local network(s). As also described herein, the service mapper 120 also may react to certain events or conditions, including changes in the network state (as recognized by the system monitor 132), and may thereafter decide to re-map a service or add or remove instances of services to better fulfill given deployment requests/requirements.

The business process bridging layer 406 includes services designed to aggregate data from the devices at the device layer 402, provided via the device level service layer 404, and to transform the data from the device layer 402 into business-relevant information. In so doing, an amount of data sent to back-end enterprise application systems may be reduced, and business logic may be executed for different ones of the enterprise application systems.

For example, one or more rule processor(s) 422 may be used to parse incoming messages, support basic operational services (e.g., item movement, association, de-association, or device reading/writing) and support information querying. The rule processor 422 processes user-defined business rules that define or reference any other basic operational services that should be executed or consulted. Using such rules and basic operational services provides a flexible framework to adapt the system 400 to different business scenarios.

The rule processor 422 may use a data repository 424 for keeping track of all physical objects of interest, e.g., for keeping track of the current state, location, timestamp, or associated business transaction of a given object being tracked, as well as for keeping track of what future actions are expected. Aggregated information from the data repository 424 may be reported on a regular basis, e.g., daily or monthly.

One example of an operation of the layers 402, 404, and 406 includes a "goods receiving" scenario. For example, a provider delivering objects to a receiver may send an Advanced Shipment Notification (ASN) containing a list of all objects in the shipment, along with object identifiers such as Electronic Product Codes (EPCs). The ASN may be stored in the data repository 424. When the shipment arrives and passes the RFID readers at the device layer 402, e.g., at a receiving dock door, then the EPCs are read by the RFID readers, and sent to the rule processor 422. The rule processor looks up the ID of the reader from which the message came, determines a location and role of the reader, and then calls the appropriate basic operational service responsible for handling received shipments. This operational service compares the obtained EPCs with the expected EPCs from previous ASNs, and, if a match is found, reports to an enterprise application 432 that the delivery has arrived and is complete. The executed operational service also may then update the data in the data repository 424. Services described above, as well as services for receiving and sending the involved messages, may be managed by a service manager 426.

Components in the system connectivity layer 408 may be used to connect different application systems and to support system and data integration. For example, messages and data may be routed to the correct backend systems by an information exchange and transformation module 428, and also may be transformed thereby to enable a semantically-correct integration. On top of message-routing and transformation services, the system connectivity layer 408 also provides services in a service repository 430 that can be used to access the functionality provided by the Business Bridging Layer 406 by enterprise applications 432.

The enterprise application layer 410 includes, for example, traditional enterprise IT systems responsible for controlling and managing enterprise business applications. An enterprise application 432 covering a specific business process may not be a single program, but rather may be composed of different services that work together to achieve a desired functionality. Such services may be provided by the same enterprise system, by another enterprise system within the enterprise application layer 410 (possibly located at a site of a business partner), or by systems from lower layers (e.g., by smart item devices at the device layer 402).

Finally in FIG. 4, development tools 434 may refer to tools for creating enterprise application(s) 432 and other applications/services. Using a development environment integrated with the infrastructure 400 may support the implementation of basic services in manners that are similar to known development tools in the enterprise application space. Further, the development tools 434 may allow the creation of the required service metadata 126, as well as the inclusion of existing services into new applications. Furthermore, the development tools 434 allow a developer to specify where a certain service should run, to configure individual service instances, and to deploy the services in a desired manner. That is, a developer may develop service metadata/executable(s) 436 using the development tools 434, and may then provide desired ones of the service metadata/executable(s) 436 for storage in the service repository 124, and/or for mapping/re-mapping by the service mapper 120 at the same or later time.

Figure 5:
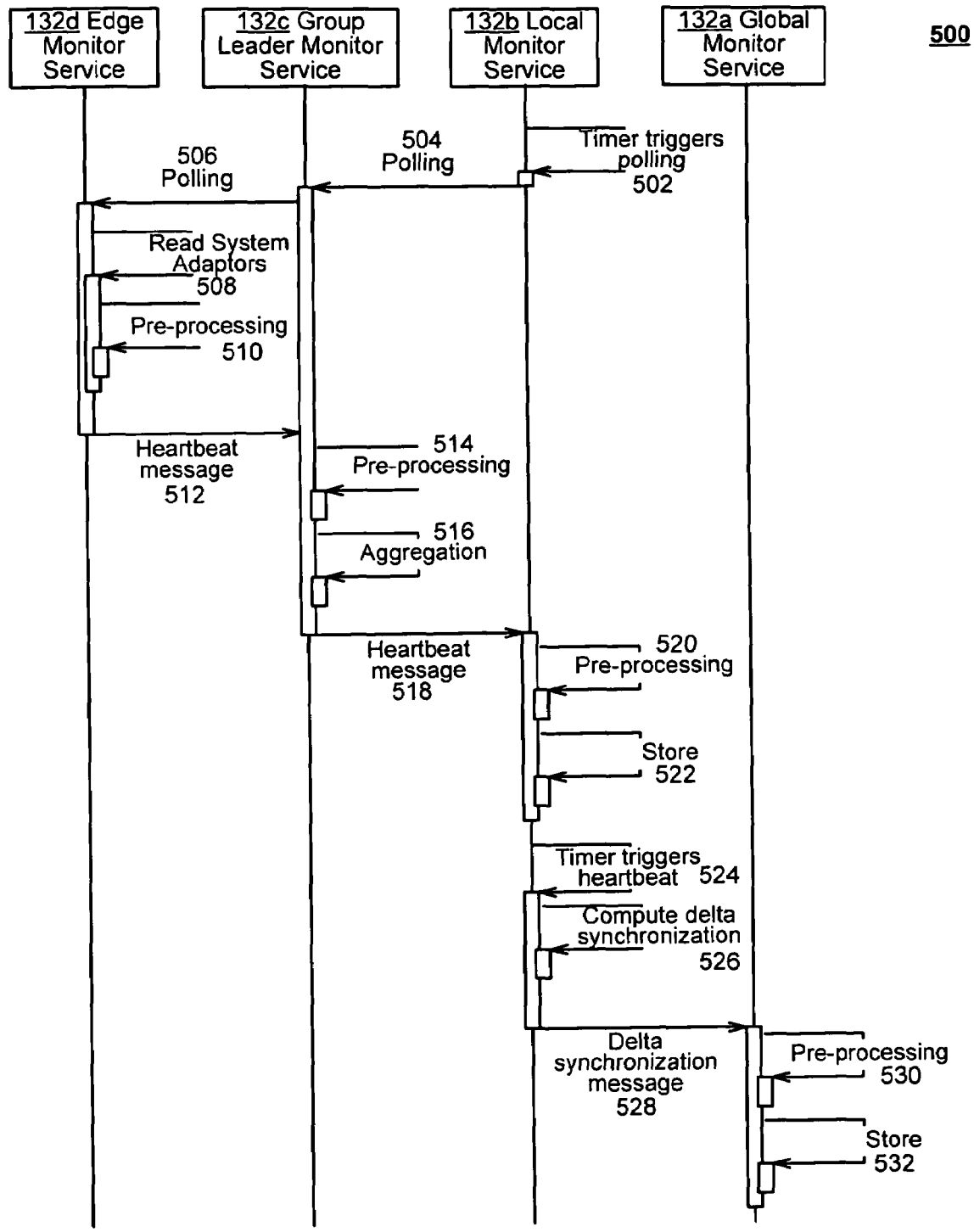
FIG. 5 is a timing diagram illustrating an example algorithm for gathering monitor data using the system of FIG. 1.

Having described the above example implementations and settings associated with the system 100 of FIG. 1, FIG. 5 is a timing diagram illustrating an example algorithm for gathering monitor data using the system 100 of FIG. 1. The algorithm of FIG. 5 is implemented using the global monitor service 132a, which, as already described, is configured to gather information about all devices and services within its underlying hierarchy, and which thus provides a global system landscape view. In the context of FIG. 4, the global monitor service 132a may run as a part of the device level service layer 404 and/or the business process bridging layer 406 of the infrastructure 400 of FIG. 4. The global monitor service may be requested/called by high-level services that also are running at the device level service layer 404 or the business process bridging layer 406, or through separate device and service monitoring graphical user interfaces (GUIs).

As referenced above, the local layer may include a plurality of the local monitoring services 132b, which are each configured to gather monitor data from edge devices, using, for example, polling and heartbeat techniques, as described in more detail, below. The local monitor service 132b is configured to manage collected monitor data, including, for example, filtering, aggregating, and storing the monitor data. The group layer includes multiple devices at or near the edge of the infrastructure (e.g., the infrastructure 400 of FIG. 4) which fill in the role of the group leaders, such as the device 108 of FIG. 1. The group leaders gather information about edge devices (e.g., devices 110-114) in their vicinity having the edge monitoring service 132d installed. In the example of FIG. 5, monitor data obtained by the group leader (e.g., 108) is not stored at the group leader, but may be filtered, aggregated, or otherwise processed, before being forwarded to the local monitor service 132b to be stored. Finally, devices (e.g., devices 110-114) run the edge monitor service 132d and form the edge layer. In some implementations, group leader monitor services 132c and edge monitor services 132d may be essentially identical in terms of providing, preprocessing, and not storing monitor data, although the edge monitor service 132d is not responsible for managing other devices. In the example of FIG. 5, the edge monitor service 132d is configured to provide monitor data and send it to its group leader using heartbeat messages (e.g., messages sent using an active send queue at some pre-defined interval). More generally, however, gathering monitor data from edge layer devices may be triggered either by timers of the edge devices for sending the heartbeat messages, or by poll messages received at the edge devices from upper tiers/layers.

In the example of FIG. 5, a timer triggers the local monitor service 132b to check for outdated data in the local monitor data 138, which results in polling (502) several edge layer devices. The local monitor service 132b does not communicate directly with the edge layer devices, but rather uses the group leader device 108 at a gateway, and thus sends a polling message to the group leader monitor service (504). The group leader monitor service 132c splits the single poll message into different poll messages (although FIG. 5 shows only one poll message, for the sake of simplicity), which are sent to the individual edge layer devices 110-114 (506).

Each edge layer device 110-114 reads a local system adaptor (508), which should be understood to be the same or similar to the system adaptor 134 of FIG. 1, to obtain up-to-date monitor data. Examples of system adaptors and related elements are provided in more detail below, with respect to FIGS. 9-11. Generally, however, it should be understood that such system adaptors serve as data sources to provide monitor data about their respective edge device, as well as about any service(s) running on their respective edge device.

The edge monitor service 132d then executes preprocessing (510) of the monitor data (e.g., filtering and/or aggregation). Then, without storing the pre-processed monitor data, sends a heartbeat message (512) with the pre-processed monitor data to the group leader monitor service 132c. The group leader monitor service 132c receives messages with the monitor data from a plurality of edge devices, and provides further pre-processing (514), including, for example, calculation of an average of the CPU utilizations of all managed edge devices. Then, the group leader monitor service 132c performs message aggregation (516), in which messages from different devices are summarized into a single heartbeat message for transmission to the local monitor service 132b (518).

The local monitor service 132b receives such heartbeat messages from a plurality of group leader monitor services 132c, and performs pre-processing (520), including, e.g., filtering of non-critical data, and/or aggregation thereof. The pre-processed message(s) are then stored (522), e.g., at the local monitor data 138. Then, a timer of the local monitor service 132b triggers a heartbeat indicator (524) that causes the local monitor service 132b to compute a delta synchronization (526) between the local monitor data 138 and the global monitor data 136. That is, the local monitor service 132b determines which relevant information within the local monitor data 138 has been changed or updated as a result of the execution of the monitoring algorithm of FIG. 5, and only this changed data is submitted to the global monitor data 136, e.g., as part of a delta synchronization message (528). In this way, an amount of transferred and processed data is reduced. In additional or alternative implementations, the delta synchronization may be initiated by a message from the global monitor service 132a to the local monitor service 132b.

Finally in FIG. 5, the updated data is preprocessed by the global monitor service 132a (530), and stored in the global monitor data 136. Then, the business data processing systems 104, e.g., supply chain management applications, may access the data from the global monitor data 136. It should be understood from the above description that monitor data from a given edge device is stored in the landscape tree on the path from the edge device itself to the global monitor service 132a. As a result, the monitor data is easily located for use or deletion thereof.

Figure 6:
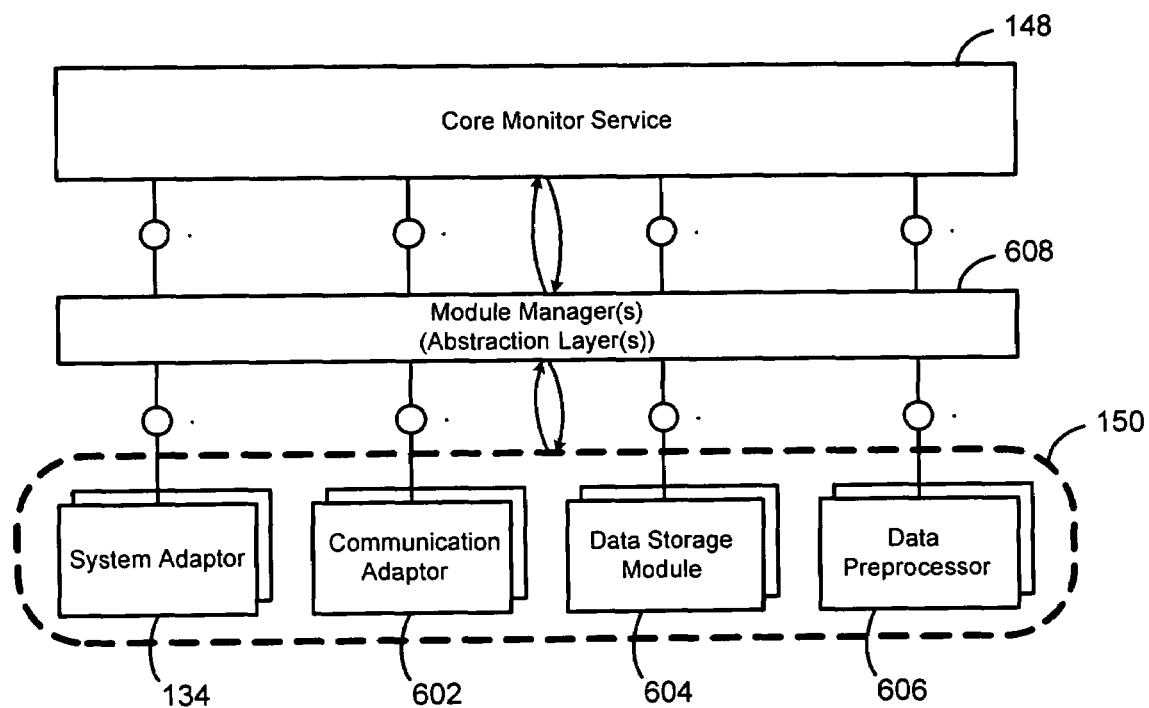
FIG. 6 is a block diagram of a modular monitor service that may represent one or more of the monitor services 132a-132d of FIG. 1.

FIG. 6 is a block diagram of a modular monitor service 600 that may represent one or more of the monitor services 132a-132d of FIG. 1. That is, the modular monitor service 600 includes the core monitor service 148, which is illustrated in FIG. 1 in the context of the group leader monitor service 132c, but which, as explained above, also may be implemented in the context of some or all of the remaining monitor services 132a, 132b, and/or 132d. The modular monitor service 600 also includes the monitor service module 150, which, again, is illustrated in FIG. 1 in the context of the group leader monitor service 132c, but which, again, also may be implemented in the context of some or all of the remaining monitor services 132a, 132b, and/or 132d.

Thus, the core monitor service 148 may be configured to implement fundamental functionalities that may be used by most or all of the monitor services 132a-132d (e.g., query routing, role-based data handling, and coordination of communication with other monitor services running on other devices), while the monitor service module(s) 150 may be configured to implement functionality that may be more particular to a given one of the monitor services 132a-132d. The monitor service module(s) 150 may thus be implemented as plug-in components that are added to the core monitor service 148 on an as-needed basis, so that the core monitor service 148 may be specialized according to individual needs and capabilities of each monitor service and/or device.

For example, in the example of FIG. 6, the monitor service module(s) 150 include the system adaptor 134, a communication adaptor 602, a data storage module 604, and a data preprocessor 606. Consequently, associated functionality for these plug-ins, and other functionality, may be added or replaced to the module monitor service 600, without changing the core monitor service 148. Moreover, as described in more detail below, the monitor service module(s) 150 of the same category (e.g., different instances of the communication adaptor 602 or of the data storage module 604) may share a common interface, so that the core monitor service 148 need not be aware of the usage of the different instances/plug-ins.

Further in FIG. 6, module manager(s) 608 may be used to manage modules of the same category. For example, the module manager(s) 608 may include a manager for the system adaptor(s) 134, and may be configured to select and implement an appropriate one of the system adaptor(s) 134, based on a current situation and/or need of the core monitor service 148. Specific examples of such a system adaptor manager are provided below, e.g., with respect to FIGS. 9 and 10, and other examples of module managers 608 are also discussed. It should be understood that the module manager(s), in some implementations, may act as actual intermediaries to messages between the core monitor service 148 and a given monitor service module 150, e.g., forwarding the messages from the core monitor service 148 to the appropriate monitor service module 150, or vice versa. In other implementations, the module manager(s) 608 may be configured to load or select an appropriate one of the monitor service module(s) 150, and may then remove itself from further communications.

Figure 7A:
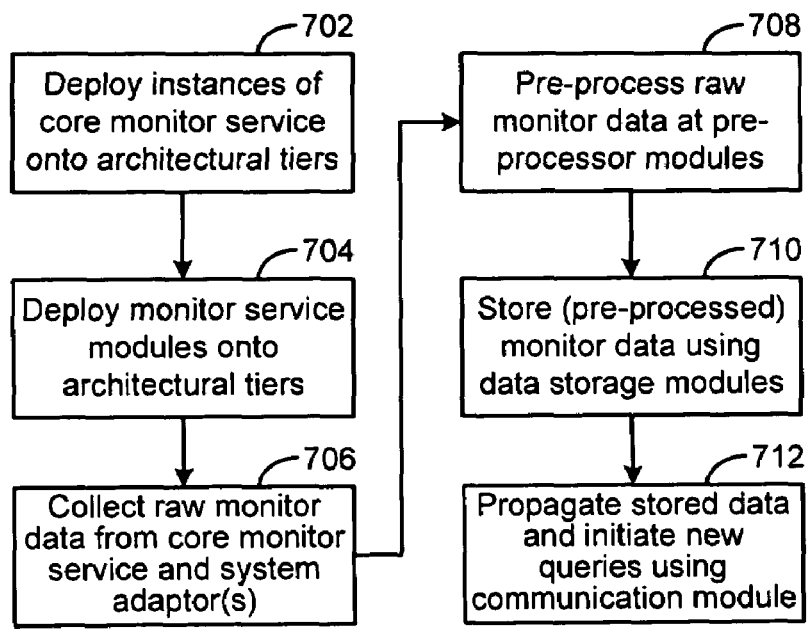
FIG. 7A is a flowchart illustrating an operation of the system of FIG. 1 using the modular monitor service of FIGS. 1 and 6.

FIG. 7A is a flowchart illustrating an operation of the system 100 using the modular monitor service 600. In FIG. 7A, instances of the core monitor service 148 are deployed onto one or more of the architectural tiers (702), e.g., of the system 100. For example, the service mapper 120 may be configured to deploy the core monitor service 148 onto the devices 108-114, 146, and 144 of the system 100, perhaps during an initial set-up of the system 100. In another example(s), discussed in more detail below with respect to FIG. 7B and FIGS. 15-17, the service mapper 120 may map an instance of the core monitor service 148 onto a new device (not shown in FIG. 1) that comes into an area of the sensor network 102, and that wishes to communicate with one or more of the devices 108-114, 146, and/or 144.

It should be understood that the core monitor service 148 may be stored in the service repository 124 as a template, form, or other generic structure, and that different instances of the core monitor service 148 may be deployed within the system 100. Moreover, the instances need not be exactly identical. For example, different instances of the core monitor service 148 may be deployed, having different functions included or enabled, depending on which layer of the system monitor 132 the instance is to be deployed. The service mapper 120 may execute the service mapping of instances of the core monitor service 148 as described above, e.g., based on the device metadata 130.

Once the core monitor service module 148 is installed within the system 100, various monitor service modules may be installed (704). For example, the monitor service modules 134, 602, 604, and/or 606 may be installed, depending, for example, on the device metadata 130 associated with the device(s) in question, and/or onto which level of the monitor architecture the monitor service module(s) are being deployed. As is also discussed in more detail below, such device metadata may be obtained using the already-installed core monitor service 148, and/or may be obtained from memory.

With the core monitor service 148 and the monitor service module(s) in place, monitor data may be collected, e.g., by implementing the algorithm of FIG. 5 using the modular monitor system 600 of FIG. 6. For example, from the above discussion of FIG. 5, it should be understood that raw monitor data (e.g., at the edge monitor service 132d) may initially be collected using the core monitor service 148 and/or the system adaptor 134 (706) (which, as described in more detail herein, e.g., with respect to FIGS. 9-11, may include both service and device adaptors). In this way, the raw monitor data (e.g., regarding relevant services and/or devices) may be provided in a way that hides different interfaces of the (heterogeneous) services/devices, and that is extensible for new services/devices. Further, system standards, such as, for example, OSGi or JSR82, may be implemented.

The raw monitor data may be pre-processed at the pre-processor module 606 (708). Examples of such pre-processing are provided in conjunction with FIG. 5, and further with respect to FIG. 14. Generally, however, such pre-processing acts on incoming data to reduce an amount of data to be sent over the network connection(s), using, e.g., filtering and aggregation.

The (pre-processed) monitor data may be stored using the data storage module(s) 604 (710). For example, the data storage module 604 may be configured to hide different types of storage that may be available (e.g., file system, database, or in-memory data structure). As described above, storage of monitor data may be limited just to the local monitor service 132b and the global monitor service 132a, so that, accordingly, the data storage modules 604 may be deployed only onto those monitor services, and resources are conserved.

The processed and stored data may be propagated, and queries for new data (e.g., by polling) may be executed using the communications adaptor 602 (712). For example, as should be understood, the communications adaptor 602 may be configured to ensure communication between services/devices, may hide unreliable or out-of-order data transfers, and may hide the core monitor service 148 from effects of different communications protocols/hardware. In some implementations, the communications adaptor 602 may be considered to be separate from the monitor service 132a-132d, and, e.g., may be deployed separately (i.e., at separate times) from either the core monitor service 148 or monitor service modules 134, 602, or 606. Different operations and uses of the communications adaptor 602 are provided below, with respect to the examples of FIGS. 8, 12, and 13.

Figure 7B:
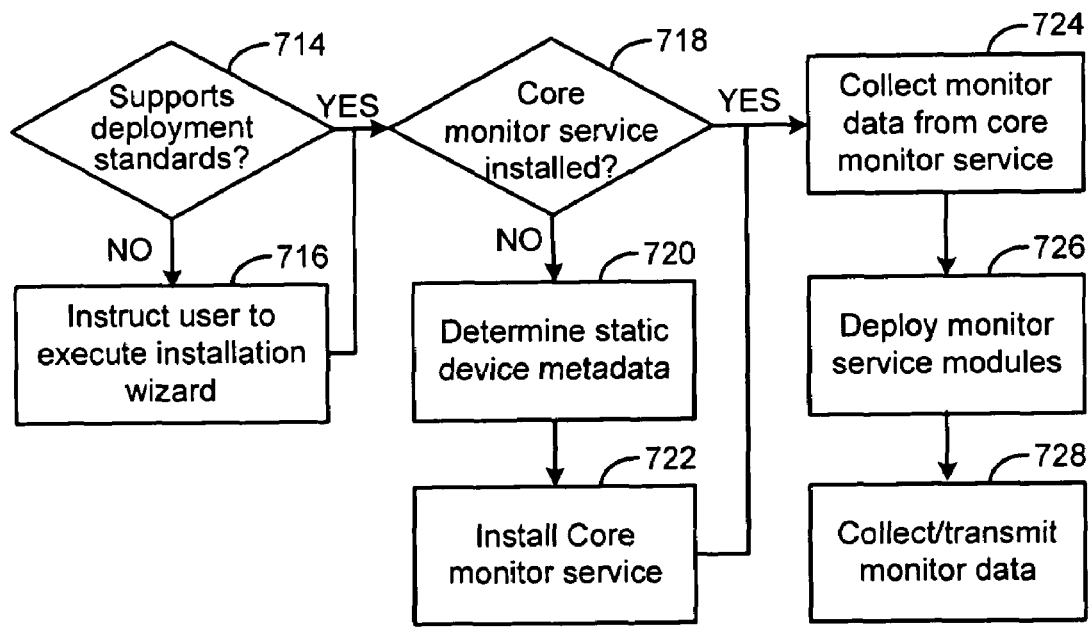
FIG. 7B is a flowchart illustrating additional example operations of the system of FIG. 1.

FIG. 7B is a flowchart illustrating additional example operations of the system 100. In FIG. 7B, it is assumed that the core monitor service 148 is not initially installed. In many cases, however, the core monitor service 148 may be needed in order to proceed with further operations of the system 100. For example, during a registration process of a new device within the system 100, registration protocol may require installation and availability of the core monitor service 148 (see, e.g., the examples of FIGS. 15-17 for a discussion of an example registration protocol for registering a new device with the system 100). In this and other scenarios, a bootstrapping technique may be implemented, in which the core monitor service 148 is installed first, and then information from the installed (executing) core monitor service 148 may itself be used to register the new device, and/or to deploy the monitor service modules 134 and/or 602-606.

For example, it may first be determined whether the device in question supports existing standards for deploying services (714) (e.g., OSGI, Jini, Services and Networks for Domotic Applications (SENDA), service management module (SMM), or JSR232). If such standards are not supported by a device in question, then appropriate action may be taken. For example, in a case where the device is of a level of a mobile phone or PDA, then a user thereof may be instructed to execute an installation wizard (e.g., follow a link to download and start an installation program) for setting up the core monitor service 148 (716). In such a case, and/or using known deployment standards, and if the core monitor service 148 is not yet installed (718), then static device metadata may be determined (720), e.g., using the standards and/or from a memory.

At this point, the core monitor service may be installed (722), and additional monitor data may be obtained therefrom (724). As described in more detail below, e.g., with respect to FIGS. 15-17, a full-scale device registration with the system monitor 132 also may be executed at this point, if necessary. Using the additional monitor data, appropriate monitor service module(s) 150 may be deployed (726), so that collection and/or transmission of additional monitor data may proceed.

Figure 8:
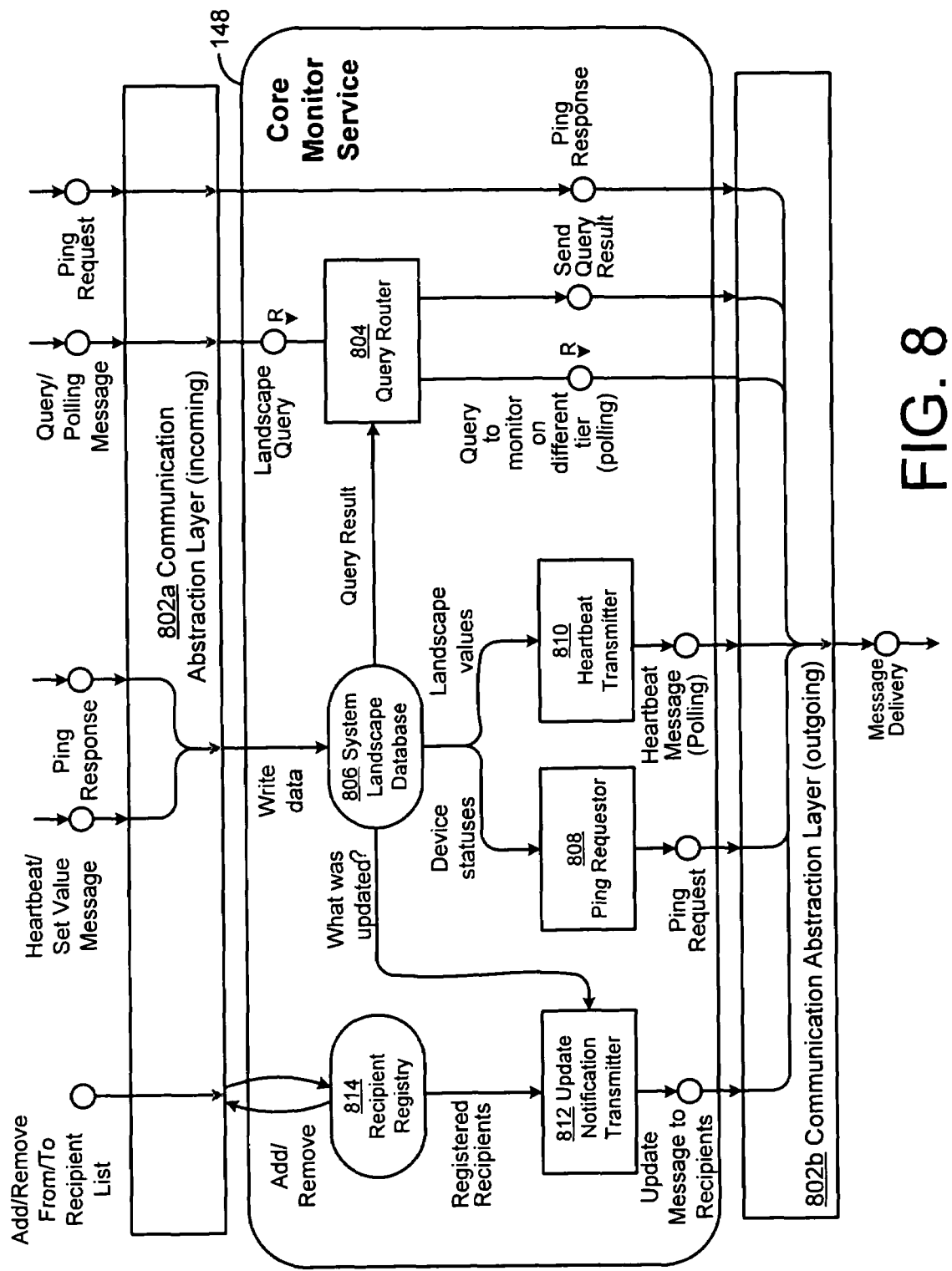
FIG. 8 is a block diagram of an example implementation of a core monitor service of FIGS. 1 and 6.

FIG. 8 is a block diagram of an example implementation of the core monitor service 148. In the example of FIG. 8, a communication abstraction layer, with incoming 802a and outgoing 802b messages, may be used by the core monitor service 148, for example, to establish connections to monitor services on different devices, or to establish connections to GUI interfaces and to other types of services. The communication abstraction layer 802a, 802b is discussed in more detail below, with respect to FIG. 12. As should be apparent from FIGS. 6 and 7, other module managers 150 (e.g., system adaptor manager, described with respect to FIGS. 9-11) also may be in communication with the core monitor service 148, and, depending on how such managers are defined and implemented, may overlap with some of the functionality of the communication abstraction layer(s) 802a, 802b.

The core monitor service 148 of FIG. 8 includes a query router 804. The query router 804 may be responsible, for example, for gathering and returning queried monitor data, which may either be queried by (other) monitor services 132a-132d running on other devices, or by other services (e.g., temperature detection services, item tracking services, or other data-collection services).

A system landscape database 806 is included and activated in the FIG. 8 example of the core monitor service 148 (e.g., the core monitor service 148 may be associated with the global monitor service 132a or the local monitor service 132b, in which case the system landscape database 806 may represent, include, or otherwise be associated with the global monitor data 136 or the local monitor data 138, respectively). In this case, the query router 804 may attempt to obtain the requested monitor data from the system landscape database 806.

If the desired monitor data, or other desired data, is outdated or not found, the query monitor 806 may query the desired monitor data from a monitor service running on a parent device, e.g., a different device that manages the device that is implementing the core monitor service 148 (for example, the group leader monitor service 132c may query the local monitor service 132b, or the local monitor service 132b may query the global monitor service 132a). In another situation, the current monitor service 148 may manage the queried system (i.e., is a parent to the queried system), in which case a lower level monitor service will be addressed to collect the desired monitor data. In yet another scenario, the queried device may be unknown to the core monitor service 148 of FIG. 8, in which case the query may be forwarded to the upper layer which manages more systems, and, ultimately, may proceed to the global monitor service 132a, which may then forward the query to the appropriate local monitor service 132b.

Query routing may be straightforward if a target system (service or device) may be addressed directly, with no intervening system(s). In cases where there is no direct connection to the target system, then intervening hops on the routing path are determined. Routing information describing such intervening hops may be fetched from stored topology information (which may be stored in the system landscape database 806, or in separate routing tables).

For example, each monitor service 132b-132d is provided with a parent monitor service that is assigned during registration of the monitor service (see, e.g., FIGS. 15-17, below). This child-parent information may be stored in the system landscape database 806, and/or in other memory, as a property, from which a tree-shaped topology may be generated. The tree-shaped topology may be traversed to determine the next hop. In other implementations, the next/intervening hop may be obtained from a routing table, using an appropriate table look-up. Generally, such separate routing tables may use more memory than determining the routing information from the tree-shaped topology, but may be more efficient and/or faster.

Entries in the routing tables may be changed only when devices connect or disconnect from the system 100, in order to reduce a number of required changes. To reduce the number of entries in the routing table, a next hop may be added only if the next hop is not the parent monitor service, since, the next hop may be assumed, by default, to be the parent monitor service. In this way, a number of entries in the routing tables may be reduced to the number of systems that are managed/monitored by the monitor service, along with those that are directly connected thereto.

An algorithm for the query routing is illustrated below in Code Section 1, which embodies the query routing guidelines just described.

---

Code Section 1

```
Query landscape: get the queried data
If data not found
    if information is requested about the current device
        get system adaptor to service or device
        get information from adaptor
    else (information is not about the current device)
        Query landscape: is device managed by this device?
        If device is managed by this device
            get child device to ask
            get data from child device by asking the monitor on lower tier
        else (device is not managed by this device)
            get parent device to ask
            get data from parent device by asking the monitor on higher tier
    if data still not found
        return error
    else (data found)
        return data
```

---

Generally speaking, as already described, Code Section 1 is consistent with a querying algorithm in which a request for monitor data is received at a (current) device. If the monitor data is related to the current device, but not in the system landscape database 806, then the system adaptor 134 may be used to obtain the monitor data, as described herein. Otherwise, if the monitor data is about another service/device, but is not in the system landscape database 806, then a parent or child monitor service may be queried, as appropriate. If the monitor data is found in either the system landscape database 806 or the parent/child monitor service, then the monitor data may be checked to see whether it is up-to-date. If not, then additional polling/queries may be executed to obtain updated monitor data.

The core monitor service 148 also includes a ping requestor 808, which is configured to be used by the global monitor service 132a and/or the local monitor service 132b, or any monitor service that stores monitor data in some type of monitor data storage/memory (e.g., the system landscape database 806). The ping requestor 808 may thus be configured to ping devices in the system landscape, thereby to assist in keeping system landscape data of child systems up-to-date, and to detect disconnected devices (and mark the data as 'in doubt'). If a monitor service does not store status information in a local monitor data storage, e.g., the group leader monitor service 132c or edge monitor service 132d, then the ping requestor 808 may be omitted or non-activated.

The ping requestor 808 may be activated by a timer, and, in response, may determine all connected and managed child-systems from the monitoring data storage (e.g., from the system landscape database 806). For example, for all the systems, the ping requestor 808 compares the time when the last life-signal was received to the current time, in order to detect outdated monitor data (or other stored information). If outdated, then a status of the system(s) may be changed to so indicate, e.g., may be changed from "alive" to "outdated." If the timestamp is older than a certain cut-off point, then the status may be changed from "outdated" to "in-doubt," so as to indicate the possibility that the device in question is disconnected. For all "outdated" systems, the ping requestor 808 sends a ping-request. The ping requestor 808 receives the ping-response and updates the "last seen" timestamp accordingly, and then changes the relevant status back to "alive" within the system landscape database 806.

An algorithm consistent with the above explanation of the ping requestor 808 is provided below in the context of Code Section 2:

---

Code Section 2

```
Landscape query: get all systems and their status
For all systems do
    If the timestamp is old enough to mark the system as "in-doubt"
    then
        Mark all related data as "in doubt"
    Else if it is old enough to mark the system as "outdated" then do so
    If the status is "outdated" then
        Send a ping signal to this system
```

---

Although FIG. 8 is discussed in terms of the ping requestor 808, it should be understood that other techniques may be used for determining a status of elements of the system landscape of the system 100, e.g., other echo requests used to test a reachability of the system(s) and/or to test network delays. Further, it should be understood that the core monitor service 148 also may receive, and thereafter respond to, ping requests from other monitor services, as shown. Actual implementation of a transport protocol that ensures reliable data transfer of the ping (or other) status requests may be implemented as a task of the communication adaptor 602, as discussed in more detail below, with respect to FIG. 12.

The core monitor service 148 also includes a heartbeat transmitter 810, which may be implemented as a service configured to send a heartbeat message to a parent monitor service, so as to indicate that the device (on which the core monitor service 148 is deployed) is still running. The heartbeat transmitter 810 may be triggered by a timer, where the time interval between two messages may be defined in associated heartbeat settings. The interval may be chosen with respect to resource-constraints, so that small devices with limited power supply and network capabilities may use a greater time interval than more powerful devices (e.g., well-connected servers). A metric may be used to define a default interval customized for each device type (e.g., for a sensor device, PDA, or laptop). Additionally, the value of the interval and other associated settings may be adjustable by the user, e.g. a system administrator of the infrastructure of FIG. 4.

In addition to the information that the device in question is alive and connected, the heartbeat sender 810 may be configured to transmit at least some monitoring data, as well, which if received at the core monitor service 148 from another monitor service, may be used to update the system landscape database 806. The heartbeat settings may be used to define which such monitor data should be sent, along with the heartbeat messages. In so doing, an amount of network traffic, power and other resources may be conserved. Moreover, by receiving monitor data in the heartbeat messages, relatively-higher tier monitor services may avoid performing at least some polling of lower-tier services, since the upper-tier services may already have the desired monitor data. The device on which the core monitor service 148 is deployed may include the additional monitor data along with heartbeat messages by executing queries on the monitoring data storage, or by reading system adaptors 134 (see FIGS. 6 and 9-11).

Heartbeat messages do not have to be sent over reliable communication channels, to the extent that the ping requestor 808 may, in response to an expected heartbeat message that does not come through, send an additional request, e.g., if two consecutive pings are missing. Therefore, even if the communication channels are unreliable, and heartbeat messages are lost, the core monitor service 148 may continue to function. Accordingly, protocols such as, for example, the lightweight and connection-less User Datagram Protocol (UDP) may be used.

An algorithm consistent with the above explanation of the heartbeat transmitter 810 is provided below in the context of Code Section 3:

Code Section 3

Read heartbeat settings
If time interval has changed then
    Update timer component
Get all data that should be included in the heartbeat message
Send heartbeat message to parent with all queried data
Sleep according to heartbeat settings The ping requestor 808 may be understood as an addition to the heartbeat transmitter 810. For example, as referenced above, in the event of some consecutively lost heartbeat messages, the ping requestor 808 may build up a reliable connection to make sure that the ping is received and processed. Further, if a child device does not have a (functional) heartbeat transmitter 810, then the parent monitor's ping requestor 808 may replace the heartbeat transmitter 810 completely. As a result, the child system does not have to have a heartbeat transmitter installed, so fewer hardware capabilities may be used.

The core monitor service 148 also includes an update notification transmitter 812, which may be configured to provide services with updates about the system landscape, such as, for example, changes in monitor data, or registration of new devices, as may be determined, e.g., from the system landscape database 806. The update notification transmitter 812 thus may emit notification messages to all registered recipients, as stored in a recipient registry 814.

Services registered with the update notification transmitter 812 may precisely specify desired data, so as to obtain only the desired data (and minimize other transmissions). Constraints for what (types of) monitor data updates are transmitted may be based, for example, on the following properties: a name of the data-providing service, or device and name of the data-field (e.g., alive-status, CPU usage, RAM size, or connectivity values. Accordingly, subscription rules for receiving the updates may be stored with the following information: an identifier of the recipient system, and a constraining rule (e.g., a source-system identifier and/or a data-field name). In some implementations, the two restraining conditions may be connected with an AND, so that, for example, both the name of the system AND of the data field must match for an update to be sent. In other implementations, an OR rule may be realized by defining more than one subscription rule.

An algorithm consistent with the above explanation of the update notification transmitter 812 is provided below in the context of Code Section 4:

Code Section 4

Figure 9:
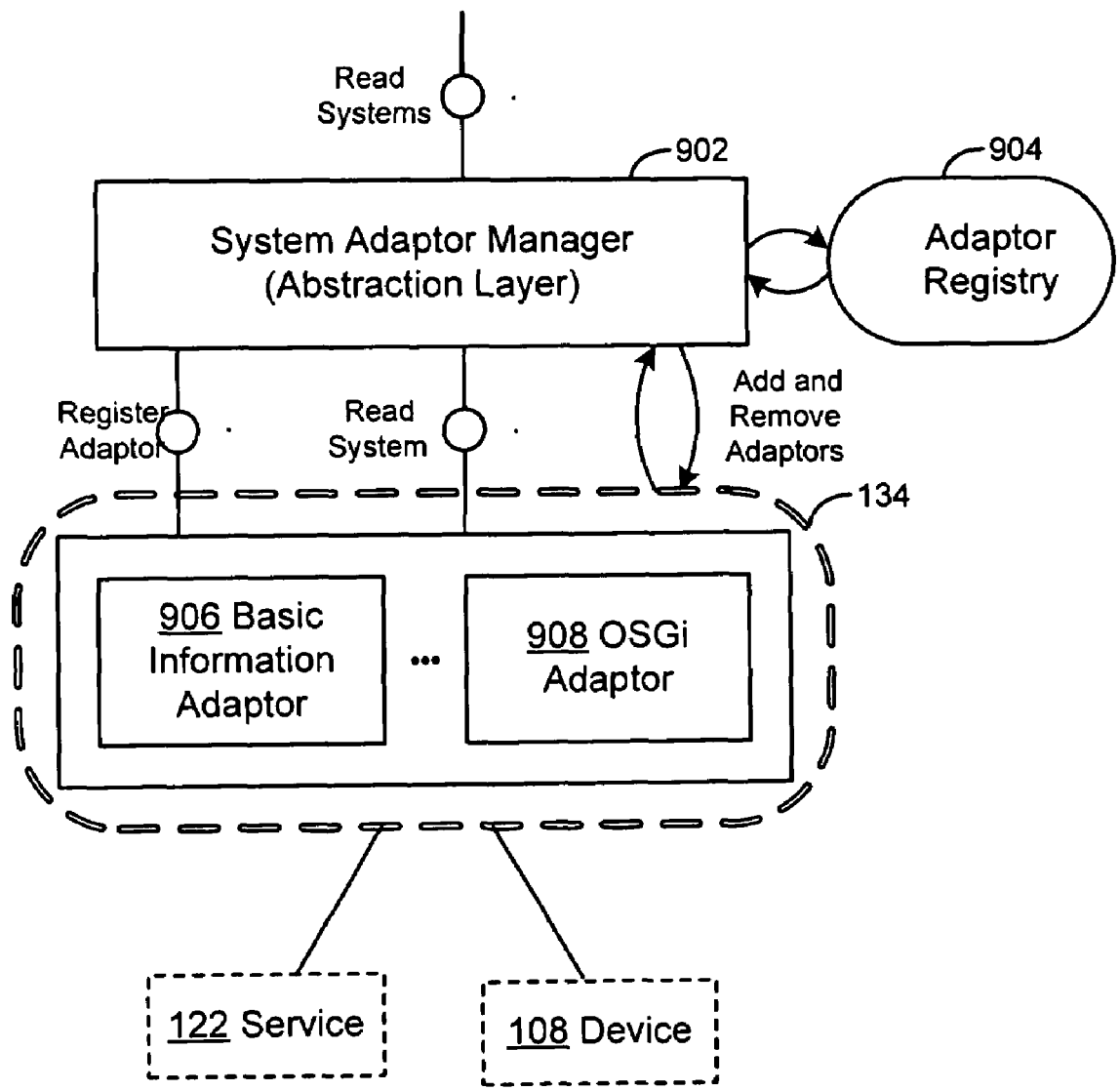
FIG. 9 is a block diagram illustrating a system adaptor manager for use with the modular monitor service of FIG. 6 and/or the implementation of the core monitor service illustrated in FIG. 8.

Query recipient database: get all recipients that are registered for this
    service or device and data field
For all found recipients do
    Send update trigger message FIG. 9 is a block diagram illustrating a system adaptor manager 902 for use with the modular monitor service 600 of FIG. 6 and/or the implementation of the core monitor service 148 illustrated in FIG. 8. Specifically, the system adaptor manager 902 may be used to manage the system adaptor(s) 134. As referenced above, the system adaptors 134 may be configured to provide connections between the core monitor service 148 and the various services and devices (e.g., the service 122 and/or the device 108) that are supplying monitor data. It should be understood that the services, devices, and, therefore, monitor data may vary quite dramatically, due to the potential for heterogeneity in the system landscape. Accordingly, the system adaptors 134 may implement a common interface for communicating with the core monitor service 148, while implementing whatever other interfaces are necessary for monitoring (and, potentially, controlling) the various heterogeneous services and/or devices that may be present, so that the core monitor service 148 need be aware of only this common interface in order to communicate with a large number of types of the system adaptors 134 (and, thereby, a large number of types of services and devices).

Since the core monitor service 148 may be capable of communicating with a large number of the system adaptors 134 (using just the common interface), the core monitor service 148 either does not or cannot determine which of the system adaptors 134 is appropriate for a given task. Rather, a system adaptor manager 902 is used in making such a determination of a particular/correct one of the system adaptors 134 for a given task or setting. As such, the system adaptor manager 902 represents an example of the module manager(s) 150, and provides an abstraction layer between the core monitor service 148 and the system adaptor(s) 134. Accordingly, the core monitor service 148 may be relieved of the duty of tracking, selecting, or otherwise managing the various instances or possibilities of the system adaptors 134, much less of the services or devices themselves.

As referenced above, the system adaptor(s) 134 may include, for example, a service adaptor and/or a device adaptor (see, e.g., FIG. 10), so that communication between the core monitor service 148 (or other monitor service modules 150) and a given service (e.g., the service 122) or device (e.g., the device 108) may be executed, and corresponding monitor data may be obtained. For example, the system adaptors 134 may be considered to be a part of the modular monitor service 600 that provides an interface to the environment (e.g., to the service 122 and/or the device 108). In the case of the device 108, a given one of the system adaptors 134 may determine, for example, a CPU utilization, memory usage, or memory size of the device. In the case of the service 122, a given one of the system adaptors 134 may determine, for example, a software version or software vendor associated with the service 122.

Accordingly, it should be understood that there may be no defined standard interface to the environment (e.g., to various services/devices), since each such service and device may have its own specific interface(s). Rather, the system adaptors 134 may be designed and implemented to fit to the monitored system(s) in question (e.g., the system 100). As such, the monitoring service(s) 132a-132d may read information about devices and services, whose different interfaces are hidden to the core monitor service 148 by the system adaptors 134 and the system adaptor manager 902, so that the latter components provide an abstraction layer for use of the core monitor service 148.

The various types and instances of system adaptors 134 may be stored (or referenced) in an adaptor registry 904, so that the system adaptor manager 902 may determine (e.g., based on a request of the core monitor service 148, or based on a design choice of an administrator) which system adaptor 134 to use in a given situation.

The system adaptor manager 902 may thus be configured to load and manage a variety of system adaptors 134 that implement a common interface. On start-up, the system adaptors 134 may register at the adaptor manager 902. The system adaptor manager 902 may execute a maintenance function of all registered adaptors 134, where a maintenance function of the system adaptor 134 may implement internal management activity, in addition to reading and returning monitor data (e.g., information about currently-running services, device-specific information, or sensor data collected by the device on which the modular monitor service 600 is running).

In the example of FIG. 9, the system adaptors 134 include a basic information adaptor 906 and an OSGi adaptor 908. The basic information adaptor 906 refers generally to service and/or device information that may be collected and used, e.g., in the system 100, such as the many and various examples of device metadata 130 provided above. The OSGi adaptor 908 generally refers to the fact that the system adaptors 134 may support such standardized protocols as OSGi to get information about devices that do not have one of the monitor services 132a-132d installed. Other examples for such protocol standards include the Java API platform JSR232 (which includes OSGi), as well as Java APIs for Bluetooth, JSR82.

Figure 10:
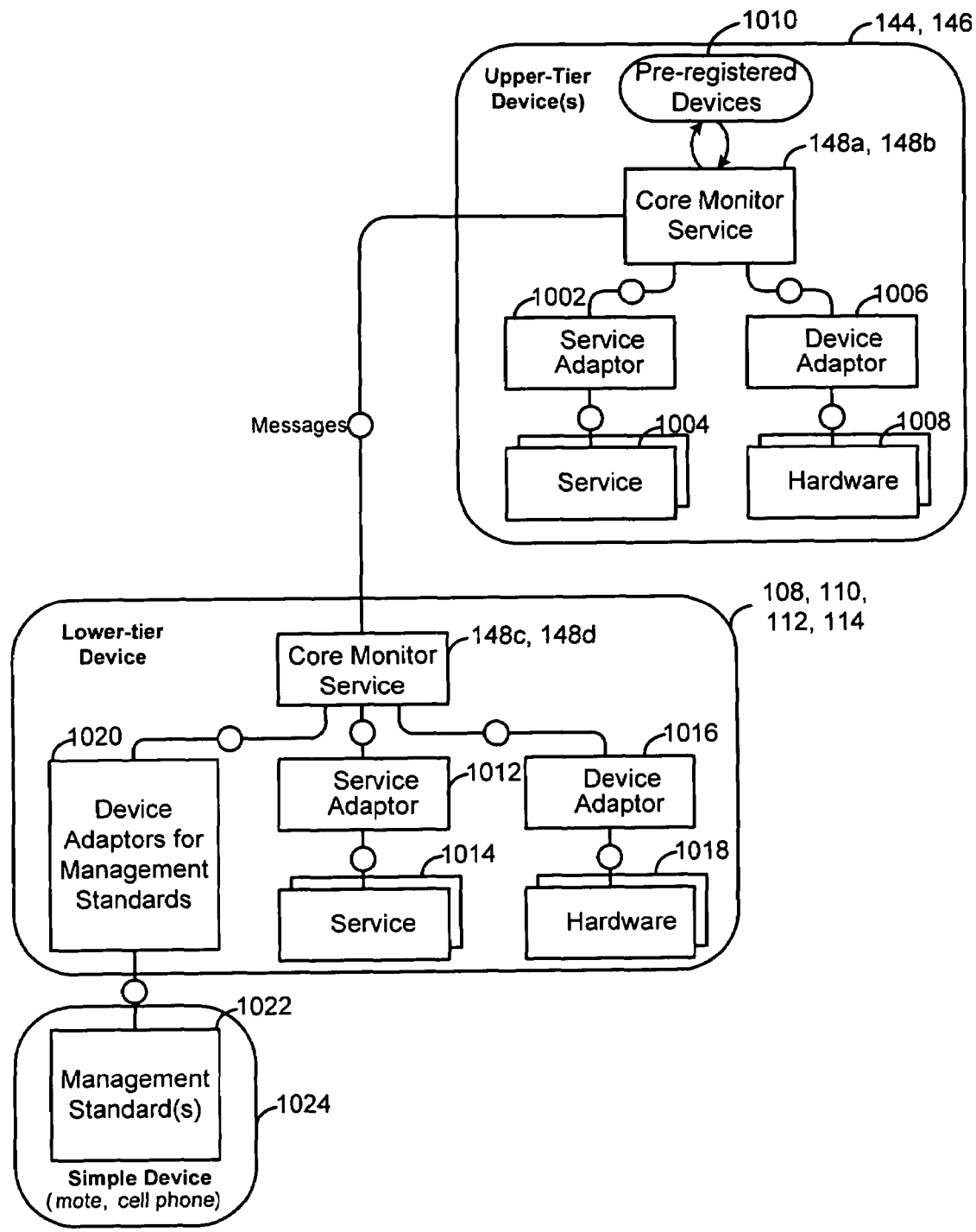
FIG. 10 is a block diagram of an example implementation of a system adaptors of FIGS. 1, 6, and 9.

FIG. 10 is a block diagram of an example implementation of the system adaptors of FIGS. 1, 6, and 9. In the example of FIG. 10, an upper-tier (e.g., global or local layer) device 144, 146 is shown, which may include, for example, a personal computer or server computer. The device(s) 144, 146 include a core monitor service 148a and/or 148b, along with two system adaptors: a service adaptor 1002 (for interfacing with a plurality of services 1004) and a device adaptor 1006 (for interfacing with a plurality of instances/types of device hardware 1008). As shown, the core monitor service 148a, 148b also may communicate with pre-registered devices 1010, which may be configured to interface directly with the core monitor service 148.

Further in FIG. 10, a lower-tier (e.g., group leader or edge) device 108, 110, 112, and/or 114 may represent a relatively more resource-poor device, and may include the core monitor service(s) 148c, 148d. Similarly to the devices 144, 146, the devices 108, 110, 112, 114 include a service adaptor 1012 (for interfacing with a plurality of services 1014) and a device adaptor 1016 (for interfacing with a plurality of instances/types of device hardware 1018). The devices 108, 110, 112, 114 also include a separate device adaptor(s) 1020 that may be used to communicate with devices, e.g., a device 1024, that implements such standards 1022. For example, the device 1024 may represent a sensor mote or cell phone that is running the management standard 1022 (e.g., OSGi), so that the core monitor service 148 may communicate therewith using the standard 1022.

Figure 11:
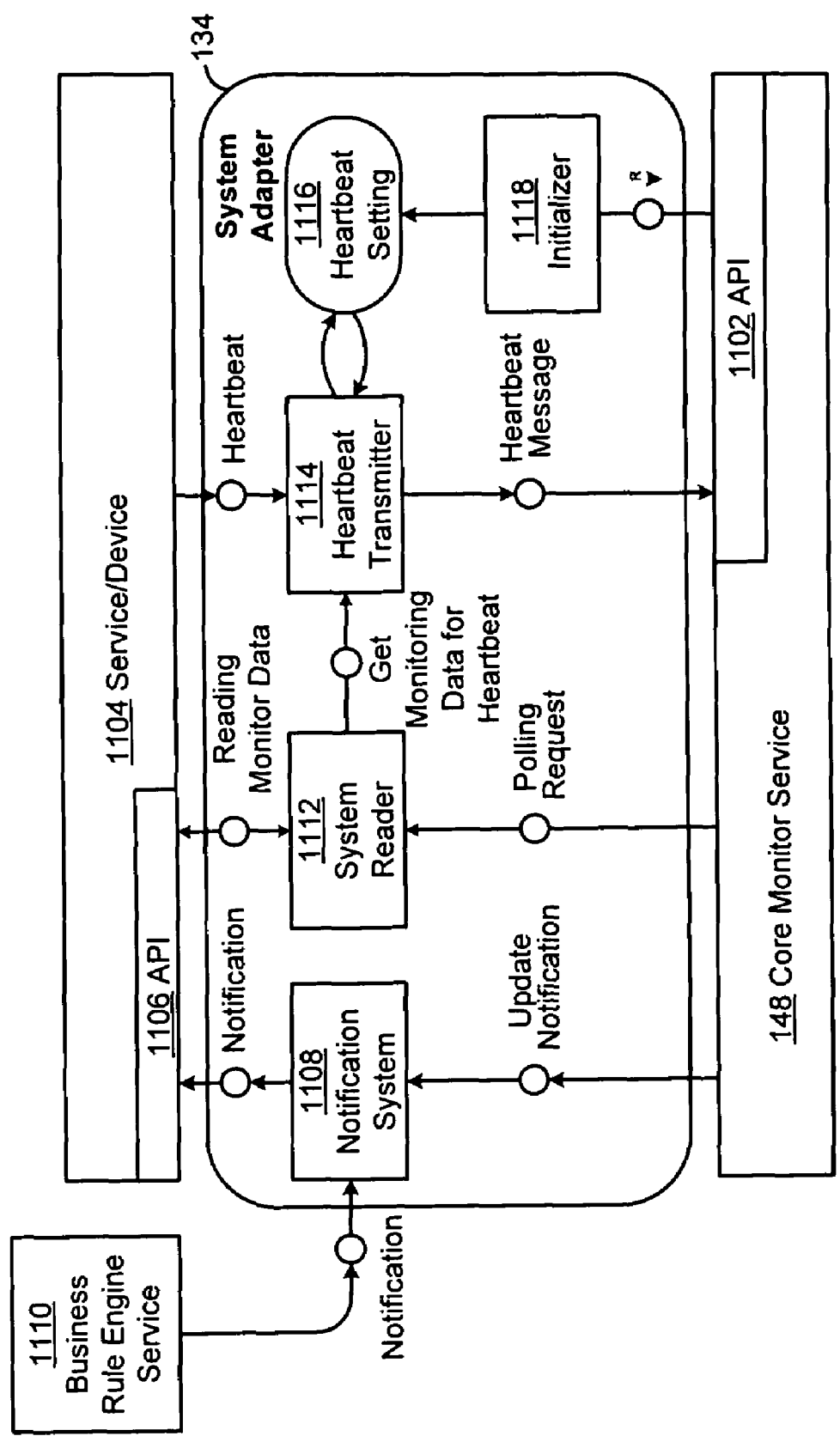
FIG. 11 is a block diagram of another example implementation of system adaptors of FIGS. 1, 6, and 9.

FIG. 11 is a block diagram of another example implementation of the system adaptors of FIGS. 1, 6, and 9. In the example of FIG. 11, the system adaptor(s) 134 is illustrated as communicating with the core monitor service 148. As described above, the system adaptor(s) 134 may communicate with the core monitor service 148 using an API 1102 of the core monitor service 148 that is common to all of the system adaptor(s) 134. The system adaptor(s) 134 also communicate with a service and/or device 1104 using an API 1106, which is specific to the service/device 1104 and to the specific, associated instance of the system adaptor 134 in FIG. 11.

In FIG. 11, the system adaptor 134 includes a notification system 1108 that is configured to receive notifications from the core monitor service 148 (e.g., from the update notification transmitter 812 of FIG. 8). For example, as explained above in the context of FIG. 8, the core monitor service 148 may send updates regarding changes in monitor data, or registration of new services or new devices. The notification system 1108 (which may thus be understood to be included in the recipient registry 814) may subscribe to particular notifications, or types of notifications, and so may receive notifications on a periodic or scheduled interval.

The notification system 1008 also may receive notifications from other services, such as, for example, a business logic rule engine service 1110 (which implement business logic and may trigger reactions to certain real-world events), or a logger or watchdog service (not shown in FIG. 11). The notifications may be forwarded or handled, depending on the implementation of the system adaptor 134, and the system adaptor 134 defines and implements an appropriate reaction to each possible notification.

The system adaptor 134 also includes a system reader 1112 that is configured to read monitor data from the service/device 1104, such as, for example, CPU utilization, battery lifetime, or status of the service (e.g., whether a service is running, or stopped). The system reader 1112 may then provide the monitor data to the core monitor service 148 that is polling the system adaptor 134.

In these and other implementations, the system reader 1112 may provide the monitor data to a heartbeat transmitter 1114. The heartbeat transmitter 1114, generally speaking, is configured to periodically send a life-signal to the core monitor service 148. As just referenced, and as referenced above with respect to FIG. 8, the heartbeat transmitter 1014 also may receive and transmit monitor data from the service/device 1104 (e.g., status values), which allows for a reduction in messaging overhead. As described with respect to FIG. 8, heartbeat settings 1116 may include parameters associated with the heartbeat transmitter 1114, such as, for example, a time interval between heartbeat messages.

Finally in FIG. 11, an initializer 1118 is configured to set up the heartbeat settings 1116, and register the monitor data at the monitor data storage (e.g., the system landscape database 806 of FIG. 8). The initializer 1118 also may be configured to register with the recipient registry 814 for update notification messages at the update notification transmitter 812.

In the examples described herein, processing threads may be used for various tasks, including monitor service maintenance threads, or adaptor threads. Such threads (for, e.g., context switching, thread scheduling, or inter-thread communication) may be created and managed, as needed. The monitor service thread may be used to keep monitor data, as stored in system landscape databases 806 and/or the global/local monitor data 136/138, up-to-date, and may further be used to manage a status of lower-tier services and devices.

System adaptor threads may be implemented separately from the monitor service maintenance thread, so that system adaptors 134 do not block the monitor service maintenance thread by performing complex or time-intensive tasks. The system adaptors 134 may run as separate threads, or may be executed by a thread of an associated monitor maintenance service. In the latter case, the monitor service maintenance thread may be blocked for the time of executing a maintenance function of the system adaptors 134. The system adaptors 134, which may be called by the monitor service, still can create temporary threads that do time-consuming work in the background, so the monitor service thread is not blocked.

System adaptors that use their own threads may generally be more powerful. Also, such system adaptors do not block the monitor service, and so may perform time-consuming tasks, and/or wait for I/O interrupts. Additionally, such system adaptors have more freedom in deciding when to be activated. Thus, such system adaptors are not dependent on calls by the monitor service at an undefined point in time. Timers can be used to actively send heartbeats messages and to update landscape values.

Nonetheless, for limited devices, it may be more appropriate to implement the system adaptors as passive components that use the monitor service thread. In such cases, an overhead of creating and managing threads may be avoided, at a cost of blocking the monitor service while executing the system adaptor in question.

Figure 12:
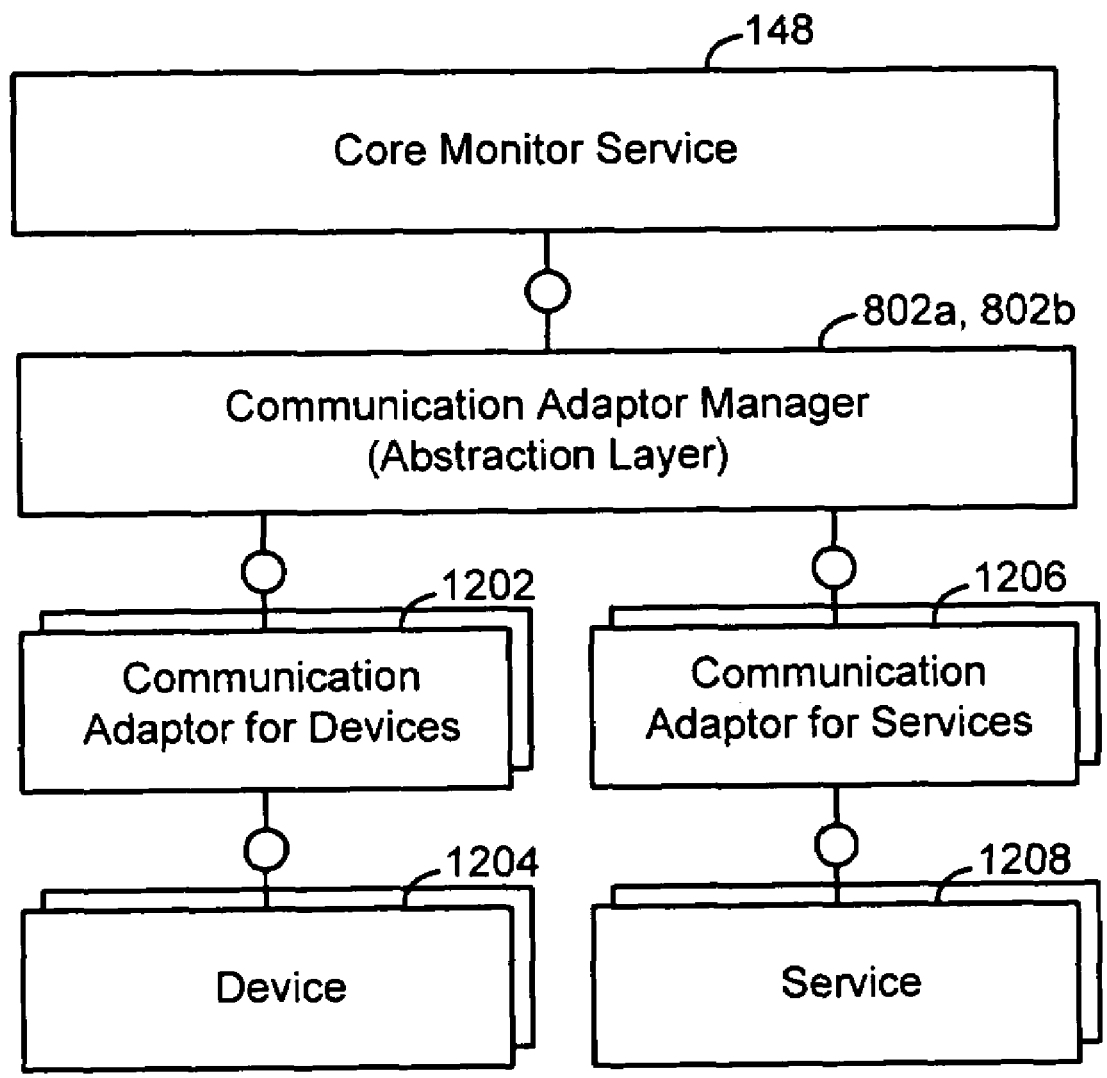
FIG. 12 is a block diagram of an example implementation of a communication adaptor of the modular monitor service of FIG. 6.

FIG. 12 is a block diagram of an example implementation of the communication adaptor 602 of the modular monitor service 600 of FIG. 6. As shown, a communication adaptor manager 802a, 802b may act as the communication abstraction layer of FIG. 8 that communicates with the core monitor service 148. The communication adaptor manager 802a, 802b, analogously to the system adaptor manager 902, manages and communicates with a communication adaptor 1202 for devices (so as to communicate with device(s) 1204), as well as with a communication adaptor 1206 (so as to communicate with the service(s) 1208). As should also be understood from the above description of the system adaptor manager 902, the communication adaptor manager 802a, 802b (communication abstraction layer) may be configured to load/unload the communication adaptors 1202, 1206, and to register (or de-register) the communication adaptors 1202, 1206.

Figure 13:
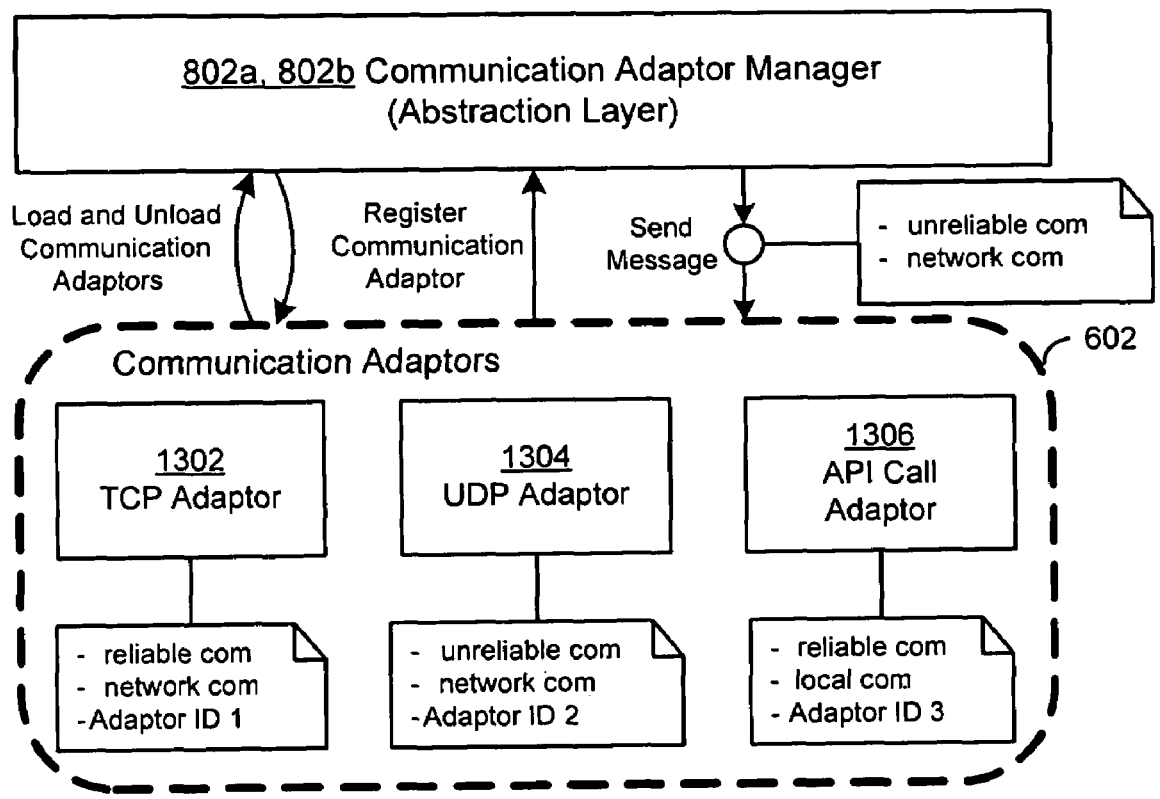
FIG. 13 is a block diagram of another example implementation of the communication adaptor(s) of FIG. 6.

FIG. 13 is a block diagram of another example implementation of the communication adaptor(s) 602 of FIG. 6. In FIG. 13 (as in FIG. 12), the communication adaptor manager (abstraction layer) 802a, 802b may support both local method calls and network communication. Furthermore, the communication adaptor manager (abstraction layer) 802a, 802b may operate to make communication protocols and network devices opaque to the core monitor service 148.

For example, message handling and socket communication may be used for network communication. Further, local communication may be realized using messages, APIs, sockets, pipes, and/or shared memory.

Thus, the communication adaptor manager 802a, 802b (communication abstraction layer) hides currently-used protocols (e.g., Transfer Control Protocol (TCP), Uniform Datagram Protocol (UDP), Internet Protocol (IP), Hyper Text Transfer Protocol (HTTP), or File Transfer Protocol (FTP), which may work on different ISO/OSI layers, and/or which may be combined. The communication adaptor manager 802a, 802b (communication abstraction layer) also may hide network devices 1204 (e.g., Bluetooth, modem, or WiFi devices). The communication adaptor manager 802a, 802b (communication abstraction layer) also may hide certain communication concepts (e.g., message passing, sockets, shared memory, or API calls).

In other words, as already described with respect to the system adaptor 134, the communication adaptor manager 802a, 802b may load or unload, for example, a TCP adaptor 1302, a UDP adaptor 1304, or an API call Adaptor 1306, which may each present a common interface to the core monitor service 148. Thus, by making communication opaque for the core monitor service 148 and other services, the example of FIGS. 12 and 13 may allow avoidance of dealing with protocols, network devices, sequence numbers, or transmission errors.

In FIG. 13, each of the adaptors 1302-1304 is identified as being associated with either network (1302, 1304) or local (1306) communication. Further, each of the adaptors 1302-1304 is identified as being associated with either reliable (1302, 1306) or unreliable (1306) communication. Each of the adaptors 1302-1306 also may be associated with a unique identifier (Adaptor ID), for use by the communication adaptor manager 802a, 802b in selecting or loading the respective adaptor.

In general, unreliable data transfer may be much simpler and therefore less resource consuming than reliable transfer. Therefore, unreliable data transfer may be preferred, where possible. Some functionality, however, such as pinging a system, may require reliable data transfer (and corresponding communication adaptor).

So, in general, it should be understood from the example of FIG. 8 that the core monitor service 148 may send and receive different types of messages, and the communication adaptor manager 802a, 802b may be used to select a corresponding, appropriate communication adaptor to execute the sending or receiving. For example, the core monitor service 148 may need to send a message over a network, using a lightweight and unreliable transport protocol. In this example, the communication adaptor manager 802b may locate the UDP adaptor 1304, among all loaded adaptors, which implements an unreliable network communication. The communication adaptor manager 802b then forwards the message to the UDP adaptor 1304, which performs the actual communication.

Figure 14:
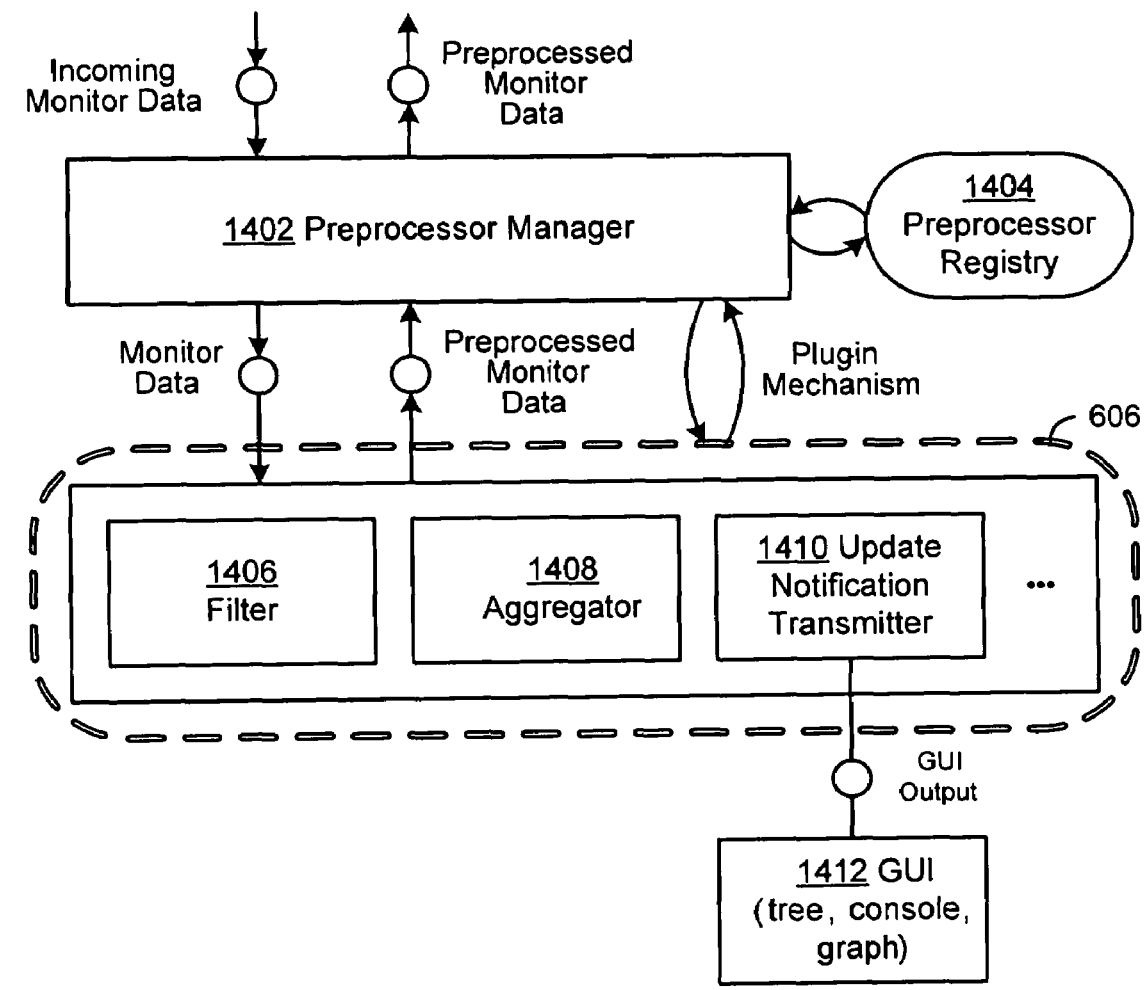
FIG. 14 is a block diagram of an example implementation of a preprocessor module of FIG. 6.

FIG. 14 is a block diagram of an example implementation of the preprocessor module 606 of FIG. 6. For example, the preprocessor module 606 may be used by one or more of the various monitor services 132b-132d to process monitor data locally before forwarding the processed monitor data to the next higher tier of the architecture of the system 100 of FIG. 1.

In FIG. 14, a preprocessor manager 1402 is configured to operate similarly or analogously to the adaptor managers 802a/802b and 902, described above. For example, the preprocessor manager 1402 may interface with a preprocessor registry 1404 to determine an appropriate one of the possible preprocessor modules 606, for use with the core monitor service 148. As shown, the preprocessor manager 1402 may be configured to receive incoming monitor data, such as from a local service or device, and perhaps by way of the core monitor service 148 and appropriate system adaptor 902 and/or communication adaptor 802b. After preprocessing by the preprocessor module(s) 606, the preprocessor manager 1402 may output the preprocessed monitor data, e.g., back to the core monitor service 148 for transmission to the next-higher tier of the system monitor architecture.

For example, the preprocessor module(s) 606 may include a filter 1406, an aggregator 1408, and an update notification transmitter 1410. For example, the filter 1406 may be configured to remove certain types of monitor data, or certain amounts. The aggregator 1408 may be configured to combine received messages for transmission of a combined message. For example, the group leader monitor service 132c may receive a message from each edge device 110-114 for aggregation thereof, or may receive a series of message from a single edge device (e.g., the edge device 110).

The update notification transmitter 1410, as described above, may be configured to provide updates, similarly to the update notification transmitter 812. In the example of FIG. 14, the update notification transmitter 1410 communicates updates to a GUI 1412, for viewing, e.g., by a system administrator. Of course, the example of the GUI 1412 may be most appropriate at higher-level tiers of the monitoring architecture. Further, in addition to aggregation and filtering, logging, computation of statistics, and other data preprocessors may be used for monitoring data.

For example, the system adaptor 134 may deliver the CPU utilization every second, with a requirement that the average utilization over the last two minutes be determined. To support scalability, the monitored data values may be preprocessed near to the measuring system adaptor. In this way, communication resources are conserved, since the need to send each data value (once a second) to the upper tier(s) may be avoided. Instead, e.g., on demand, only the aggregated value may be sent.

In operation, different ones of the preprocessor modules may register at the core monitor service 148. As monitor data (e.g., status values) come in, each of the registered preprocessors is executed. For example, a first preprocessing module may receive the raw monitor data as a parameter(s), and may return a preprocessed data set. Subsequently, the next preprocessor is started, and received the preprocessed output data from the first preprocessor. Accordingly, each preprocessor may be executed, working on the output data of its predecessor.

In such examples, when using such a sequential execution of modules (e.g., plug-ins), it may be necessary to order execution of the plug-ins appropriately. For example, two modules may register with the core monitor service 148 and/or the preprocessor manager 1402. In this example, the first module may delete all data of a specific service or device, while the second module may compute the average CPU utilization over all monitored devices. Clearly, the result is different if the order of the two modules changes, because then all monitored services and devices are taken into account, including the specific service or device to be deleted.

Accordingly, the preprocessor manager 1402 may, e.g., during registration, set the appropriate execution order. To the extent that a number and type of preprocessor modules 606 may be unknown at design-time, it may be difficult to assign an absolute execution order, particularly when the preprocessor modules may be loaded dynamically at runtime. Consequently, one option is to create groups of the preprocessor modules 606, so as to order the preprocessor modules 606 according to group. Each preprocessor module 606 may be associated with a group identifier, so as to be put into the correct group during registration. Then, the groups may be executed in order on a group-level, if not at the level of individual preprocessor modules. Groups may be ordered based on, for example, a priority and/or type of pre-processing performed. For example, a first group may include preprocessor modules that must work on raw data, while a second group may work on already-preprocessed data, and a third group may process final data. Thus, a modular or plug-in concept for the preprocessing modules 606 (e.g., 1406-1410) may increase a scalability of the system 100 of FIG. 1, and may address resource-constraint issues. For example, scalability may be increased by relieving the global monitor service 132a and the local monitor service 132b from some or all preprocessing tasks. Furthermore, the modular architecture allows the monitor service 132a-132b configurable to the needs and capabilities of each device.

Other types of monitor service modules 150 may be implemented. For example, as shown in FIG. 6, a data storage module 604 may be used. For example, depending on capabilities of a device on which the global monitor service 132a and the local monitor service 132b are installed, a different technology for storing monitor data in the global monitor data 138 may be chosen than is chosen for storing monitor data in the local monitor data 136, e.g., either may store data in one or more of a database, a text file, an in memory data-structure, or virtually any other kind of data storage. Use of the data storage module 604 may make such differences opaque to the monitoring service in question, using the various techniques described above with respect to FIGS. 6-14. For example, the monitor data storage may be encapsulated by a well-defined interface, and the interface may serve as an abstraction layer from the actual data storage system.

Figure 15:
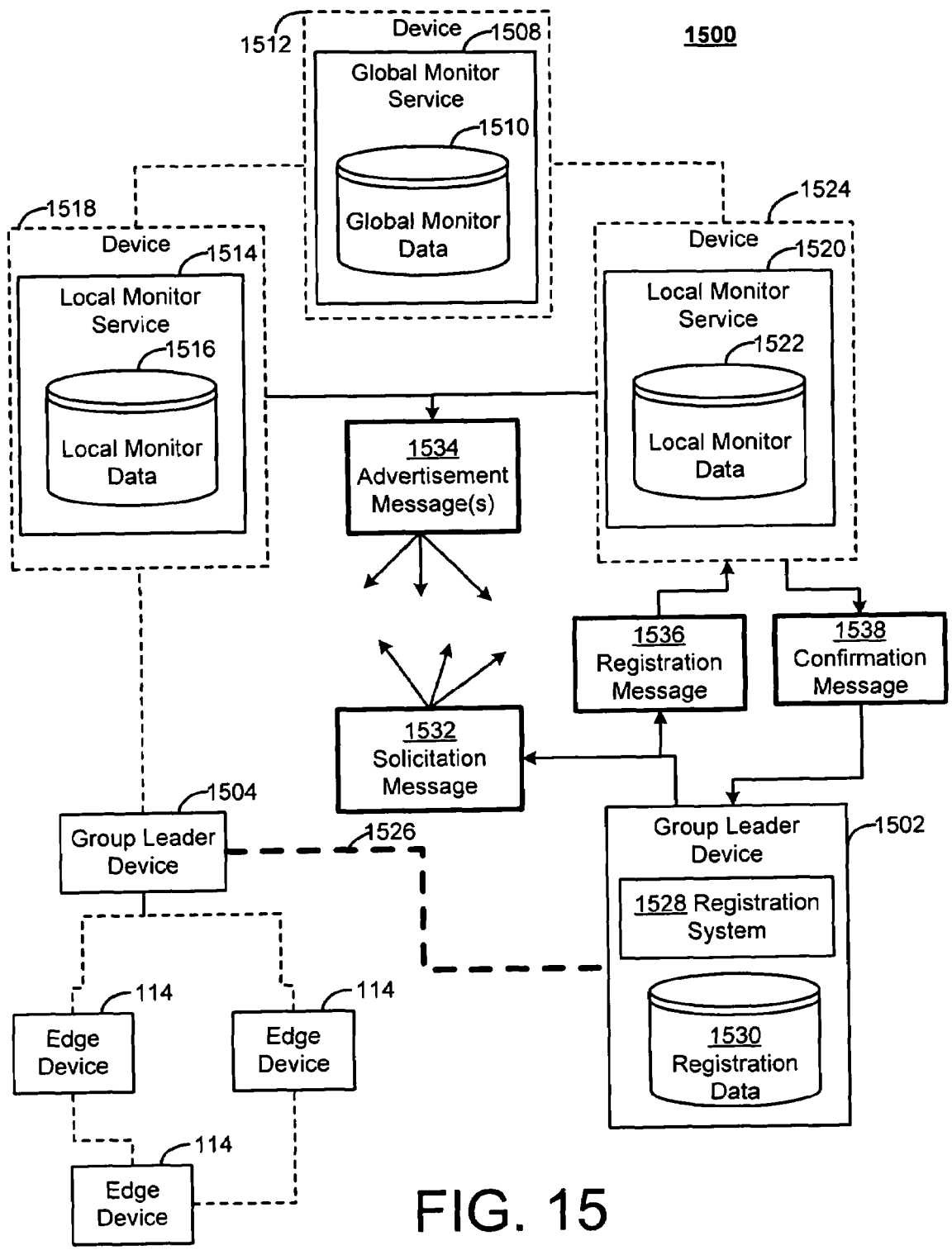
FIG. 15 is a block diagram of a system illustrating a registration protocol for use with the system 100 of FIG. 1.

FIG. 15 is a block diagram of a system 1500 illustrating a registration protocol for use with the system 100 of FIG. 1. In FIG. 15, a group leader device 1502, which may be a portable device (e.g., a PDA or laptop), enters into an area of a group leader device 1504. As shown, the group leader device 1504 is a group leader of a plurality of edge devices 1506a, 1506b, 1506c of a sensor network. Thus, for example, the group leader device 1504 and the edge devices 1506a, 1506b, 1506c may be involved in any number of sensor network applications, including, for example, inventory management or hazardous material tracking.

Accordingly, for example, the group leader device 1504 (which may be, for example, the same as the edge devices 1506a, 1506b, 1506c, or which may be a WiFi access point or a base station, as referenced above) may be in the process of collecting information (i.e., monitor data) associated with inventory in a warehouse. For example, such monitor data may include a type and quantity of stocked goods for sale, and/or current temperature information in a vicinity of the stocked goods (e.g., to detect possible spoilage of food products). Thus, the group leader device 1502 may enter the area of the group leader device 1504, such as when an employee enters the area with a PDA or other computing device, and wishes to obtain desired monitor data.

In the above example, and similar examples, the group leader device 1502 may wish to collect the monitor data for local use by the employee, and/or may itself collect/transmit monitor data to a global monitor service 1508. In the latter case, for example, the group leader device 1502 may have certain computing resources or capabilities not available (or, at least, not currently available) in the group leader device 1504. It should be understood that, in the example of FIG. 15, the group leader device 1502 may actually be currently acting as a group leader to a plurality of edge devices (not shown in FIG. 15), or may be referred to as a group leader device in the sense that sufficient computing resources are present to act at the group leader tier of the infrastructure described herein (e.g., to split messages for distribution to edge devices, or to filter/aggregate messages from the edge devices for subsequent transmission). In still other examples, it may be the case that the group leader device 1504 has failed, or is about to fail (e.g., due to low battery power), or is required to re-locate, so that the group leader device 1502 is being re-located for the purpose of assuming the duties of the group leader device 1504.

In the example of FIG. 15, the global monitor service 1508 includes global monitor data 1510, and operates on a device 1512 (which may include, as described herein, a PC or similarly-powerful computer). The global monitor data 1510, as already described, may include global landscape data related to the system 1500 as a whole, including other elements not shown in FIG. 15. For example, the global monitor data 1510 may include device metadata describing the group leader 1504 and the edge devices 1506a, 1506b, 1506c (including, for example, both static and dynamic device capabilities).

Moreover, the global monitor service 1508 may include device metadata related to the group leader device 1502. For example, the group leader device 1502 may previously have been registered with the global monitor service 1508 as part of a separate network(s) (not shown in FIG. 15). As the employee operating the group leader device 1502 re-locates from the separate network to the area of the devices shown in FIG. 15, the group leader device 1502 may disconnect as part of the separate network (and be marked as such within the global monitor data 1510, as already described), although information regarding the group leader device may be maintained in the global monitor data 1510 for some period of time.

The system 1500 further includes a local monitor service 1514, with local monitor data 1516 and running on a device 1518. The device 1518 may include, for example, a laptop computer or a Stargate computer, as described. Further, the system 1500 may include a local monitor service 1520, with local monitor data 1522 and running on a device 1524.

In the example of FIG. 15, then, the group leader device 1502 may need to register with the global monitor service 1508 in order, for example, to establish a connection 1526 with the group leader 1504. For example, it may be the case that the group leader device 1502 and the group leader device 1504 may have overlapping abilities to communicate with one another; e.g., both may have Bluetooth capabilities. Even so, the group leader device 1502 may be unaware that the group leader device 1504 has Bluetooth capabilities, and, moreover, the group leader device 1502 may have no local communication service (e.g., adaptor/module) that is compatible both with Bluetooth and with whatever service(s) are being run on the group leader device 1504 (e.g., the temperature reporting service referenced above).

In contrast, however, the global monitor service 1508 may be well aware of all such information, as stored within the global monitor data 1510 (e.g., appropriate service metadata and/or device metadata). Of course, information regarding the group leader device 1504 also may be stored in the local monitor data 1516, as should be understood from the description above. Thus, the global monitor service 1508 is (indirectly) capable of establishing the connection 1526, since, for example, the global monitor service 1508 may be able to determine which communications services (adaptors/modules) are needed, and may then download and/or inject such a service(s) onto the group leader device 1502. The global monitor service 1510 also may communicate with the group leader device 1504, in order to ensure (by injecting, if necessary) that the group leader device 1504 not only has Bluetooth (or other communication protocols/standards), but also has a local service that is compatible both with Bluetooth and with a corresponding service on the group leader device 1502.

In this way, the connection 1526 may be established. In analogous situations, the group leader 1502 may otherwise communicate with other devices/services of the system 1500. Thus, registration of the group leader device 1502 within the system 1500 may provide a number of advantages, for example, to a user of the group leader device 1502.

Such registration, however, may be associated with a number of difficulties. For example, such registration may represent a security issue, since unregistered and possibly malicious devices should not generally be monitored and integrated into the system 1500. Also, frequent exchanges of registration messages may consume valuable bandwidth, battery power, or other communications resources. If devices are not registered, though, then such devices may be un-identified and un-accessed by the rest of the system 1500.

Figure 16:
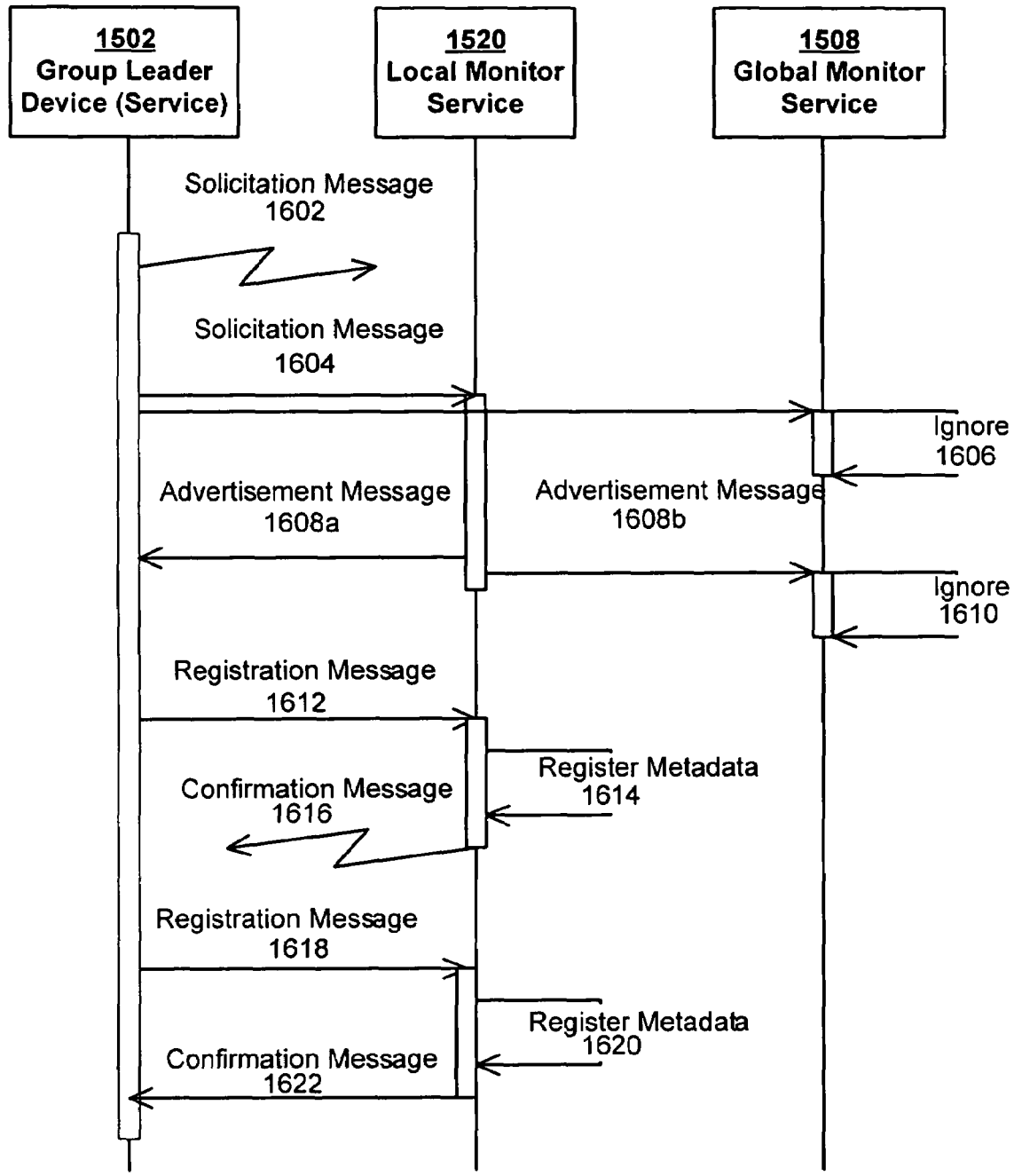
FIG. 16 is a sequence diagram illustrating an example implementation of the registration protocol of FIG. 15.
Figure 17:
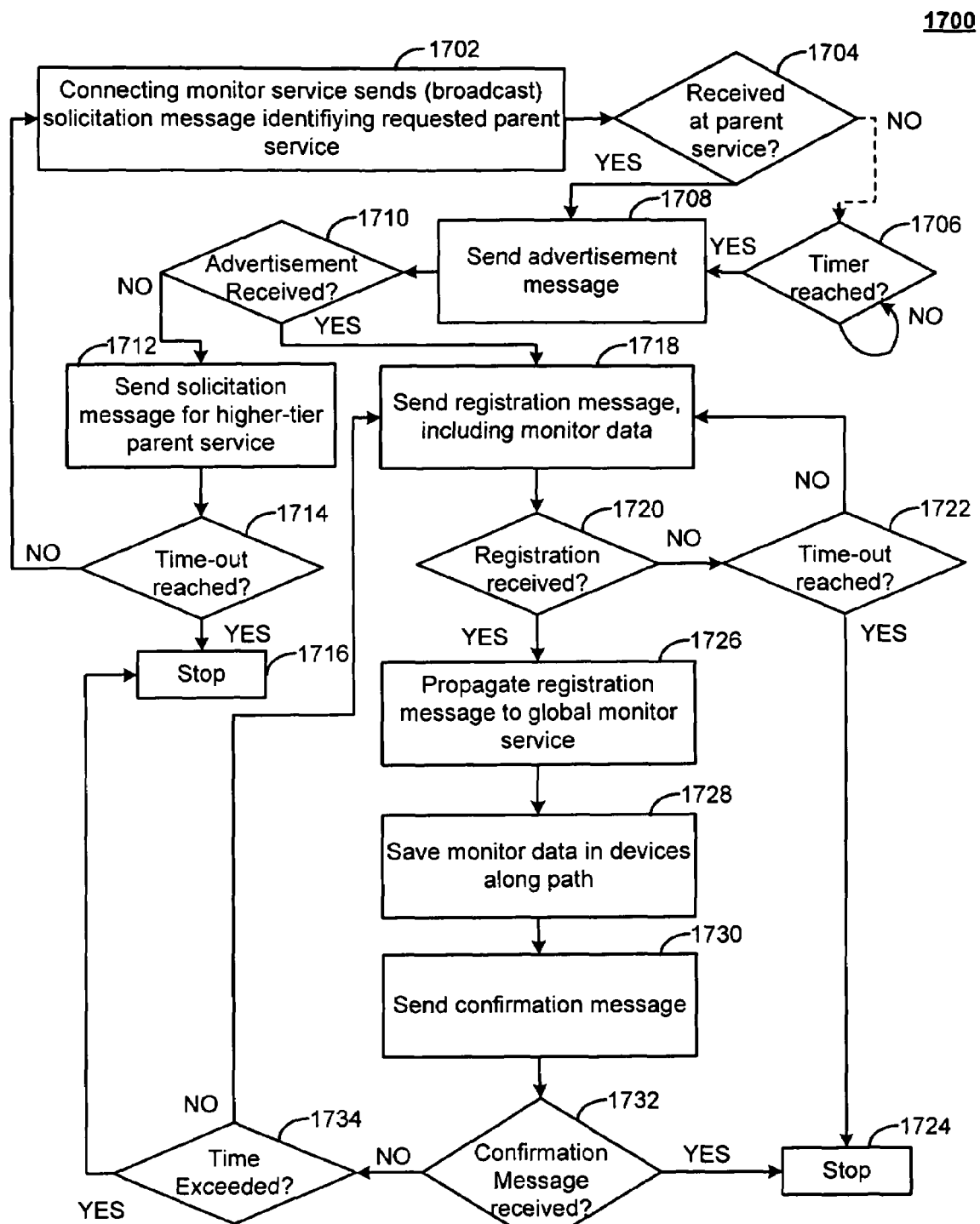
FIG. 17 is a flowchart illustrating example operations of the system of FIG. 15.

Thus, the following description, along with FIGS. 15-17, provide examples of how the group leader device 1502 may register with the global monitor service 1508. Of course, it should be understood that this is but one example, and many other examples may be used to implement the described registration protocol, or variations of the described registration protocol, as would be apparent.

In FIG. 15, then, it is assumed for the example that the group leader device 1502 has a monitor service installed thereon (although not shown in FIG. 15). Such a monitor service may include the various implementations described herein, including the modular monitor service of FIG. 6, or may include a non-modular, e.g., integrated, monitor service. The group leader device 1502 and its installed monitor service thus attempt to join the network(s) of the system 1500, including registering at the global monitor service 1508.

The group leader device 1502 includes a registration system 1528 and registration data 1530. The registration system 1528 is configured to exchange registration messages 1532, 1534, 1536, and 1538 with one or more of the local monitor services 1514, 1520 (and/or with the global monitor service 1508). The registration data includes information about the connecting monitor service of the group leader device 1502, such as, for example, metadata related to a current status of the group leader device 1502, or device metadata related to the group leader device 1502. The registration data also may include initial sensor status/values information (e.g., to avoid overhead caused by an initial polling for such values, which would take place right after registration, since data is outdated or not existent. In cases where an excessive amount of values would be included in the registration data, then at least static data values may be sent).

Although registration data 1530 is illustrated conceptually as/in a memory in FIG. 15, it should be understood that the registration data 1530 may simply represent values collected by the group leader device 1502 (e.g., by the registration system 1528 and/or by a monitor service of the group leader device), either during or before registration takes place. Of course, the group leader device 1502 may have a memory in some example implementations. Moreover, in cases where a local monitor service attempts to register with a new network, then it should be understood from the above description that a local memory (e.g., the local monitor data 1516, 1522) may be used. More generally, it should be understood that the registration system 1528 and registration data 1530, or variations thereof, may be implemented within other ones of the devices and monitor services of FIG. 15.

The described registration protocol may be implemented as a simple, e.g., connectionless, protocol, that is robust. Additionally, the registration protocol is configured to support both active registration (e.g., initiated by a connecting device) and passive registration (e.g., initiated by a connected network device). Consequently, as described, the registration process may be started by either device.

In FIG. 15, then, the group leader device 1502, as an unregistered-but-now registering device sends out a solicitation message 1532. The solicitation message 1532, which may be sent as a broadcast message, may contain a request for, or identification of, a specific type of same or next-higher level monitor service, and the request may be based in part on device capabilities of the connecting device. For example, if the (registering) group leader device 1502 has certain capabilities (e.g., is a mobile phone), then it may try to locate other group leader devices (e.g., the group leader device 1504, i.e., a monitor service thereof) and/or local monitor services (e.g., 1514, 1520), rather than the global monitor service 1508.

If no suitable instance of the preferred monitor service type is found, then the registration system 1528 may re-send the solicitation message 1532 with an identification of a next-higher level (going up from lower to higher level monitor services). Further, if the solicitation message 1532 is lost, then the registration system 1528 may simply send another solicitation message, e.g., after a timeout. Solicitation messages that are received twice are not an issue, since this is the initial step of the protocol. Therefore, a lightweight and connectionless transportation protocol, e.g., UDP, may be sufficient.

Accordingly, the solicitation message 1532 may be sent out periodically if no answer is received. After some repetitions, the group leader (i.e., registering, or connecting) device assumes that there is no monitor service, and stops sending messages for at least a specified time interval, which saves power and computation time.

Meanwhile, already-connected and registered services of the system 1500 (e.g, the local monitor service 1520) may send out an advertisement message 1534. The advertisement message 1534 may be sent, for example, either in response to a timer or to the solicitation message 1532. The advertisement message 1534 may include an identification of a type of monitor service that is sending the advertisement message 1534 (e.g., the local monitor service 1520 in the example of FIG. 15). By receipt of the advertisement message 1534, other monitor services in the network become aware that there is a monitor service of a designated type that is currently accepting child monitor services, and become aware of how to communicate with this available monitor service. The advertisement message 1534 may be sent as a broadcast message, and may be sent by any or all of the devices described herein (except, generally, the various edge devices, to the extent that the edge devices do not typically have any child monitor services connected thereto).

The advertisement message 1534 provides a fail-safe mechanism in case the solicitation message 1534 is lost, and also may act as an initiator of the registration process, e.g., for devices that do not send solicitation messages. For example, the group leader device 1502 may, as referenced above, stop sending solicitations after a specified time period, or if devices cannot detect network changes. Using the advertisement message 1530, such devices may be "reactivated." Also, lost advertisement message are not disruptive, in that they may be resent from time to time.

A connecting/registering device, such as the group leader device 1502, may respond to the advertisement message 1534 once by sending a registration message 1536. As referenced above, the registration message 1536 may contain, for example, information about monitored data, landscape metadata, device metadata, and/or actual monitored (e.g., sensor) values.

Once the registration message 1536 is successfully received at the sender of the advertisement message 1534 (i.e., the local monitor service 1520), registration data may be saved in all devices on the path from the receiving, parent monitor to the global monitor service 1508 (e.g., in the example of FIG. 15, may be stored at the device 1524 and 1512, as well as at any intervening devices). In other words, the registration message 1536 is forwarded to the upper layer monitor services.

Outdated data within the memories (e.g., 1510, 1522) of the upper layer monitor service may be marked as "in doubt," and/or may be deleted to avoid inconsistencies. For example, the global monitor data 1510 may have information from a previous registration event that the group leader device 1502 is currently connected to another network (not shown in FIG. 15). As the group leader device 1502 is moved away from devices of the former network, however, the former connection is lost, so that data within the global monitor data 1510 becomes outdated. Once the group leader device 1502 registers again through the local monitor service 1520, as shown in FIG. 15, then a current registration status, location, and other information/data within the global monitor data 1510 may be updated accordingly.

The registration system 1536 may ensure that duplicates of the registration message 1536 are not problematic, by allowing only one message-triggered registration message 1536 during a registration process. That is, the registration system 1536 may be configured to ignore any additional advertisement message(s) 1534, once the registration message 1536 is sent.

The registration message 1536 then obtains a confirmation message 1538 to ensure that the registration was processed successfully. If no confirmation has arrived after a pre-determined time, the registration message 1536 may be resent. Duplicate registration messages are no problem in such implementations, because one registration may be allowed to override another registration without causing any harm. Additionally, or alternatively, duplicated registration messages may simply be ignored if the relevant service or device is already registered.

The confirmation message 1538 may be sent by the managing monitor service (e.g., the local monitor service 1520). The registration process finishes when the registering device (the group leader device 1502) receives the confirmation message 1538 (if the confirmation message 1538 is not received, e.g., is lost, then the group leader device 1502 may simply re-send the registration message 1536). The now-registered monitor service of the group leader device 1502 may then begin its assigned monitoring tasks. Thus, the registration protocol of FIG. 15 allows for connectionless and unreliable data transfer, so that simple and robust protocols, e.g., UDP, may be used.

FIG. 16 is a sequence diagram illustrating an example implementation of the registration protocol of FIG. 15. In the example of FIG. 16, various exceptions occur, in order to illustrate the robust nature of the protocol.

In particular, a solicitation message is sent from the group leader device 1502 (e.g., from a group leader monitor service installed thereon) to the local monitor service 1520, but is not received (1602). That is, the solicitation message includes an identification that it is a local monitor service that is desired as a parent device, but no such potential parent device receives or responds to the message.

After a designated time, a second solicitation message(s) is/are sent (1604), which is received at both the local monitor service 1520 and the global monitor service 1508. As described above, the registration system 1528 may determine that because the sending of the first solicitation message (1602) was unsuccessful, it may be necessary to send a second solicitation message.

In this case, both the local monitor service 1520 and the global monitor service 1508 receive the solicitation message (1604). However, the global monitor service 1508 simply ignores (1606) the solicitation, since the solicitation specifies the local monitor service 1520.

Then, the local monitor service 1520 sends out an advertisement message (1608*a* and 1608*b*). The advertisement message may be sent (1608*a*) in response to the sending of the solicitation message(s) (1604), or may be sent based on a timer value. The sending of the additional advertisement message (1608*b*) as part of a broadcast thus arrives at the global monitor service 1508, but is ignored (1610).

The group leader device 1502 then sends a registration message (1612), causing the local monitor service to register associated metadata (1614). At this point, although not shown, the registered metadata may be forwarded to the global monitor service 1508 (e.g., using delta synchronization). Then, a confirmation message may be sent, but, in the example of FIG. 16, is not received at the registration system 1528 (1616). Accordingly, the registration system 1528 of the group leader device 1502 simply resends the registration message (1618), which is then received again at the local monitor service 1520, and either re-registered (1620) or ignored. A confirmation message is sent again, and this time is received at the group leader device 1502 (1622), thus ending the registration process.

FIG. 17 is a flowchart 1700 illustrating example operations of the system 1500 of FIG. 15. In the example of FIG. 17, a connecting monitor service (e.g., a monitor service of the group leader device 1502, which may include or be associated with the registration system 1528) broadcasts a solicitation message (e.g., the solicitation message 1532), including an identification of a desired parent service from within the hierarchical monitor architecture of the system 1500 (1702).

If the solicitation message 1532 is not received at the parent service (e.g., at the local monitor service 1520) (1704), then the parent monitor service may continue waiting for a pre-defined timer (1706). Thus, if the timer is reached, or if the solicitation message is received at the parent monitor service, then the parent monitor service may receive the resulting advertisement message, e.g., the advertisement message 1534 (1708). As should be understood, then, the advertisement message 1534 may be sent whether the solicitation message 1532 is received or not, thus increasing the likelihood of connection/registration of the connecting device.

If the advertisement message 1534 is not received at the connecting device (1710), then the connecting device may re-send the solicitation message 1532 (1712), perhaps identifying a next-higher level of the hierarchical monitor architecture as the desired parent service (e.g., the global monitor service 1508 instead of the local monitor service 1520, 1514). In this case, as long as a time-out is not reached (1714), then the process may continue until a registration and/or advertisement message(s) are exchanged. Otherwise, the process is stopped (1716). In this regard, it should be understood that the time-out condition may refer literally to a period of time that has passed, or may refer to the sending of a pre-defined number of (a certain type of) message(s).

It should be understood, of course, that the advertisement message may be resent (1708), according to its associated timer (1706), even if the process was previously stopped or failed. Moreover, virtually any "stop" condition in FIG. 17, including the stop condition (1716), may be temporary, and the process may continue after some further-defined period is reached.

If the advertisement message is received (1710), then the connecting device may send a registration message, e.g., the registration message 1536, to the parent monitor service identified in the advertisement message (1718). If the registration message is not received (1720), and a timer is not reached (1722), then the connecting device may re-send the registration message (1718). As described, the registration message may include monitor data, so that, if the registration message is received (1720), the registration message may be propagated up the hierarchy (1726), e.g., to the global monitor service 1508. In this case, the monitor data, including metadata about the connecting device and actual sensor values may be saved at some or all of the intervening devices (1728), e.g., the local monitor service 1520. By propagating the registration/monitor data in this way, the global monitor service 1508 may keep track of the existence of the connecting service/device, and may delete eventual left-over data marked as "in doubt" that may otherwise cause inconsistencies (e.g., the same device registered in different networks simultaneously).

Then, the parent monitor service may send a confirmation message (1730), e.g., the confirmation message 1538. If the confirmation message is not received (1732), and a time-out has not been reached (1734), then the registration message may be re-sent (1718), and the above-described process may be repeated, in whole or in part. If the time-out is exceeded (1734), or if the confirmation message is received, then the registration process ends, as well (1724).

The just-described registration protocol(s) may be implemented when the connecting device (e.g., the group leader device 1502) already has a monitor service installed thereon. As described above with respect to FIG. 7B, however, if the connecting device does not have a monitor service installed thereon, then a pre-registration process may be conducted in which, as described above, a boot-strapping technique may be used in which the core monitor service 148 is installed, and then is used to execute the remaining registration processes of FIGS. 15-17.

As just described, a robust and reliable registration protocol of FIGS. 15-17 allows for the use of unreliable/connectionless communications protocols, while minimizing an amount of network bandwidth required for the registration process. For example, network bandwidth may be conserved by stopping re-sending of one or more of the messages after a certain period of time. In this case(s), each time the registration protocol requires resending messages after timeouts, there is a possibility that either the connecting device or parent service may have lost a connection, and this possibility may lead to a "stuck" state for some or all of the system 1500. To avoid this state, and as referenced above, each re-sent message may be re-sent for a limited number of times only, and, if no successful registration is achieved the entire registration process may restart.

It should be understood that the above description is merely intended to provide examples of a hierarchical layering of a monitor architecture, and that greater or fewer layers of such a hierarchy may be used. By implementing such hierarchically-layered architectures, e.g., as described in more detail above, various features and advantages may be obtained. For example, as referenced above, the system(s) described herein 100 may easily be scaled up to include a large number of smart item devices, while still being able to perform efficient monitoring of services and/or devices.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A system comprising:
   at least a first device of at least one device network that is configured to collect monitor data associated with the at least one device network, using a first instance of a core monitor service and at least a first monitor service module at a first logical layer of a hierarchical, multi-tiered monitor architecture; and
   at least a second device of the at least one device network that is configured to propagate at least a portion of the monitor data from the first device up through the hierarchical, multi-tiered monitor architecture, using a second instance of the core monitor service and at least a second monitor service module at a second logical layer of the hierarchical, multi-tiered monitor architecture,
   wherein the core monitor service is configured to execute a first subset of monitor functions which are generic with respect to the logical layers and to the devices, including sending and receiving monitor messages to propagate the at least a portion of the monitor data, and
   wherein the first monitor service module and the second monitor service module are separable from the core service with respect to installation or removal thereof, and adapted for execution of at least a second subset of monitor functions defined with respect to their respective devices and/or logical layers, the second subset of monitor functions including processing the at least a portion of the monitor data in conjunction with the first instance and the second instance of the core monitor service, respectively, to thereby formulate the monitor messages,
   wherein the at least the first device includes a smart item device that is included within the at least one device network, and the smart item device is configured to implement the first instance of the core monitor service and the first monitor service module using an edge monitor service at which the monitor data is collected,
   wherein the at least the second device includes a group leader device that is included within the at least one device network, and the group leader device is configured to implement the second instance of the core monitor service and the second monitor service module using a group leader monitor service at which the monitor data is processed for transmission,
   wherein the at least the second device includes a local device associated with the group leader monitor service, and the local device is configured to implement a third instance of the core monitor service and at least a third monitor service module using a local monitor service at which the processed monitor data is stored, and wherein the at least the second device includes a global device associated with the local monitor service, and the global device is configured to implement a fourth instance of the core monitor service and at least a fourth monitor service module using a global monitor service at which the stored monitor data is used to update global monitor data.

2. The system of claim 1 wherein the core monitor service includes one or more of:

a system landscape database configured to store known monitor data associated with the at least one device network, a heartbeat transmitter configured to transmit a heartbeat signal from the first device to the second device, a ping requestor configured to test for a connection of a lower-level device;

a query router configured to route queries for monitor data to a lower-level instance of the core monitor service, and an update notification transmitter configured to transmit notifications of changes in a landscape of the hierarchical, multi-tiered monitor architecture.

3. The system of claim 1 wherein the core monitor service is associated with a module manager that is configured to select and implement the first monitor service module from among a plurality of monitor service modules, and wherein each of the plurality of monitor service modules includes a common interface for communicating with the core monitor service.

4. The system of claim 1 wherein the first monitor service module includes a system adaptor that is configured to collect service metadata associated with a service on the first device and/or device metadata associated with the first device.

5. The system of claim 1 wherein the first monitor service module includes a communication adaptor configured to conduct communications for the first instance of the core monitor service.

6. The system of claim 1 wherein the second monitor service module includes a data storage module configured to provide the second instance of the core monitor service with storage of the at least a portion of the monitor data.

7. The system of claim 1 wherein the second monitor service module includes a data pre-processor module that is configured to process the monitor data to obtain the at least a portion of the monitor data, the processing including one or more of filtering or aggregating the monitor data.

8. The system of claim 1, wherein the device network includes a sensor network in which the smart item device is included, the sensor network being configured to process sensor data external to the device network and collected by at least one sensor associated with the sensor network and the smart item device, to thereby facilitate execution of a collaborative function that includes processing the sensor data.

9. A method comprising:

providing an instance of a core monitor service on each of a plurality of tiers of a hierarchical, multi-tiered monitor architecture associated with devices of at least one device network, the core monitor service associated with collecting monitor data associated with the at least one device network, wherein the core monitor service is configured to execute a first subset of monitor functions which are generic with respect to the tiers and to the devices, including sending and receiving monitor messages to propagate the monitor data; and providing at least one monitor service module installed on at least one of the plurality of tiers, the at least one monitor service module configured to communicate with the core monitor service to propagate at least a portion of the monitor data upward through the hierarchical, multi-tiered monitor architecture from the at least one device network, wherein the at least one monitor service module is separable from the core service with respect to installation or removal thereof, and adapted for execution of at least a second subset of monitor functions defined with respect to its corresponding tier and/or device, the second subset of monitor functions including processing the at least a portion of the monitor data in conjunction with its corresponding instance of the core monitor service, respectively, to thereby formulate the monitor messages, wherein at least a first device includes a smart item device that is included within the at least one device network, and the smart item device is configured to implement a first instance of the core monitor service and a first monitor service module using an edge monitor service at which the monitor data is collected, wherein at least a second device includes a group leader device that is included within the at least one device network, and the group leader device is configured to implement a second instance of the core monitor service and a second monitor service module using a group leader monitor service at which the monitor data is processed for transmission, wherein the at least the second device includes a local device associated with the group leader monitor service, and the local device is configured to implement a third instance of the core monitor service and at least a third monitor service module using a local monitor service at which the processed monitor data is stored, and wherein the at least the second device includes a global device associated with the local monitor service, and the global device is configured to implement a fourth instance of the core monitor service and at least a fourth monitor service module using a global monitor service at which the stored monitor data is used to update global monitor data.

10. The method of claim 9 wherein the at least one monitor service module includes a system adaptor configured to collect service metadata associated with a service and/or device metadata associated with a device, the method comprising:

polling an edge monitor service deployed on each of a plurality of devices of the at least one device network, the edge monitor service including the core monitor service and the system adaptor;

processing heartbeat messages received from the plurality of devices using at least one group leader monitor service, the group leader monitor service including the core monitor service and a first data pre-processing monitor service module.

11. The method of claim 10 comprising:

processing heartbeat messages received from the at least one group leader monitor service using at least one local monitor service, the local monitor service including the core monitor service, a second data pre-processing monitor service module, and a data storage service module.

12. The method of claim 11 comprising:

processing heartbeat messages received from the at least one local monitor service using a global monitor service, wherein the local monitor service is configured to transmit a delta synchronization message to the global monitor service to update global monitor data stored in association therewith.

13. The method of claim 9, wherein the device network includes a sensor network in which a smart item device is included, the sensor network being configured to process sensor data external to the device network and collected by at least one sensor associated with the sensor network and the smart item device, to thereby facilitate execution of a collaborative function that includes processing the sensor data.

* * * * *